(12) United States Patent
Miyamoto et al.

(10) Patent No.: US 8,038,959 B2
(45) Date of Patent: Oct. 18, 2011

(54) REACTING DEVICE

(75) Inventors: Naotomo Miyamoto, Tokyo (JP); Tadao Yamamoto, Tokyo (JP); Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 1220 days.

(21) Appl. No.: 11/516,119

(22) Filed: Sep. 6, 2006

(65) Prior Publication Data

US 2007/0054162 A1 Mar. 8, 2007

(30) Foreign Application Priority Data

Sep. 8, 2005 (JP) ................................. 2005-260514
Sep. 8, 2005 (JP) ................................. 2005-260586
Sep. 8, 2005 (JP) ................................. 2005-260599

(51) Int. Cl.
*B01J 8/04* (2006.01)

(52) U.S. Cl. ........ 422/191; 422/193; 422/200; 422/187; 422/190; 422/188; 422/198; 48/127.9; 48/94; 48/95; 48/128; 48/118.5

(58) Field of Classification Search ................. 48/127.9, 48/127.1, 61; 422/187–191, 211, 222; 429/17, 429/19–20
See application file for complete search history.

(56) References Cited

U.S. PATENT DOCUMENTS

| | | | |
|---|---|---|---|
| 5,270,127 A * | 12/1993 | Koga et al. | 429/17 |
| 6,159,434 A * | 12/2000 | Gonjo et al. | 422/191 |
| 6,923,625 B2 | 8/2005 | Sparks | |
| 7,090,807 B1 | 8/2006 | Brauchle et al. | |
| 7,572,417 B2 | 8/2009 | Miyamoto et al. | |
| 7,662,349 B2 | 2/2010 | Miyamoto et al. | |
| 2002/0071797 A1 | 6/2002 | Loffler et al. | |
| 2002/0176813 A1 | 11/2002 | Erdman | |
| 2004/0005268 A1 | 1/2004 | Bruck et al. | |
| 2004/0191591 A1 | 9/2004 | Yamamoto | |
| 2004/0244290 A1 | 12/2004 | Yamamoto et al. | |
| 2005/0191534 A1 | 9/2005 | Kim et al. | |
| 2006/0210846 A1 | 9/2006 | Isozaki et al. | |
| 2007/0144961 A1 | 6/2007 | Tani et al. | |

(Continued)

FOREIGN PATENT DOCUMENTS

CN 1276346 A 12/2000

(Continued)

OTHER PUBLICATIONS

Olsen, John C., "Unit Processes and Principles of Chemical Engineering", Jul. 5, 1932, D. Van Nostrand Company, Inc., Chapter I, pp. 1-3.*

(Continued)

*Primary Examiner* — Alexa D. Neckel
*Assistant Examiner* — Kaity V. Handal
(74) *Attorney, Agent, or Firm* — Holtz, Holtz, Goodman & Chick, PC

(57) ABSTRACT

A reacting device includes a base plate, a first reaction unit provided on the base plate, a reaction material being supplied thereto, the first reaction unit being set at a first temperature, a reaction flow channel being formed such that the reaction material flows therein, the first reaction unit causing a reaction of the reaction material and at least one heating unit which sets the first reaction unit at the first temperature. The first reaction unit has a plurality of reactors that communicate with each other, and the heating unit is provided between the adjacent reactors.

25 Claims, 45 Drawing Sheets

U.S. PATENT DOCUMENTS

2007/0217970 A1    9/2007    Saito et al.

FOREIGN PATENT DOCUMENTS

| | | | |
|---|---|---|---|
| JP | 60-040715 | U | 9/1986 |
| JP | 62-167203 | A | 7/1987 |
| JP | 10-245573 | A | 9/1998 |
| JP | 11-326037 | A | 11/1999 |
| JP | 2000-120996 | A | 4/2000 |
| JP | 2000-513690 | A | 10/2000 |
| JP | 2001-009937 | A | 1/2001 |
| JP | 2001-089105 | A | 4/2001 |
| JP | 2001-146401 | A | 5/2001 |
| JP | 2002-053306 | A | 2/2002 |
| JP | 2002-511383 | A | 4/2002 |
| JP | 2002-249139 | A | 9/2002 |
| JP | 2002-356310 | A | 12/2002 |
| JP | 2003-089502 | A | 3/2003 |
| JP | 2003-089504 | A | 3/2003 |
| JP | 2003-171101 | A | 6/2003 |
| JP | 2003-300703 | A | 10/2003 |
| JP | 2004-296349 | A | 10/2004 |
| JP | 2004-303695 | A | 10/2004 |
| JP | 2004-331434 | * | 11/2004 |
| JP | 2005-009553 | A | 1/2005 |
| JP | 2005-132712 | A | 5/2005 |
| KR | 2003-0044346 | A | 6/2003 |
| WO | WO 99/29621 | | 6/1999 |
| WO | WO 2004/094044 | A1 | 11/2004 |

OTHER PUBLICATIONS

Chinese Office Action (and English translation thereof) dated Jan. 4, 2008, issued in a counterpart Chinese Application.

Japanese Office Action dated Jan. 13, 2009 (2 pages), and English translation thereof (2 pages) issued in counterpart Japanese Application No. 2005-260599.

Japanese Office Action dated Jan. 13, 2009 (2 pages), and English translation thereof (2 pages) issued in counterpart Japanese Application No. 2005-260586.

Japanese Office Action dated Jan. 13, 2009 (2 pages), and English translation thereof (2 pages) issued in counterpart Japanese Application No. 2005-260514.

Korean Office Action dated Aug. 28, 2007 and English translation thereof in counterpart Korean Application No. 2006-0086062.

U.S. Appl. No. 11/513,486, filed: Aug. 31, 2006.

U.S. Appl. No. 11/529,685, filed: Sep. 28, 2006.

U.S. Appl. No. 11/716,875, filed: Mar. 12, 2007.

Japanese Office Action dated Jan. 27, 2009 (3 pages), and English translation thereof (4 pages) issued in counterpart Japanese Application No. 2005-284493 of related U.S. Appl. No. 11/529,685.

Japanese Office Action dated Jan. 27, 2009 (2 pages), and English translation thereof (3 pages) issued in counterpart Japanese Application No. 2005-284700 of related U.S. Appl. No. 11/529,685.

Japanese Office Action dated Jan. 27, 2009 (2 pages), and English translation thereof (3 pages), issued in counterpart Japanese Application No. 2005-284582 of related U.S. Appl. No. 11/529,685.

Chinese Office Action dated Apr. 4, 2008 (4 pages), and English translation thereof (2 pages), issued in a counterpart Chinese Application of related U.S. Appl. No. 11/529,685.

Japanese Office Action dated Aug. 15, 2008 (3 pages), and English translation thereof (7 pages), issued in counterpart Japanese Application of related U.S. Appl. No. 11/513,486.

Japanese Office Action dated Jun. 1, 2010 (3 pages) and English translation thereof (5 pages) in counterpart Japanese Application No. 2006-069480 of related U.S. Appl. No. 11/716,875.

Chinese Office Action dated Dec. 5, 2008 (4 pages) and English translation thereof (2 pages) issued in counterpart Chinese application No. 2007100876824 of related U.S. Appl. No. 11/716,875.

* cited by examiner

REACTING DEVICE

CROSS-REFERENCE TO RELATED APPLICATIONS

This application is based upon and claims the benefit of priority from prior Japanese Patent Applications No. 2005-260514, filed Sep. 8, 2005; No. 2005-260586, filed Sep. 8, 2005; and No. 2005-260599, filed Sep. 8, 2005, the entire contents of all of which are incorporated herein by reference.

BACKGROUND OF THE INVENTION

1. Field of the Invention

The present invention relates to a reacting device to cause reaction of a reactant which is supplied, particularly to a reacting device that is heated by a heating unit and causes the reaction.

2. Description of the Related Art

In recent years, development has been underway in order to mount fuel cells serving as clean power sources that are high in energy conversion efficiency on automobiles or portable devices. A fuel cell is a device that causes fuel and oxygen contained in the atmosphere to react with each other in an electrochemical manner to directly extract electrical energy from chemical energy.

Hydrogen simplex can be exemplified as a fuel used for the fuel cell. However, this fuel has a problem in handling caused by the gas that exists under normal temperature and pressure. Although an attempt is made to store hydrogen by means of a hydrogen storage alloy, a small amount of hydrogen per unit volume may be stored. In particular, this fuel is insufficient as fuel storage means of a power supply of a small sized electronic device such as a portable electronic device.

In contrast, in reforming type fuel cells that reform a liquid fuel having hydrogen atoms such as alcohols and gasoline to generate hydrogen, a fuel can be easily stored in a liquid state. In such fuel cells, there is a need for a reacting device having: a vaporizer that vaporizes a liquid fuel and water; a reformer that causes the vaporized liquid fuel and a high temperature water steam to react with each other, thereby taking out hydrogen required for electric power generation; and a carbon monoxide removing unit or the like that causes reaction of oxidizing carbon monoxide that is a byproduct of the reforming reaction to remove carbon monoxide that is the byproduct of the reforming reaction.

In order to downsize such reforming type fuel cells, for example, development of a micro-reactor or reacting device has been underway in which a groove is formed, and there are laminated the vaporizer, the reformer, and the carbon monoxide removing unit formed by bonding metal substrates, that serves as a reaction flow channel in which the groove causes the above-described various reactions therein.

For example, in a reacting device configuring a reformer, an operating temperature is equal to or greater than 250° C. that is a comparatively high temperature. In order to cause a reforming reaction that sufficiently meets a design value, it is necessary to set a whole reaction flow channel uniformly at a predetermined temperature. On the other hand, in order to properly cause the reaction, it is necessary to lengthen the reaction flow channel. Therefore, the reacting device may comprise a plurality of reactors in which the reaction flow channels have been formed. In such a case, it is difficult to maintain each of the reactors configuring the reactor at a comparatively high uniform temperature. In the case where there is temperature non-uniformity in each of the reactors, a reforming reaction sufficiently meeting the design value is not carried out.

BRIEF SUMMARY OF THE INVENTION

The present invention has an advantage that, in a reaction unit comprising a plurality of reactors, there can be provided a reaction unit capable of reducing temperature non-uniformity while maintaining each of the reactors at a uniform temperature.

In order to obtain the above-described advantage, according to one aspect of the present invention there is provided a reacting device comprising: a base plate; a first reaction unit provided on the base plate, a reaction material being supplied thereto, the first reaction unit being set at a first temperature, a reaction flow channel being formed such that the reaction material flows therein, the first reaction unit causing a reaction of the reaction material; and at least one heating unit which sets the first reaction unit at the first temperature, wherein the first reaction unit has a plurality of reactors that communicate with each other, and the heating unit is provided between the adjacent reactors.

Each of a plurality of the reactors preferably includes a box shaped reaction container and a partition wall provided in the reaction container, the partition wall forming the reaction flow channel, wherein the reaction container and the partition wall are formed while a planar metal material is joined, for example.

The reacting device may comprise a box body that covers an exterior wall of the first reaction unit, the box body being formed while a planar metal material is joined, for example.

Said plurality of reactors and the heating units are preferably provided to be alternatively laminated on the base plate. The first reaction unit is formed to have a first reactor and a second reactor that communicate with each other while they are laminated on each other. The heating unit is provided between the first reactor and the second reactor, and the heating unit has a portion that comes into contact with the first reactor and the second reactor. Alternatively, said plurality of reactors and the heating units are provided parallel to each other on the base plate. The first reaction unit is formed to have a first reactor and a second reactor that communicate with each other while they are placed parallel to each other. The heating unit is provided between the first reactor and the second reactor. The heating unit can have a portion that comes into contact with the first reactor and the second reactor.

The heating unit preferably has a combustor that combusts a gas fuel. The combustor has a combustion flow channel that distributes the gas fuel. A combustion catalyst that promotes a combustion reaction of the gas fuel is coated at least part of a wall face of the combustion flow channel.

The reacting device preferably further comprises: a second reaction unit that is set at a second temperature lower than the first temperature, in which a reaction flow channel having a reaction material flowing therein is formed to cause reaction of the reaction material; and a coupling portion that is bridged between the first reaction unit and the second reaction unit and that transfers reaction material and reaction product generated by the reaction in the first reaction unit and the second reaction unit, wherein the heating unit sets the second reaction unit at the second temperature via the coupling portion.

The second reaction unit comprises a box shaped reaction container and a partition wall provided in the reaction container, the partition wall forming the reaction flow channel. The reaction container and the partition wall can be formed while a planar metal material is joined. The coupling portion is formed while a planar metal material is joined, for example, and can be joined with the first reaction unit and the second reaction unit. The reacting device comprises a box body that covers an exterior wall of the second reaction unit. The box body can be formed while a planar metal material is joined, for example. The coupling portion and the second reaction unit are preferably provided on the base plate. The base plate has a shape enclosed at a portion of the coupling portion between the first reaction unit and the second reaction unit.

The reacting device preferably further comprises: a supply/discharge unit provided on the second reaction unit and having at least a plurality of flow channels that supply a reaction material to the first reaction unit and that discharge a reaction product from the second reaction unit. The reacting device may further have a heating wire provided at least one of the first reaction unit and the second reaction unit, the heating wire heating the first reaction unit and the second reaction unit.

At the first reaction unit, a first reaction material is supplied as the reaction material, and a first reaction product is produced. At the second reaction unit, the first reaction product is supplied as the reaction material, and a second reaction product is produced. The first reaction material is a gas mixture of vaporized water and a fuel that contains hydrogen atoms in constitution. The first reaction unit is a reformer that causes a reforming reaction of the first reaction material. Carbon monoxide is contained in the first reaction product. The second reaction unit is a carbon monoxide removing unit that removes the carbon monoxide contained in the first reaction product in accordance with selective oxidization.

The reacting device preferably further comprises a vaporizer, into which a liquid fuel containing water and hydrogen atoms in constitution is supplied, and the water and liquid fuel are heated and vaporized, thereby producing the gas mixture.

The reacting device preferably comprises a supply channel that supplies the gas mixture to the first reaction unit via the second reaction unit, and the vaporizer is provided in contact with the second reaction unit. The reacting device further comprises a heat-insulating container that covers the entirety of the first reaction unit, the second reaction unit, and the coupling portion, in which an internal space has a gas pressure that is lower than atmospheric pressure. The insulating container can be formed while a planar metal material is joined, for example.

DETAILED DESCRIPTION OF THE INVENTION

Hereinafter, embodiments of a reacting device according to the present invention will be described in detail with reference to the accompanying drawings.

First Embodiment

First, a first embodiment of the reacting device according to the present invention will be described.

Figure 1:
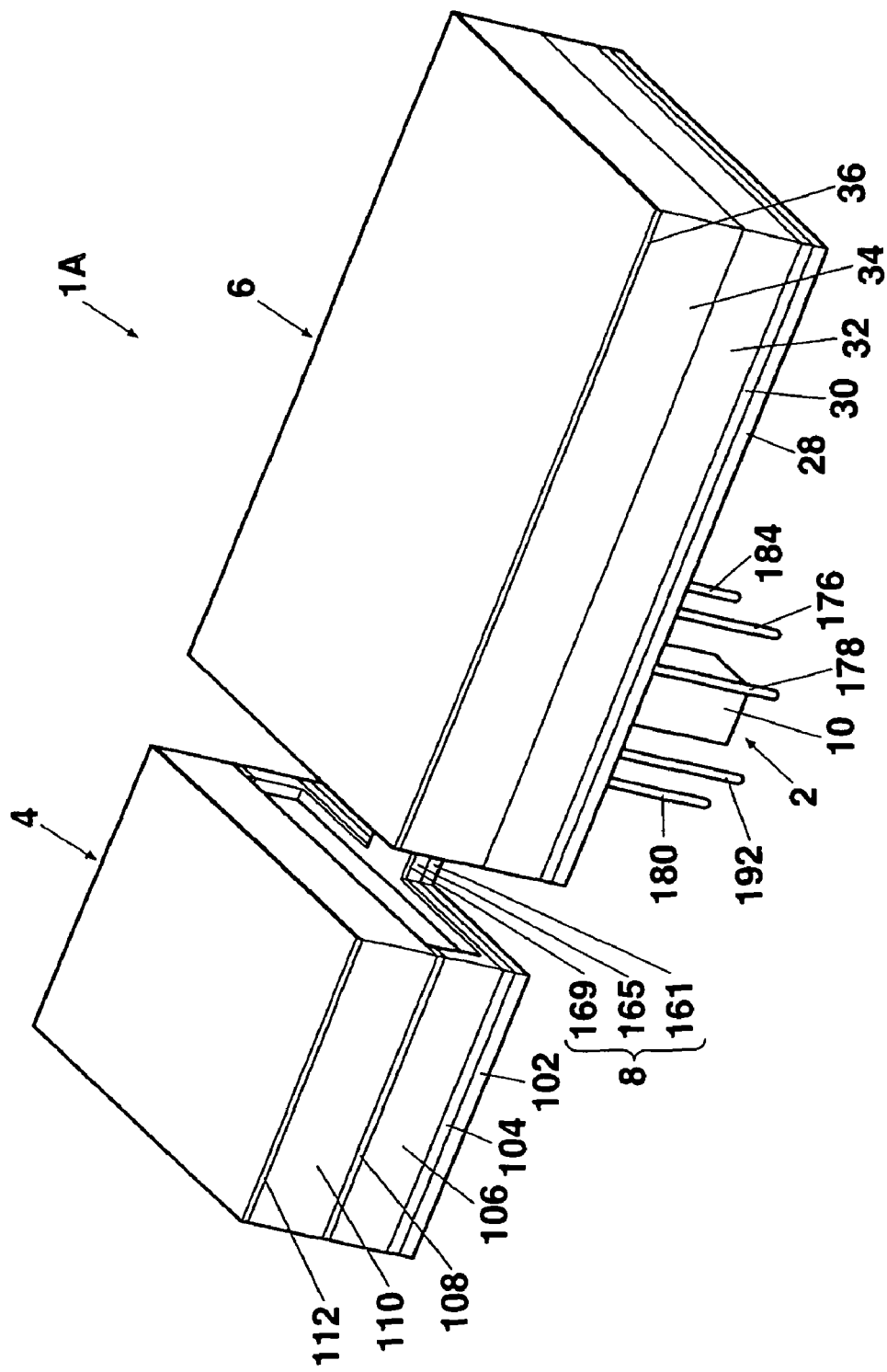
FIG. 1 is a perspective view showing obliquely upwardly a micro-reactor module in a first embodiment of a reacting device according to the present invention.
Figure 2:
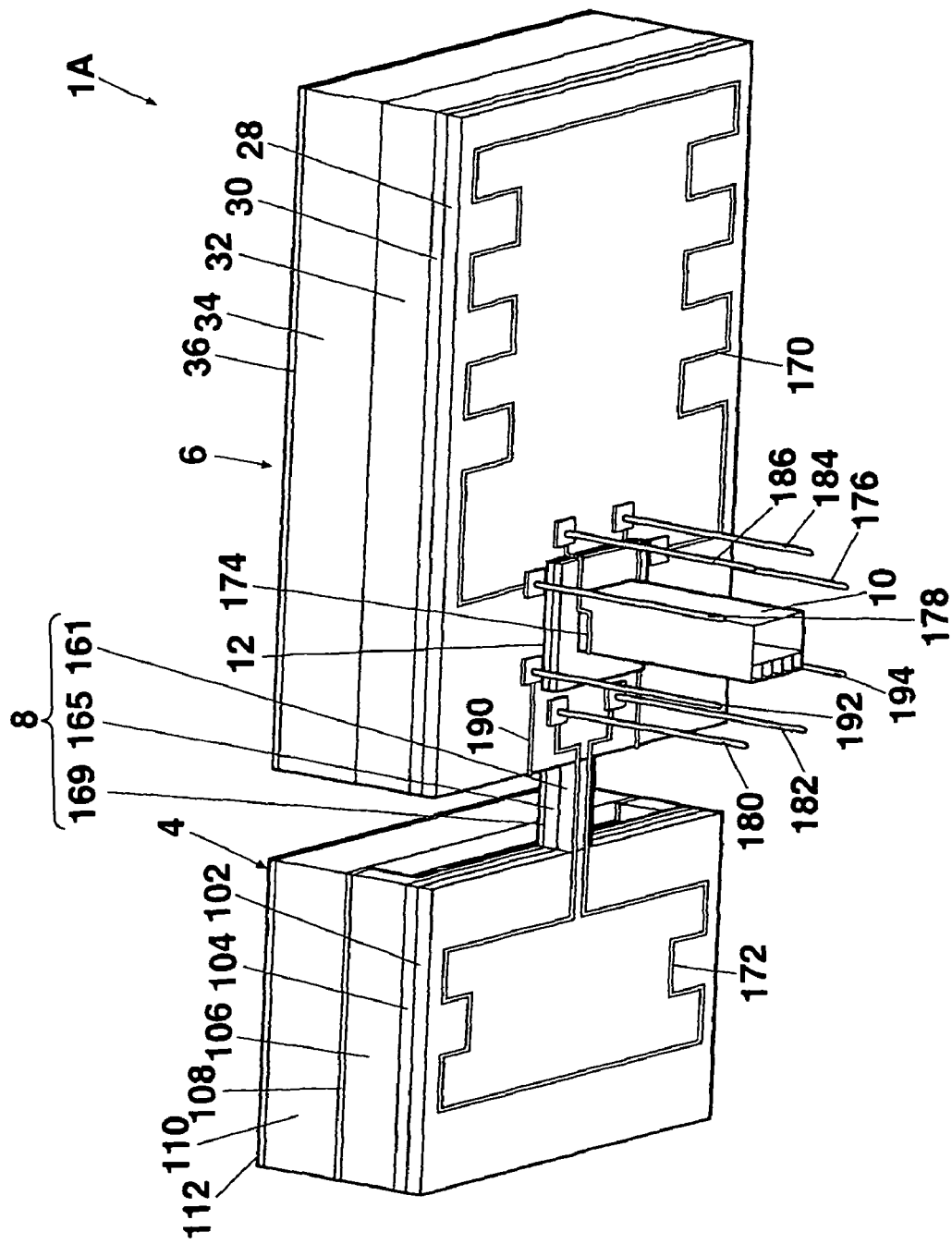
FIG. 2 is a perspective view showing obliquely downwardly the micro-reactor module in the first embodiment.
Figure 3:
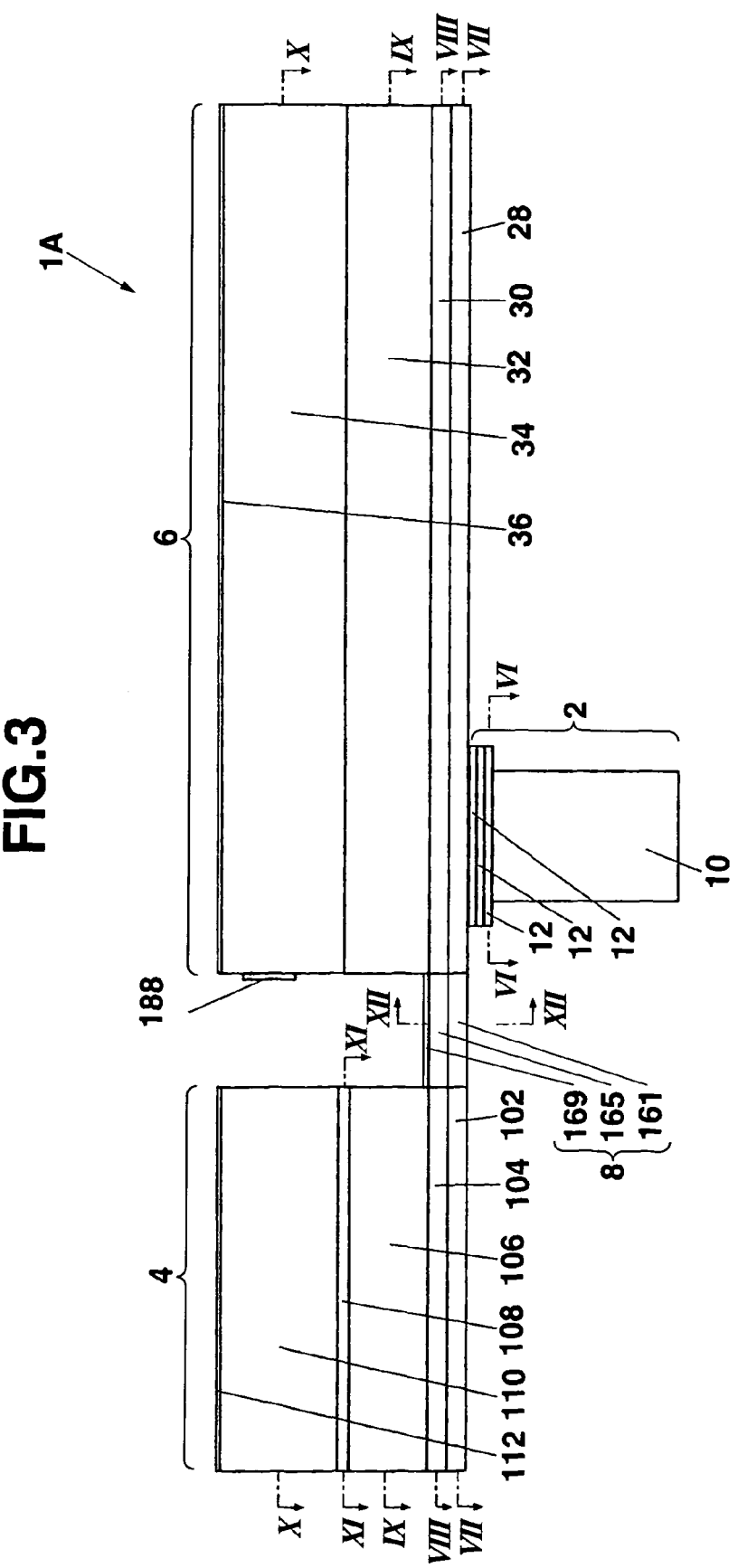
FIG. 3 is a side view of the micro-reactor module in the first embodiment.

FIG. 1 is a perspective view showing obliquely upwardly a micro-reactor module in a first embodiment of a reacting device according to the present invention. FIG. 2 is a perspective view showing obliquely downwardly the micro-reactor module in the first embodiment. FIG. 3 is a side view of the micro-reactor module in the first embodiment.

This micro-reactor module 1A is to be incorporated in an electronic device such as a note book type personal computer, a PDA, an electronic notebook, a digital camera, a cellular phone, a wristwatch, a cash register, or a projector, and serves as a reacting device that generates hydrogen gas for use in fuel cells.

The micro-reactor module 1A comprises: a supply and discharge unit 2 that supplies a reaction material and discharge a product; a high temperature reaction unit (first reaction unit) 4 that is set at a comparatively high temperature and that causes a reforming reaction therein; a low temperature reaction unit (second reaction unit) 6 that is set at a temperature lower than the set temperature of the high temperature reaction unit 4 and that causes a selective oxidization reaction therein; and a coupling portion 8 for carrying out inflow or outflow of a reaction material or a product between the high temperature reaction unit 4 and the low temperature reaction unit 6.

Figure 4:
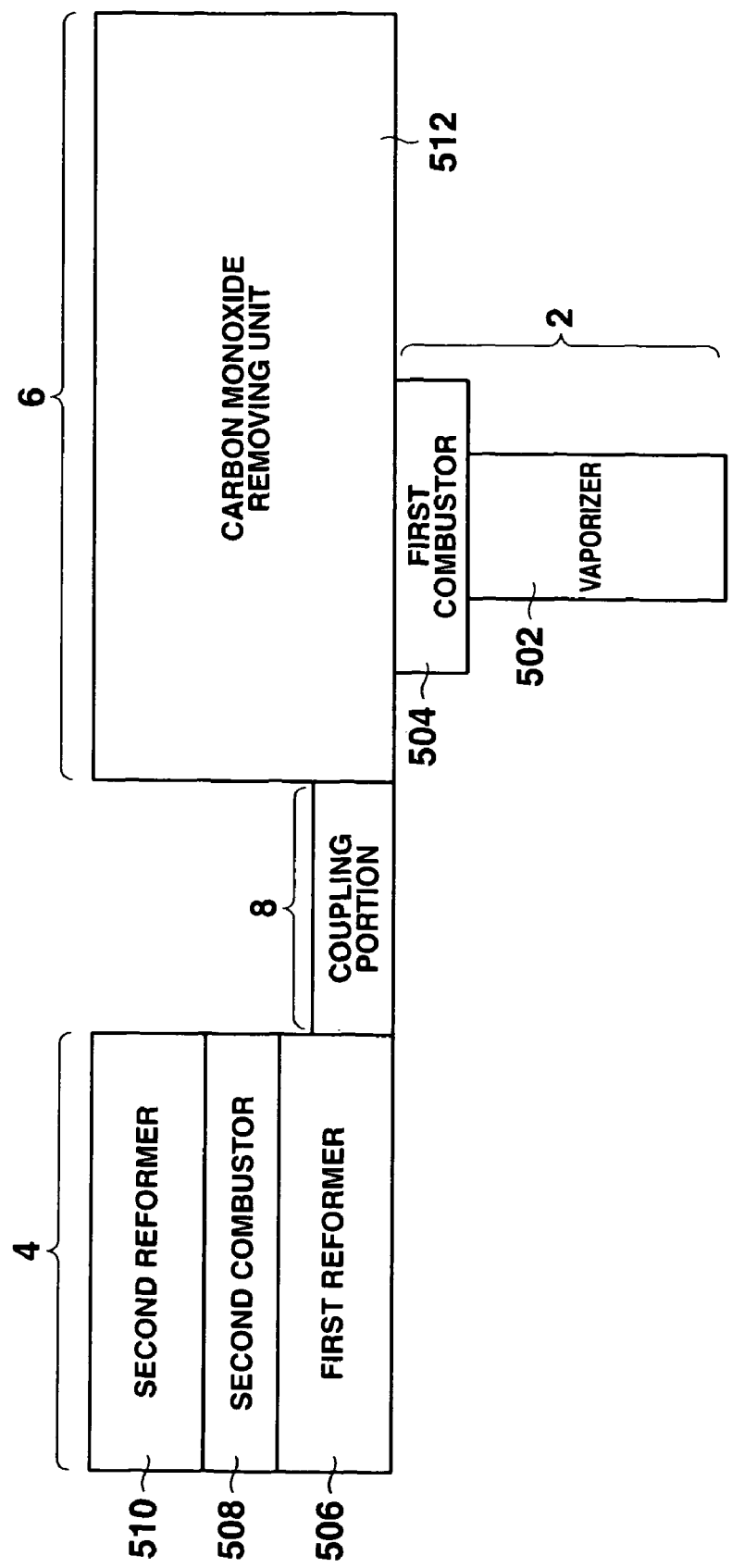
FIG. 4 is a schematic side view showing a case in which the micro-reactor module in the first embodiment is functionally divided.

FIG. 4 is a schematic side view showing a case in which the micro-reactor module in the first embodiment has been functionally divided.

As shown in FIG. 4, a vaporizer 502 and a first combustor 504 are primarily provided at the supply and discharge unit 2. To the first combustor 504, an air and a gas fuel (such as hydrogen or methanol gas, for example) are supplied respectively separately or are supplied as gas mixture. Heat is generated by means of catalyst combustion of the air and fuel. To the vaporizer 502, water and a liquid fuel (for example, methanol, ethanol, dimethyl ether, butane, or gasoline) are supplied from a fuel container respectively separately or are supplied in a mixed state. The water and liquid fuel are vaporized in the vaporizer 502 by means of a combustion heat in the first combustor 504.

A first reformer (first reactor) 506, a second combustor (heating unit) 508, and a second reformer (second reactor) 510 are primarily provided at the high temperature reaction unit 4. The first reformer 506 is provided downwardly, the second reformer 510 is provided upwardly, and the second combustor 508 is provided at a position sandwiched between the first and second reformers 506, 510. The first reformer 506, second combustor 508, and second reformer 510 are laminated in a close contact with each other, and the first reformer 506 and the second reformer 510 are structured so as to communicate with each other.

To the second combustor 508, air and a gas fuel (such as hydrogen or methanol gas) are supplied respectively separately or are supplied as a gas mixture, and heat is generated by means of catalyst combustion of the air and fuel. In fuel cells, in a state in which electricity is produced due to an electrochemical reaction of hydrogen gas, and then, unreacted hydrogen gas contained in an off gas discharged from the fuel cells is mixed with air, the mixture may be supplied to the first combustor 504 and the second combustor 508. The liquid fuel stored in the fuel container (for example, methanol, ethanol, dimethyl ether, butane, or gasoline) is vaporized by means of another vaporizer, and the gas mixture between the thus vaporized fuel and air may be supplied to the first combustor 504 and the second combustor 508.

To the first reformer 506 and the second reformer 510, gas mixture (first reaction material) of which water and a liquid fuel have been vaporized is supplied from the vaporizer 502, and then, the first reformer 506 and the second reformer 510 are heated by means of the second combustor 508. In these reformers 506 and 510, a hydrogen gas or the like (first reaction product) is produced from a water steam and the vaporized liquid fuel by means of catalyst reaction, and further, a carbon monoxide gas is produced, although it is a very small amount. In the case where a liquid fuel is methanol, a chemical reaction as shown in formulas (1) and (2) takes place. The reaction in which hydrogen is produced is a heat absorptive reaction, and for the purpose of this reaction, a combustion heat of the second combustor 508 is used.

$$CH_3OH + H_2O \rightarrow 3H_2 + CO_2 \quad (1)$$

$$2CH_3OH + H_2O \rightarrow 5H_2 + CO + CO_2 \quad (2)$$

A carbon monoxide removing unit 512 is primarily provided at the low temperature reaction unit 6. The carbon monoxide removing unit 512 is heated by means of the first combustor 504; gas mixture (second reaction material) containing a hydrogen gas and a very small amount of carbon monoxide gas or the like produced by the chemical reaction of formula (2) above are supplied from the reformers 506 and 510; and further, air is supplied. In the carbon monoxide removing unit 512, carbon monoxide is selectively oxidized from among the gas mixture, whereby carbon monoxide is removed. Then, gas mixture (second reaction product: hydrogen rich gas) from which carbon monoxide has been removed is supplied to fuel poles of fuel cells.

Now, with reference to FIGS. 3 and 5 to 14, a description will be given with respect to a specific configuration of the supply and discharge unit 2, the high temperature reaction unit 4, the low temperature reaction unit 6, and the coupling portion 8.

Figure 5:
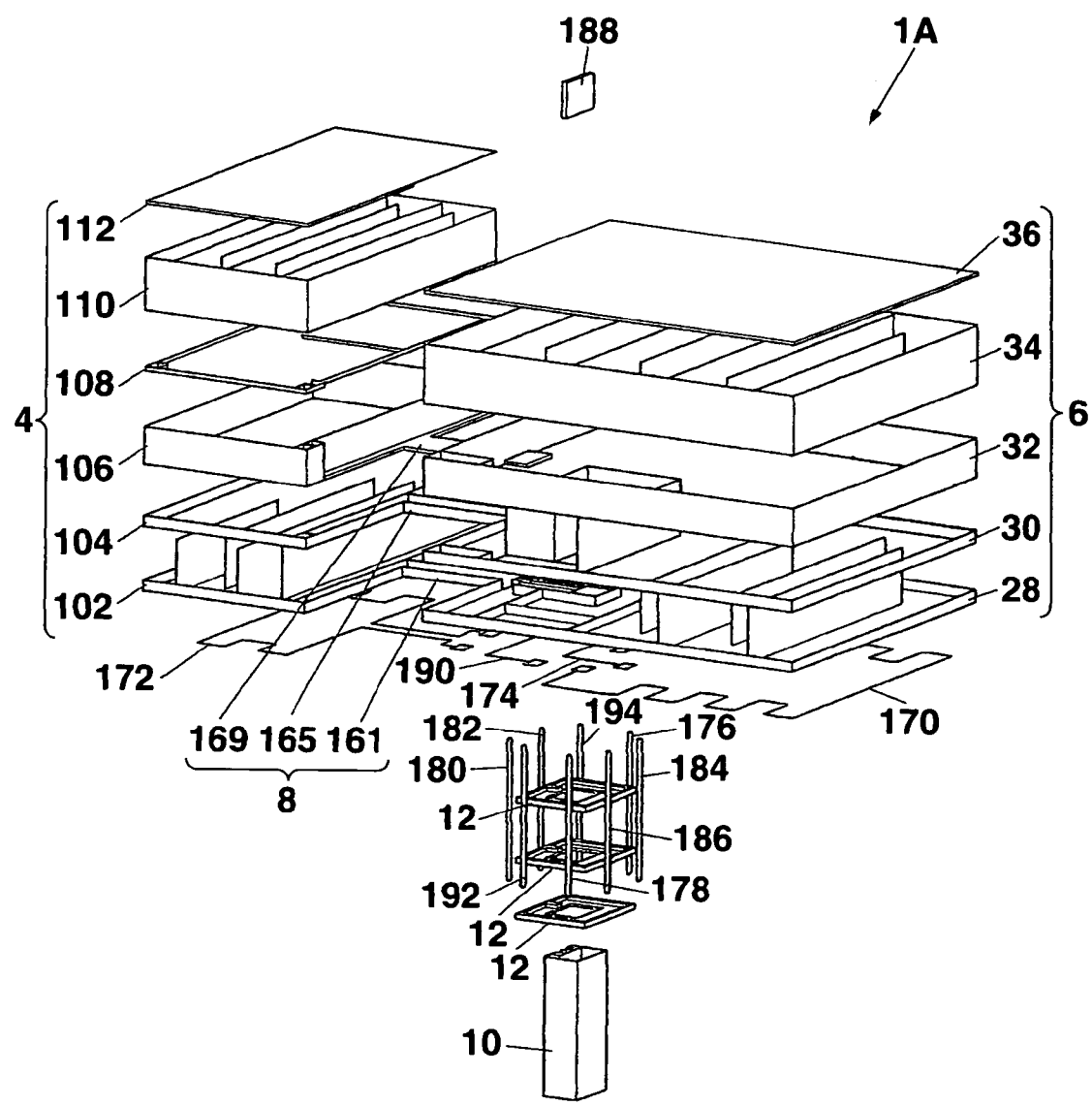
FIG. 5 is an exploded perspective view of the micro-reactor module in the first embodiment.
Figure 6:
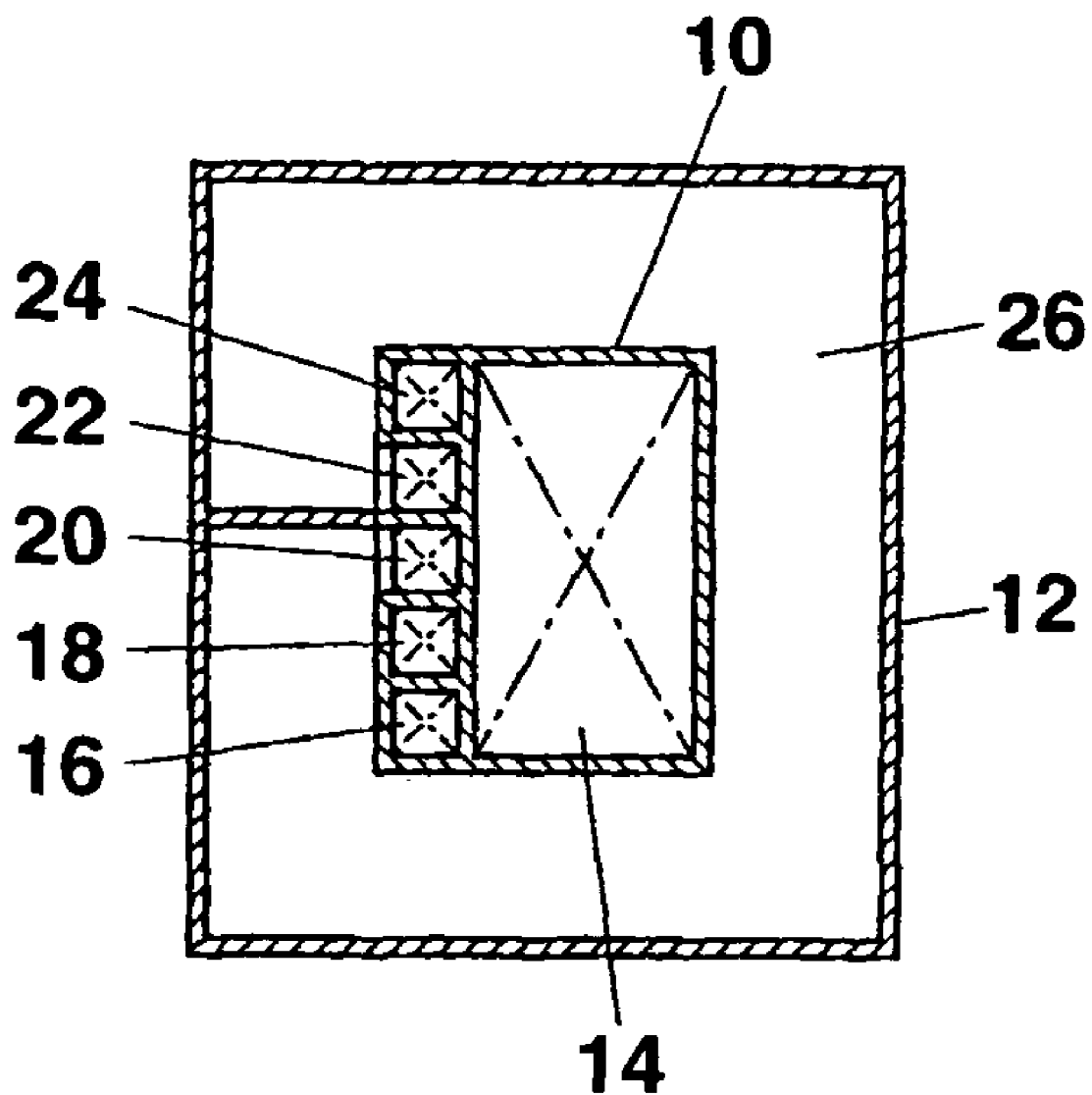
FIG. 6 is a sectional view taken along a planar direction of a combustor plate described later from the cut line VI-VI of FIG. 3.
Figure 7:
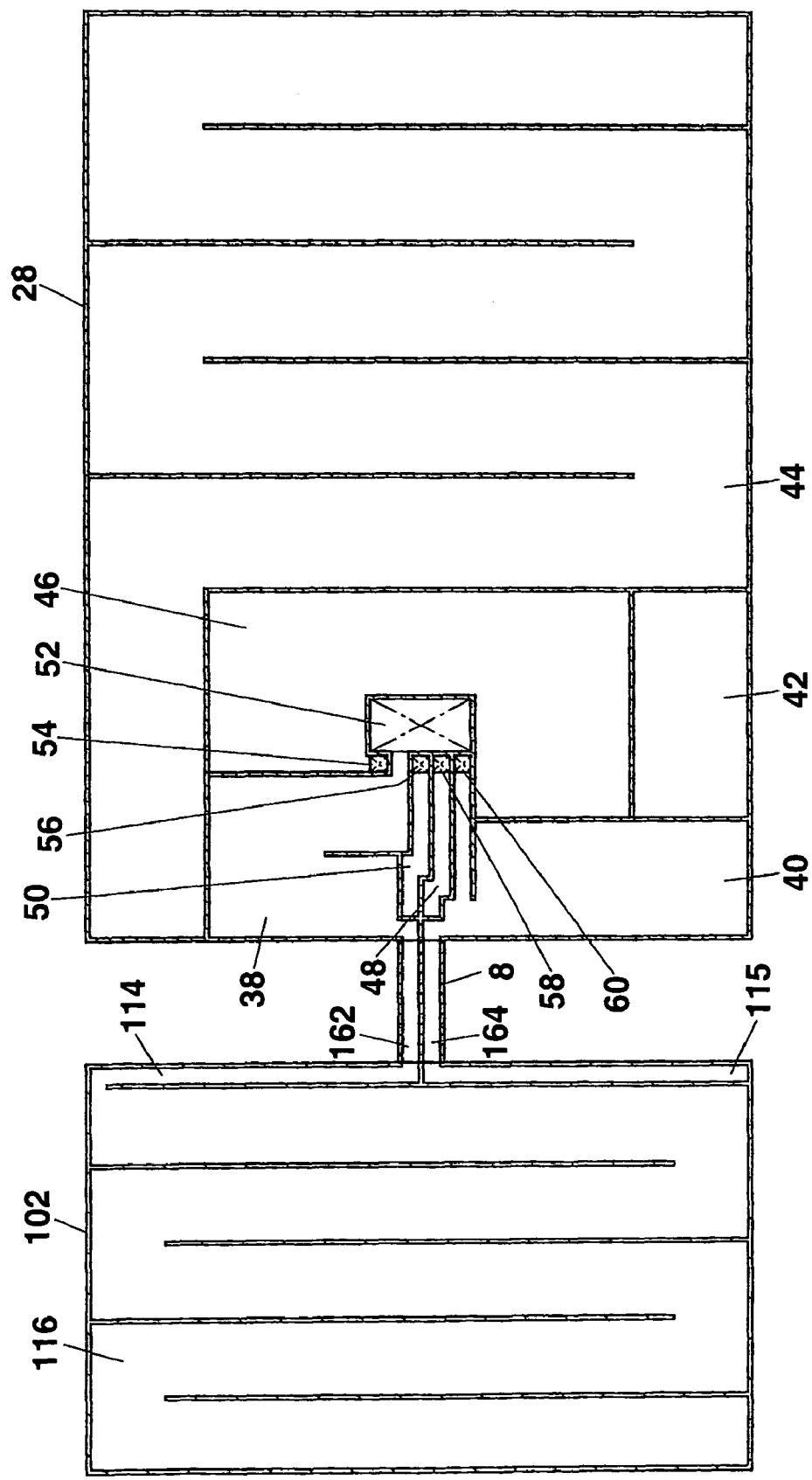
FIG. 7 is a sectional view taken along a planer direction of a base plate described later from the cut line VII-VII of FIG. 3.
Figure 8:
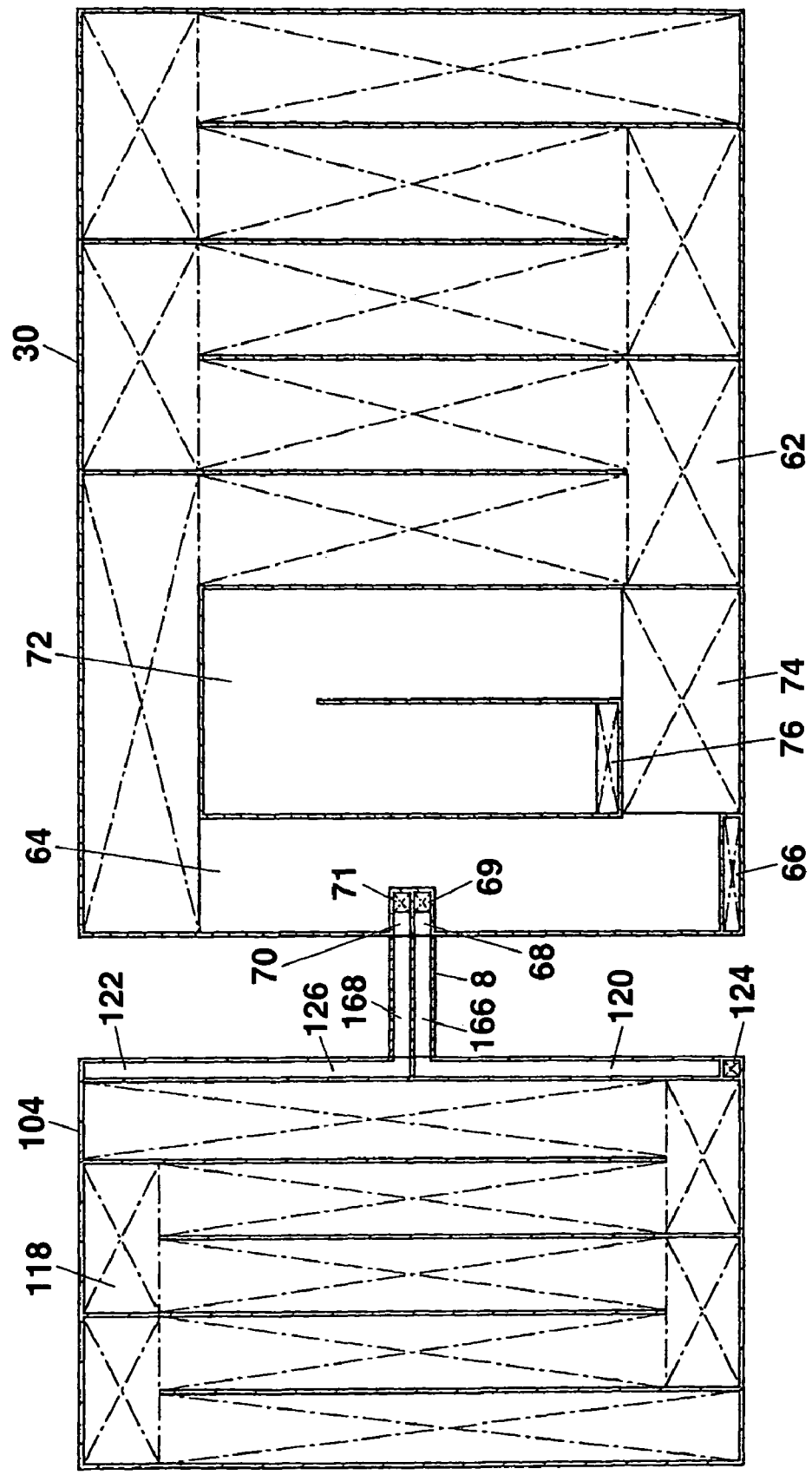
FIG. 8 is a view showing a lower frame described later and is a sectional view taken along a planer direction of the lower frame from the cut line VIII-VIII of FIG. 3.
Figure 9:
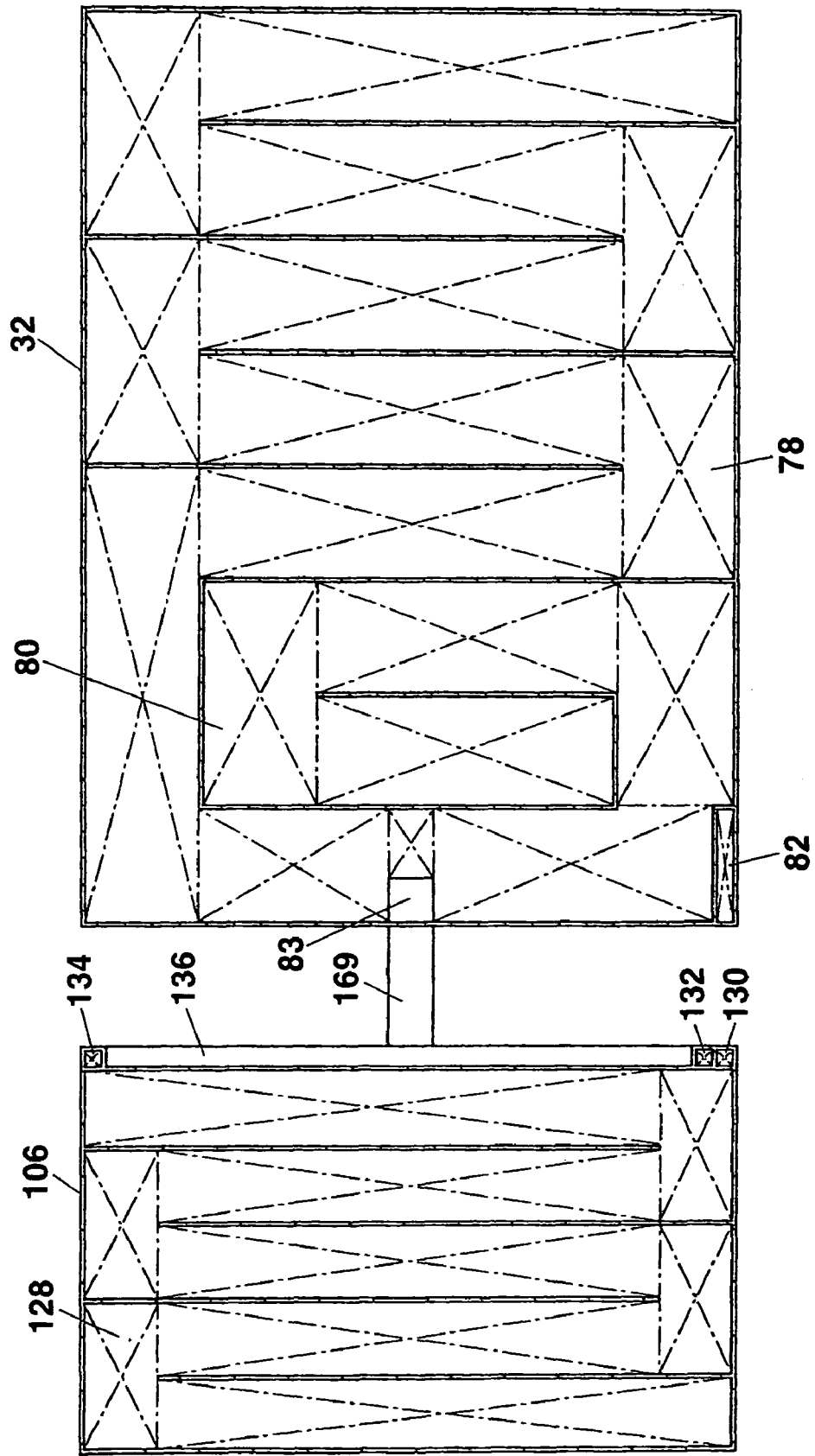
FIG. 9 is a view showing a middle frame described later and is a sectional view taken along a planer direction of the middle frame from the cut line IX-IX of FIG. 3.
Figure 10:
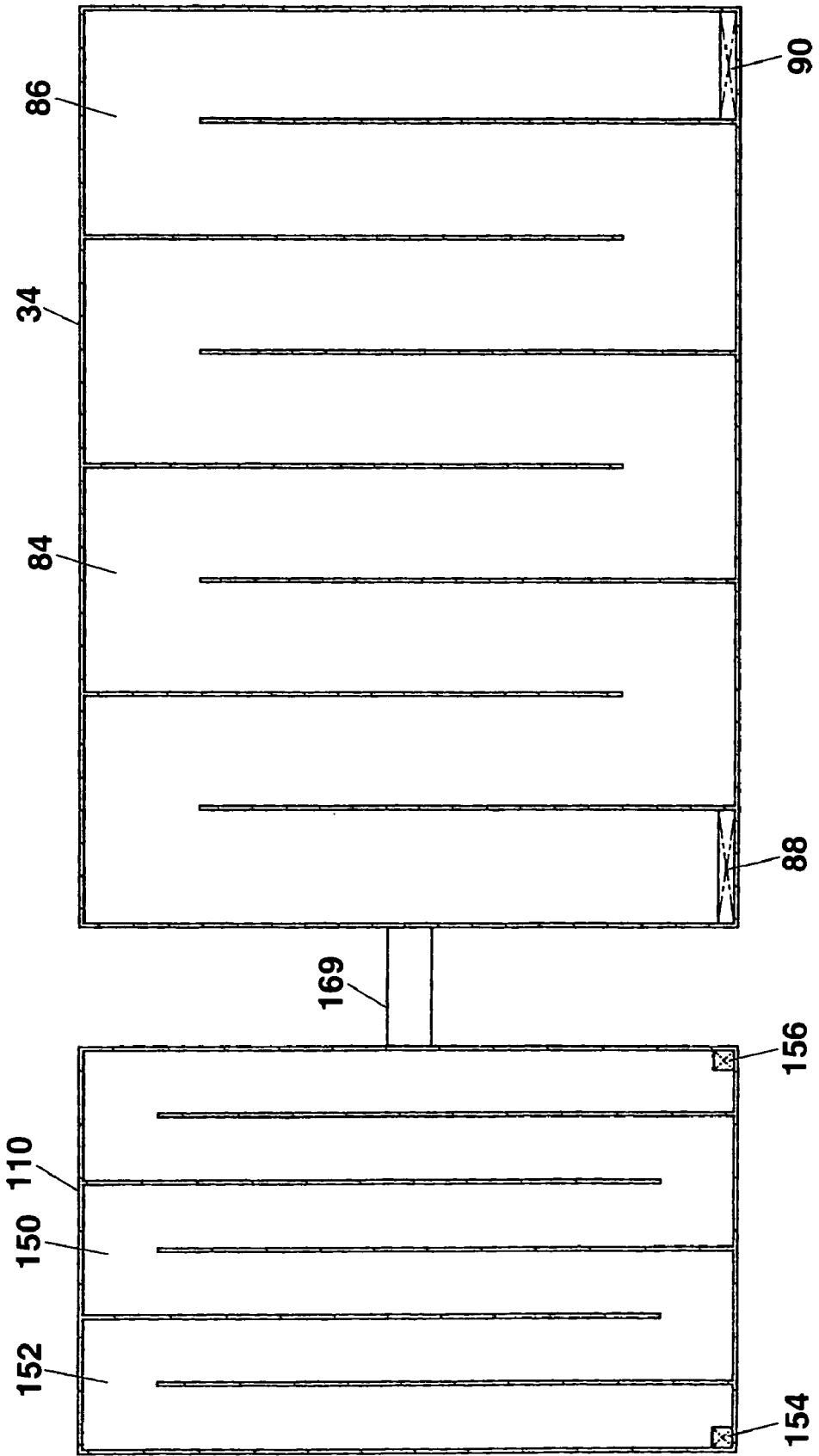
FIG. 10 is a view showing an upper frame described later and is a sectional view taken along a planar direction of the upper frame from the cut line X-X of FIG. 3.
Figure 11:
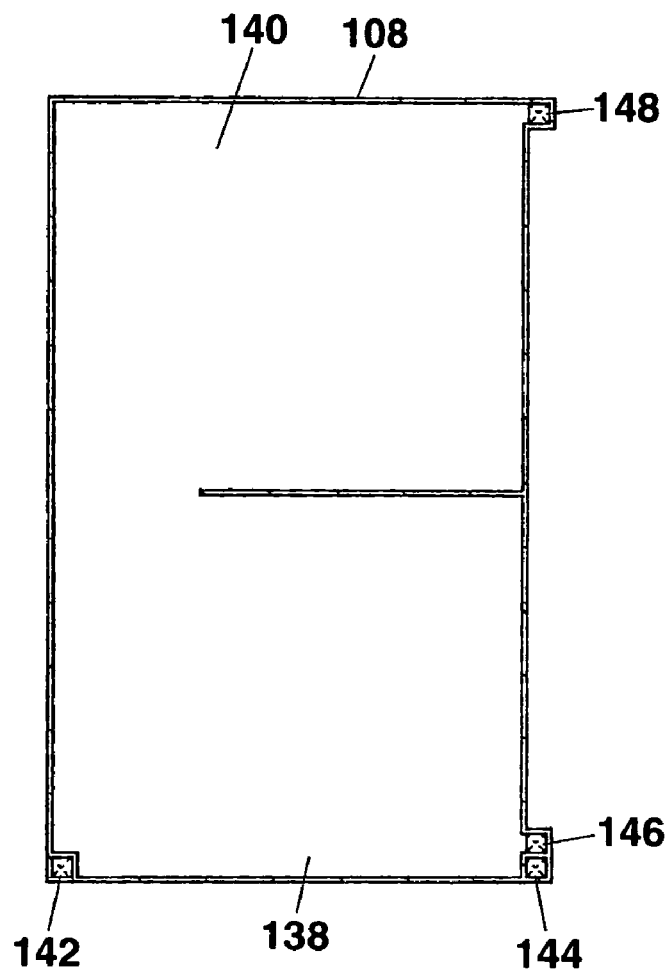
FIG. 11 is a sectional view taken along a planer direction of a combustor plate described later from the cut line XI-XI of FIG. 3.
Figure 12:
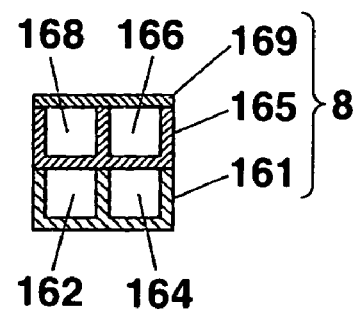
FIG. 12 is a sectional view taken along a facial direction orthogonal to a communication direction of a coupling portion 8 from the cut line XII-XII of FIG. 3.
Figure 13:
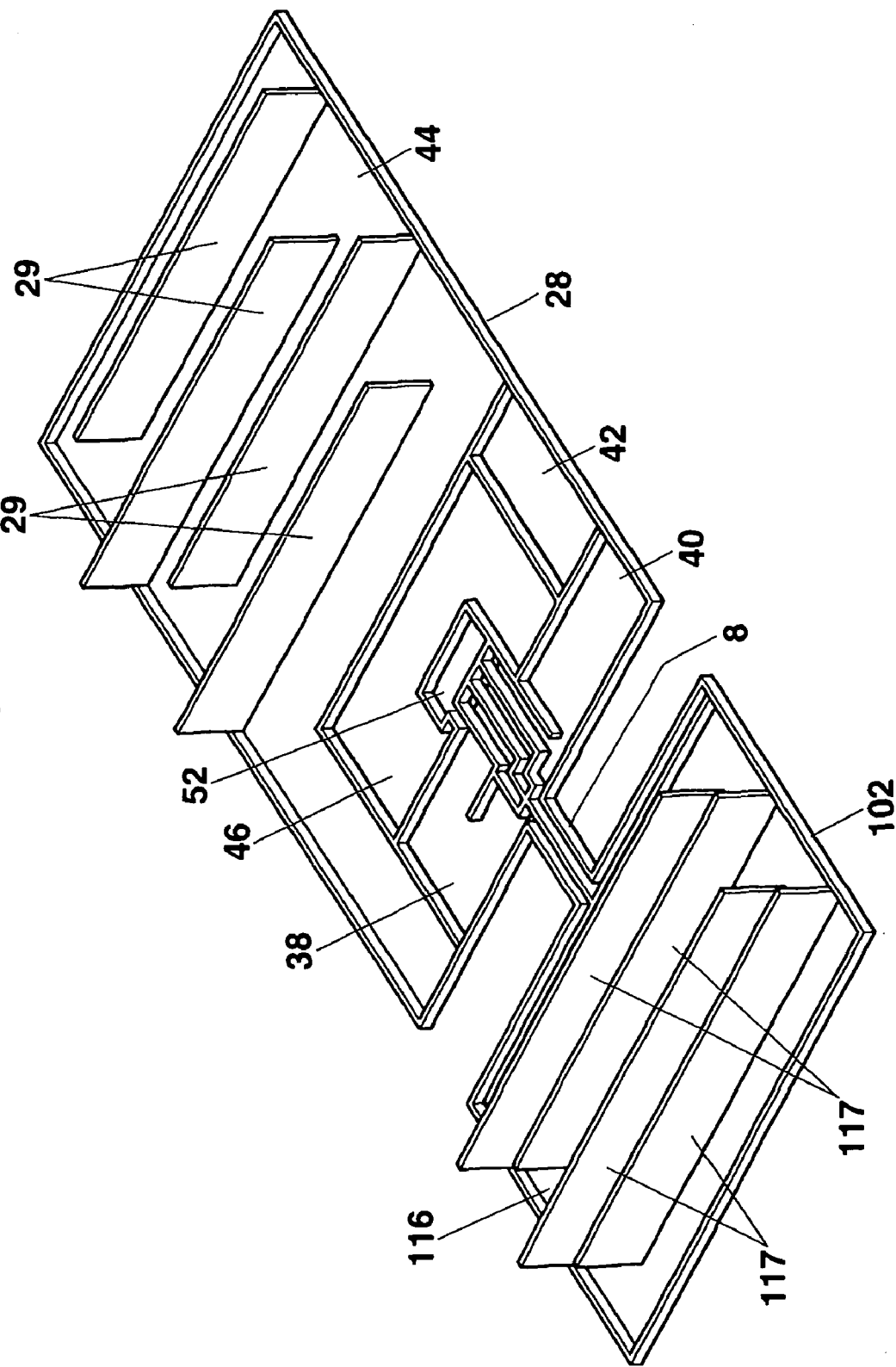
FIG. 13 is a perspective view of a member taken along the cut line VII-VII of FIG. 3.
Figure 14:
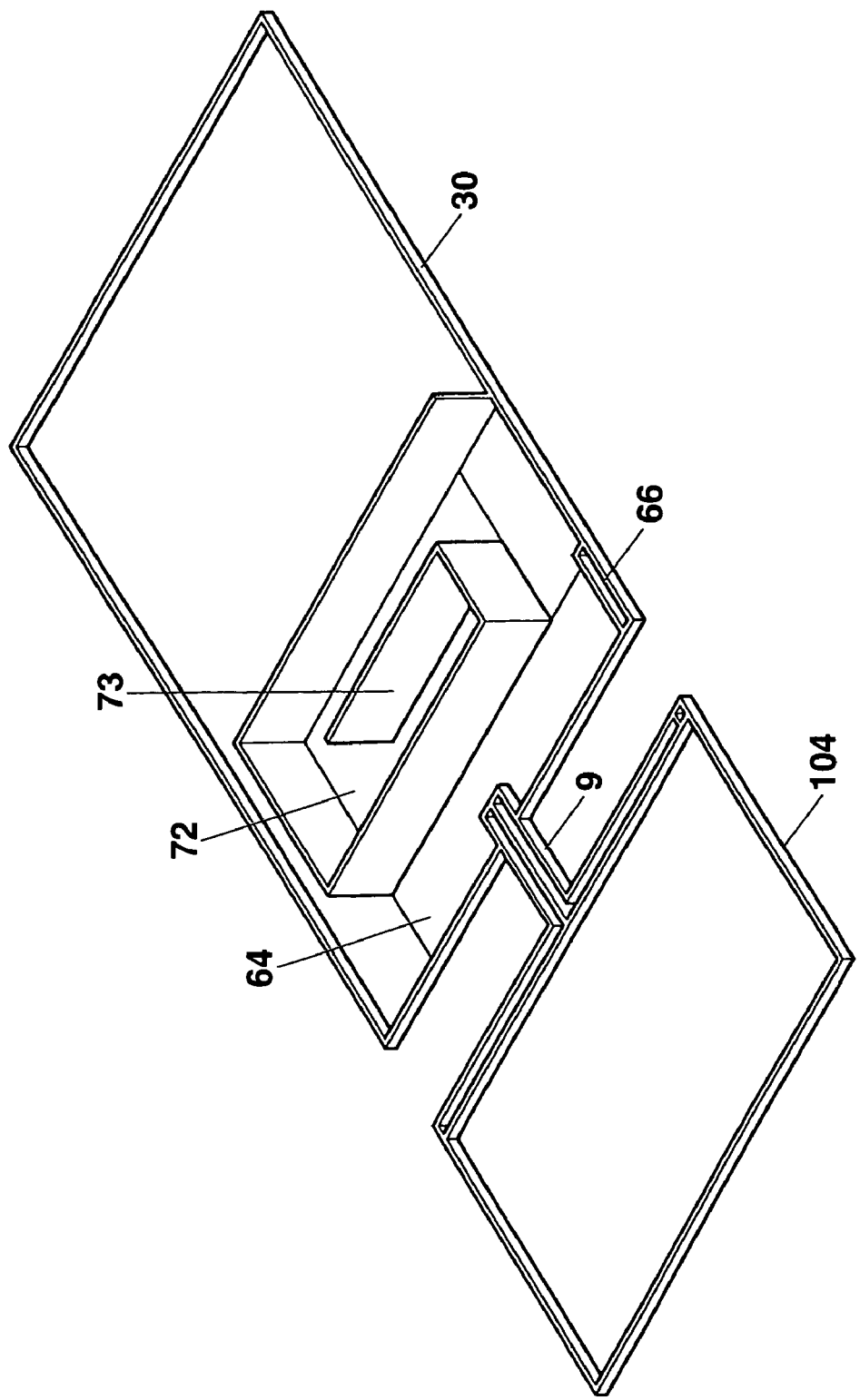
FIG. 14 is a perspective view of a member taken along the cut line VIII-VIII of FIG. 3.

FIG. 5 is an exploded perspective view of a micro-reactor module in the first embodiment. FIG. 6 is a sectional view taken along a planar direction of a combustor plate described later from the cut line VI-VI of FIG. 3. FIG. 7 is a sectional view taken along a planer direction of a base plate described later from the cut line VII-VII of FIG. 3. FIG. 8 is a view showing a lower frame described later and is a sectional view taken along a planar direction of the lower frame from the cut line VIII-VIII of FIG. 3. FIG. 9 is a view showing a middle frame described later and is a sectional view taken along a planer direction of the middle frame from the cut line IX-IX of FIG. 3. FIG. 10 is a view showing an upper frame described and is a sectional view taken along a planar direction of the upper frame from the cut line X-X of FIG. 3. FIG. 11 is a sectional view taken along a planer direction of a combustor plate described later from the cut line XI-XI of FIG. 3. FIG. 12 is a sectional view taken along a facial direction orthogonal to a communication direction of a coupling portion 8 from the cut line XII-XII of FIG. 3. FIG. 13 is a perspective view of a member taken along the cut line VII-VII of FIG. 3. FIG. 14 is a perspective view of a member taken along the cut line VIII-VIII of FIG. 3.

As shown in FIGS. 3, 5, and 6, the supply and discharge unit 2 includes, for example, an external flow pipe 10 made of a planer metal material such as a stainless steel; and three combustor plates 12 laminated and joined at the periphery of the external flow pipe 10.

The external flow pipe 10 is a pipe having a plurality of following flow channels for distributing fluids contained in the micro-reactor module 1A to the outside of the micro-reactor module 1A. In the external flow pipe 10, there are provided: a vaporization intake channel 14; an air intake channel 16, a combustion gas mixture intake channel 18; an exhaust gas discharge channel 20; a combustion gas mixture intake channel 22; and a hydrogen discharge channel 24, each of which extends vertically.

The vaporization intake channel 14, the air intake channel 16, the combustion gas mixture intake channel 18, the exhaust gas discharge channel 20, the combustion has mixture intake channel 22, and the hydrogen discharge channel 24 are partitioned by vertical partition walls in the external flow pipe 10. In the present embodiment, although the vaporization intake channel 14, the air intake channel 16, the combustion gas mixture intake channel 18, the exhaust gas discharge channel 20, the combustion gas mixture intake channel 22, and the hydrogen discharge channel 24 are provided in one external flow pipe 10, these channels 14, 16, 18, 20, 22, and 24 may be provided in separate pipes, and these pipes may be bundled.

The vaporization intake channel 14 is filled with a liquid absorptive material such as a felt material, a ceramics porous material, a fiber material, or a carbon porous material, for example. The liquid absorptive material absorbs a liquid. The liquid absorptive material is made of an inorganic fiber or an organic fiber solidified with a binder material, sintered inorganic powder, inorganic powder solidified with a binder material, a mixture of graphite and glassy carbon, and the like.

The combustor plate 12 is also made of a planer metal material such as a stainless steel, for example. Rectangular through holes are formed at the center parts of these combustor plates 12, the external flow pipe 10 is engaged with these through holes, and the external flow pipe 10 and the combustor plates 12 are joined with each other. Here, the external flow pipe 10 is joined with the combustor plates 12 by means of brazing, for example. As a brazing agent, it is preferable to use a gold brazing having a melting point that is higher than a maximum temperature from among the temperatures of fluids that flow through the external flow pipe 10 and combustor plates 12, the gold braze containing silver, copper, zinc, and cadmium, the melting point of which is 700° C. or higher; a brazing consisting essentially of gold, silver, zinc, and nickel, or alternatively, a brazing consisting essentially of gold, palladium, and silver. The combustor plate 12 has partition walls (a peripheral partition wall and a middle partition wall) that have been protruded vertically onto a top face or a bottom face.

The partition wall is provided all over an outer rim of the combustor plate 12, and another portion (a middle wall) is provided all over a radial direction. Three combustor plates 12 are laminated by means of bonding at the periphery of the external flow pipe 10, and further, the top combustor plate 12 is joined at its top face with a bottom face of the low temperature reaction unit 6, whereby a combustion flow channel 26 is formed on these bonding face by means of the partition walls. The combustion flow channel 26 extending horizontal at the periphery of the external flow pipe 10 communicates with the combustion gas mixture intake channel 22 at one end and communicates with the exhaust gas discharge channel 20 at the other end.

A combustion catalyst for combusting a combustion gas mixture is carried at least part of a wall face of the combustion flow channel 26 or the combustor plate 12. As a combustion catalyst, for example, platinum can be exemplified. A liquid absorptive material contained in the external flow pipe 10 is filled up to a position of the combustor plate 12.

As shown in FIGS. 3 and 5, the low temperature reaction unit 6 includes: a base plate 28; a lower frame 30; a middle frame 32; an upper frame 34; and a cover plate 35 which are laminated in this order from the bottom, and has a reaction container formed in a rectangular box shape. The base plate 28, the lower frame 30, the middle frame 32, the upper frame 34, and the cover plate 36 are made of a planer metal material such as a stainless steel, for example.

At the center part in the widthwise direction of the base plate 28, the external flow pipe 10 and the top combustor plate 12 are joined with a bottom face of the base plate 28. As shown in FIG. 7, partition walls (a peripheral wall and a middle wall) are provided so as to be protruded on a top face of the base plate 28, whereby the top face is partitioned into: a gas mixture flow channel 38; a mixture flow channel 40; a carbon monoxide removal flow channel 42; a zigzag-shaped carbon monoxide removal flow channel 44; a U-shaped carbon monoxide removal flow channel 46; a combustion gas mixture flow channel 48; and an exhaust gas flow channel 50. The gas mixture flow channel 38 communicates with the vaporization intake channel 14 of the external flow pipe 10 via the through hole 52 while the through hole 52 is formed at one end in a horizontal direction. The carbon monoxide removal flow channel 46 surrounds the through hole 52, and then, communicates with the hydrogen discharge channel 24 via the through hole 54 while the through hole 54 is formed at one end. The combustion gas mixture flow channel 48 communicates with the combustion gas mixture intake channel 18 via a through hole 58 while the through hole 58 is formed at one end. The exhaust gas flow channel 50 communicates with the exhaust gas discharge channel 20 via a through hole 56 while the through hole 56 is formed at one end. The mixture flow channel 40 communicates with the air intake channel 16 via a through hole 60 while the through hole 60 is formed at one end.

As shown in FIG. 8, a plurality of partition walls (a peripheral wall and a middle wall) are provided inside the lower frame 30, whereby the inside of the lower frame 30 is partitioned into: a zigzag-shaped carbon monoxide removal flow channel 62; a whirl-shaped carbon monoxide removal flow channel 64; a well hole 66; a combustion gas mixture flow channel 68; and an exhaust gas flow channel 70. A bottom plate 72 is provided in the carbon monoxide removal flow channel 64, the combustion gas mixture flow channel 68, and the exhaust gas flow channel 70. The lower frame 30 is joined onto the base plate 28 by means of brazing or the like. The upper sides of the gas mixture flow channel 38, the mixture flow channel 40, the carbon monoxide removal flow channel 46, the combustion gas mixture flow channel 48, and the exhaust gas flow channel 50 are capped by the bottom plate 72.

In the carbon monoxide removal flow channel 64, one end communicates with the carbon monoxide removal flow channel 62; a well hole 74 communicating with the carbon monoxide removal flow channel 42 of the case plate 28 is formed at a partway section; and a bowing hole 76 communicating with the exhaust gas flow channel 50 of the base plate 28 is formed at the other end.

The carbon monoxide removal flow channel 62 overlaps on the carbon monoxide removal flow channel 44 of the base plate 28, and then, the carbon monoxide removal flow channel 44 communicates with the carbon monoxide removal flow channel 62. The well hole 66 is positioned on the top of the mixture flow channel 40 of the base plate 28. In the combustion gas mixture flow channel 68, a well hole 69 is formed at one end, and then, the combustion gas mixture flow channel 68 communicates with the combustion gas mixture flow channel 48 of the base plate 28 via the well hole 69. In the exhaust gas flow channel 70, a well hole 71 is formed at one end, and then, the exhaust gas flow channel 70 communicates with the exhaust gas flow channel 50 of the base plate 28 via the well hole 71. In planar viewing, the external flow pipe 10 overlaps partly on the carbon monoxide removal flow channel 64 (is positioned downwardly), and the carbon monoxide removal flow channel 64 is configured so as to whirling the periphery of the external flow pipe 10.

As shown in FIG. 9, partition walls (a peripheral wall and a middle wall) are provided on a top face of a middle frame 32, whereby the inside of the middle frame 32 is partitioned into the zigzag-shaped carbon monoxide removal flow channel 78, the whirl carbon monoxide removal flow channel 80, and the well hole 82. A bottom plate 83 is provided partly of the carbon monoxide removal flow channel 80, and then, the middle frame 32 is joined with the lower frame 30 by means of brazing or the like. As a result, the combustion mixture gas flow channel 68 and the exhaust gas flow channel 70 of the lower frame 30 whose top side is capped with the bottom plate 83 is formed.

The carbon monoxide removal flow channel 78 overlaps on the carbon monoxide removal flow channel 62 of the lower frame 30, and then, these flow channels 62 and 78 communicate with each other. The carbon monoxide removal flow channel 80 overlaps on the carbon monoxide removal flow channel 64 of the lower frame 30, and then, these flow channels 64 and 80 communicate with each other. The well hole 82 overlaps on the well hole 66 of the lower frame 30, and then, the well holes 66 and 82 communicate with each other.

Here, as shown in FIG. 13, from among the partition walls provided on the base plate 28, four partition walls (middle walls) 29 forming the carbon monoxide removal flow channel 44 are higher than any other partition wall. As shown in FIGS. 7 to 9, the partition wall 29 extends from the base plate 28 to the middle plate 32 through the lower frame 30. The base plate 28, the lower frame 30, the middle frame 32, and the top frame 34 are joined with each other by means of brazing or the like, whereby the zigzag-shaped carbon monoxide removal flow channels 44, 62 and 78 are formed integrally with each other.

As shown in FIG. 14, from among the partition walls provided at the lower frame 30, a partition wall (middle wall) 73 on the bottom plate 72 forming the carbon monoxide removal flow channel 64 is also higher than any other partition wall. As shown in FIGS. 8 and 9, the partition wall 73 extends from the lower frame 30 to the middle frame 32. The base plate 28, the lower frame 30, the middle frame 32, and the top frame 34 are joined with each other by means of brazing or the like, whereby the whirl-shaped carbon monoxide removal flow channels 64 and 80 whose top part has been capped with the upper frame 34 are formed integrally with each other.

Next, as shown in FIG. 10, partition walls (a peripheral wall and a middle wall) are provided inside the upper frame 34, whereby a zigzag-shaped carbon monoxide removal flow channel 84 is formed inside the upper frame 34. A bottom plate 86 is provided at a whole inside of the upper frame 34. The upper frame 34 is joined with the middle frame 32 by means of brazing or the like. A top part is capped with the bottom plate 86. Then, the carbon monoxide removal flow channel 78 and the carbon monoxide removal flow channel 80 of the middle frame 32 are formed.

In addition, a well hole 88 is formed at one end of the carbon monoxide removal flow channel 84, and a well hole 90 is formed at the other end of the carbon monoxide removal flow channel 84. The well hole 88 overlaps on the well hole 82 of the middle frame 32, and then, the carbon monoxide removal flow channel 84 communicates with the mixture flow channel 40 via the well holes 66, 82, and 88. The well hole 90 is positioned on the top of an end of the carbon monoxide removal flow channel 78, and then, the carbon monoxide removal flow channel 84 communicates with the carbon monoxide removal flow channel 78 through the well hole 90.

As shown in FIG. 5, the cover plate 36 is joined onto the upper frame 34 by means of brazing or the like, whereby a top part of the carbon monoxide removal flow channel 84 is capped with the cover plate 36, and then, the carbon monoxide removal flow channel 84 is formed. Here, a carbon monoxide selective oxidization catalyst for selectively oxidizing carbon monoxide is carried on at least part of the wall faces of the carbon monoxide removal flow channels 42, 44, 46, 62, 64, 78, 80, and 84. Platinum can be exemplified as a carbon monoxide selective oxidization catalyst, for example.

As shown in FIGS. 3 and 5, the high temperature reaction unit 4 includes a base plate 102, a lower frame 104, a middle frame 106, a combustor plate 108, an upper frame 110, and a cover plate 112 which are laminated in this order from the bottom, and has a reaction container formed in a rectangular box shape. The base plate 102, the lower frame 104, the middle frame 106, the combustion plate 108, the upper frame 110, and the cover plate 112 are made of a planar metal material such as a stainless steel, for example.

As shown in FIG. 7, a plurality of partition walls are provided so as to protrude on a top face of the base plate 102, whereby the top face is partitioned into a supply flow channel 114, a zigzag-shaped reforming flow channel 116, and an exhaust flow channel 115. The supply flow channel 114 communicates with the reforming flow channel 116, however, the exhaust flow channel 115 is independent of the supply flow channel 114 and the reforming flow channel 116.

As shown in FIG. 8, a plurality of partition walls are provided inside the lower frame 104, whereby the inside of the lower frame 104 is partitioned into a zigzag-shaped reforming flow channel 118, a combustion gas mixture flow channel 120, an exhaust gas flow channel 122, and a well hole 124. A bottom plate 126 is provided in the combustion gas mixture flow channel 120 and the exhaust gas flow channel 122. The lower frame 104 is joined with the base plate 102 by means of brazing or the like, whereby the supply flow channel 114 and the exhaust flow channel 115 whose top parts are capped with the bottom plate 126 are formed. The reforming flow channel 118 overlaps on the reforming flow channel 116 of the base plate 102, and then, the reforming flow channel 118 and the reforming flow channel 116 communicate with each other.

As shown in FIG. 9, a plurality of partition walls are provided inside the middle frame 106, whereby the inside of the middle frame 106 is partitioned into a zigzag-shaped reforming flow channel 128, a well hole 130, a well hole 132, and a well hole 134. A bottom plate 136 is provided at the middle frame 106, and the middle frame 106 is joined with the lower frame 104 by means of brazing or the like, whereby the top parts of the combustion gas mixture flow channel 120 and the exhaust gas flow channel 122 of the lower frame 104 are capped with the bottom plate 136. The reforming flow channel 128 overlaps on the reforming flow channel 118 of the lower frame 104, see that the reforming flow channel 128 and the reforming flow channel 118 communicate with each other.

The well hole 130 overlaps on the well hole 124 of the lower frame 104, so that, the well holes 124 and 130 communicate with each other. The well hole 132 is positioned on the top of an end of the combustion gas mixture flow channel 120, and the well hole 134 is positioned on the top of an end of the exhaust gas flow channel 122.

Here, as shown in FIG. 14, from among the partition walls provided on the base plate 102, four partition walls 117 forming the reforming flow channel 116 are higher than any other partition wall. As shown in FIGS. 7 to 9, the partition wall 117 extends from the base plate 102 to the middle frame 106 through the lower frame 104. The base plate 102, the lower frame 104, the middle frame 106, and the combustor plate 108 are joined with each other, whereby the top part is capped with the combustor plate 108, and thus, the zigzag-shaped reforming flow channels 116, 118, and 128 are formed integrally with each other.

As shown in FIGS. 3 and 5, the combustor plate 108 is joined on the middle frame 106 by means of brazing or the like, whereby the top part of the middle frame 106 is capped, and thus, the reforming flow channel 128 is formed.

As shown in FIG. 11, partition walls are provided so as to protrude on a top face of the combustor plate 108, whereby the top face is partitioned into a combustion chamber 138, a combustion chamber 140, a well hole 142, and a well hole 144. A well hole 146 is formed at an end of the combustion chamber 138. The well hole 146 is positioned on the well hole 132 of the middle frame 106 so that the combustion chamber 138 communicates with the combustion gas mixture flow channel 120 of the lower frame 104 via the well holes 132 and 146. The combustion chamber 138 communicates with the combustion chamber 140. A well hole 148 is formed at an end of this combustion chamber 140. The well hole 148 is positioned on the well hole 134 of the middle frame 106 so that the combustion chamber 140 communicates with the exhaust gas flow channel 122 via the well hole 148 and the well hole 134. The well hole 142 is positioned on an end of the reforming flow channel 128 of the middle frame 106, and communicates with the reforming flow channel 128. The well hole 144 is positioned on the well hole 130 of the middle frame 106, and communicates with the well hole 130. A combustion catalyst for combusting a combustion gas mixture is carried on at least part of a wall face made of a bottom face and a side face of the combustion chamber 138 and the combustion chamber 140. Platinum or the like can be exemplified as a combustion catalyst, for example.

As shown in FIG. 10, a plurality of partition walls are provided inside the upper frame 110, whereby a zigzag-shaped reforming flow channel 150 is formed inside the upper frame 110. A bottom plate 152 is provided at the upper frame 110, and the upper frame 110 is joined onto the combustor plate 108 by means of brazing or the like, whereby the top parts of the combustion chamber 138 and the combustion chamber 140 of the combustor plate 108 are capped. A well hole 154 is formed at one end of the reforming flow channel 150, and a well hole 156 is formed at the other end of the reforming flow channel 150. The well hole 154 is positioned on the well hole 142 of the combustor plate 108, so that the reforming flow channel 150 communicates with the reforming flow channel 128 of the middle frame 106 via the well hole 154 and the well hole 142. The well hole 156 is positioned on the well hole 144 of the combustor plate 108, and thus, the reforming flow channel 150 communicates with the exhaust flow channel 115 via the well hole 156, the well hole 144, the well hole 130, and the well hole 124.

As shown in FIG. 5, the cover plate 112 is joined onto the upper frame 110 by means of brazing or the like, whereby the top part of the reforming flow channel 150 is capped with the cover plate 112. Here, a reforming catalyst for reforming fuel and generating hydrogen is carried on wall faces of the supply flow channel 114, the exhaust flow channel 115, and the reforming flow channels 116, 118, 128, and 150. As reforming catalysts for use in reforming methanol, there can be exemplified, for example, a Cu/ZnO-based catalyst or a Pd/ZnO-based catalyst.

As shown in FIGS. 3, 4, and 12, the coupling portion 8 is externally formed in the shape of a rectangular column, and is made of a first coupling portion 161, a second coupling portion 165, and a bottom plate 169. The coupling portion 8 is narrower in width than the high temperature reaction unit 4 and the low temperature reaction unit 6, and is lower in height than the both reaction units 4 and 6. The first coupling portion 161 is bridged between the high temperature reaction unit 4 and the low temperature reaction unit 6. As shown in FIGS. 2, 7, and 13, for example, this coupling portion 161 is molded integrally with the base plates 28 and 102 serving as a substrate at the center part in the widthwise direction of each of the high temperature reaction unit 4 and the low temperature reaction unit 6. A bottom face of the first coupling portion 161 faces against that of the high temperature reaction unit 4, namely, that of the base plate 102, and further, faces against that of the low temperature reaction unit 6, namely, that of the base plate 28. The second coupling portion 165 is bridged between the high temperature reaction unit 4 and the low temperature reaction unit 6. As shown in FIGS. 2, 8, and 14, for example, the second coupling portion 165 is molded integrally with the lower frames 30 and 104 serving as a frame body at the center part in the widthwise direction of each of the high temperature reaction unit 4 and the low temperature reaction unit 6.

As shown in FIG. 7, a coupling flow channel 162 and a coupling flow channel 164 are provided parallel to each other at the first coupling portion 161. These coupling flow channels 162 and 164 are partitioned each other by means of a partition wall of the first coupling portion 161, and the partition wall is formed by being joined with the second coupling portion 165.

As shown in FIG. 8, a coupling flow channel 166 and a coupling flow channel 168 are provided parallel with each other at the second coupling portion 165. The coupling flow channel 166 and the coupling flow channel 168 are partitioned by means of a partition wall of the second coupling portion 165, and the partition wall is formed by being joined with a bottom plate 169 by means of brazing or the like.

As shown in FIG. 9, the middle frame 32 and the middle frame 106 are connected to each other by means of the bottom plate 169 formed integrally with the bottom plate 136, for example.

As shown in FIG. 7, a gas mixture flow channel 38 communicates with one end of the coupling flow channel 162, and the other end of the coupling flow channel 162 communicates with the supply flow channel 114. One end of the coupling flow channel 164 communicates with the mixture flow channel 40, and the other end communicates with the exhaust flow channel 115. As shown in FIG. 8, one end of the coupling flow channel 166 communicates with the combustion gas mixture flow channel 68, and the other end communicates with the combustion gas mixture flow channel 120. One end of the coupling flow channel 168 communicates with the exhaust gas flow channel 70, and the other end communicates with the exhaust gas flow channel 122.

In the above-described configuration, the first coupling portion 161 forming the coupling portion 8 is molded integrally with the base plates 28 and 102; the second coupling portion 165 is molded integrally with the lower frames 30 and 104; and the bottom plate 169 is formed integrally with the middle frame 32 and the middle frame 106. However, without being limited thereto, the coupling portion 8 may be formed in a rectangular column shape, for example, independent of the high temperature reaction unit 4 and the low temperature reaction unit 6; may be connected with the high temperature reaction unit 4 at the center part in the widthwise direction of the high temperature reaction unit 4; and may be joined with the low temperature reaction unit 6 at the center part in the widthwise direction of the low temperature reaction unit 6.

In addition, although the coupling flow channels 162, 164, 166, and 168 are provided at one coupling portion 8, all or some groupes of these flow channels 162, 164, 166, and 168 may be provided at separate pipes, whereby these pipes may be bundled.

In addition, it is preferable that the coupling portion 8 be made of the same material as the base plate 28, the lower frame 30, the base plate 102, and the lower frame 104 joined with each other from the viewpoint of air tightness.

Now, a description will be given with respect to a flow channel provided inside the supply and discharge unit 2, the high temperature reaction unit 4, the low temperature reaction unit 6, and the coupling portion 8.

Figure 15:
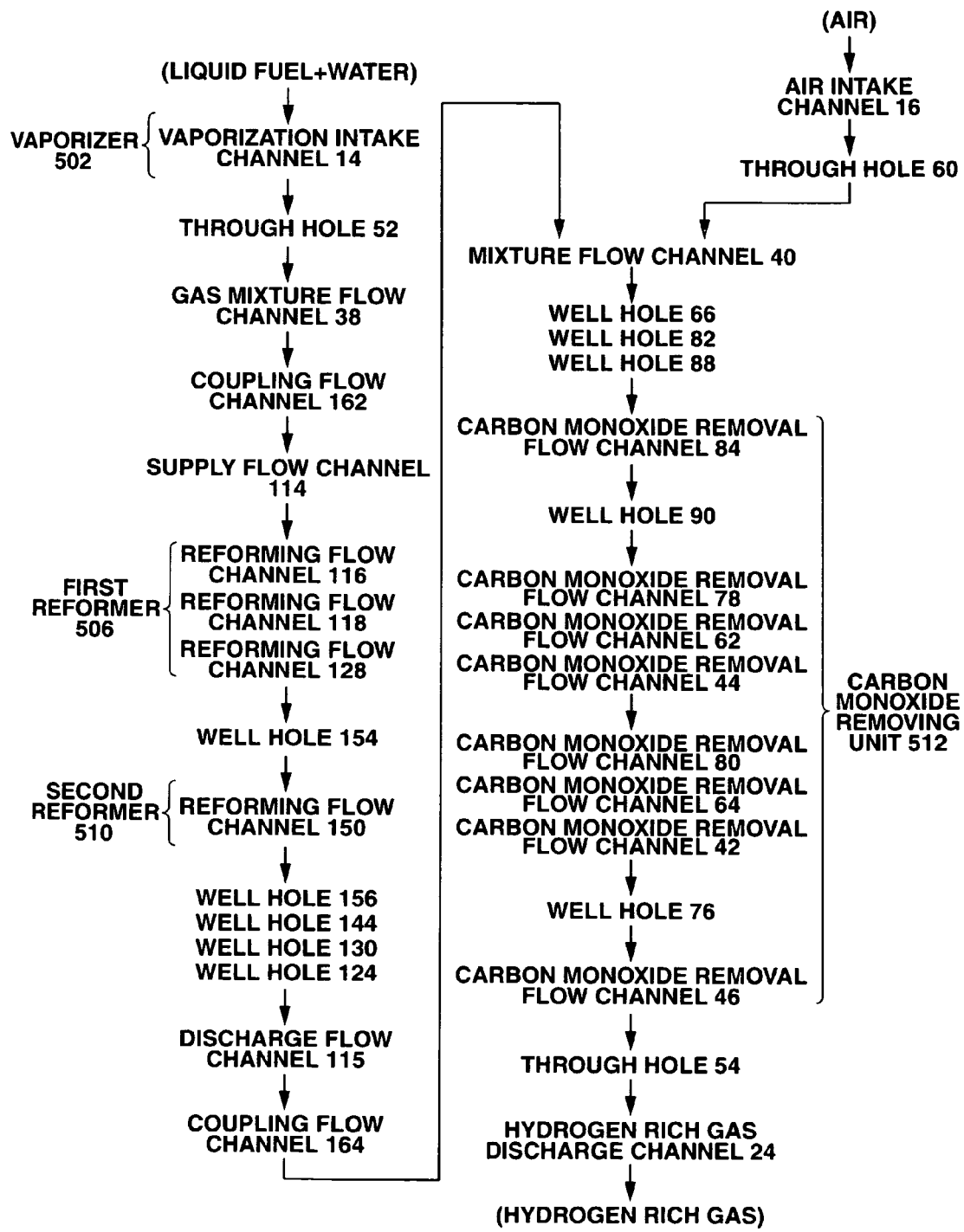
FIG. 15 is a view showing a channel from supply of a liquid fuel and water to discharge of a hydrogen rich gas that is a product, in the micro-reactor module according to the first embodiment.
Figure 16:
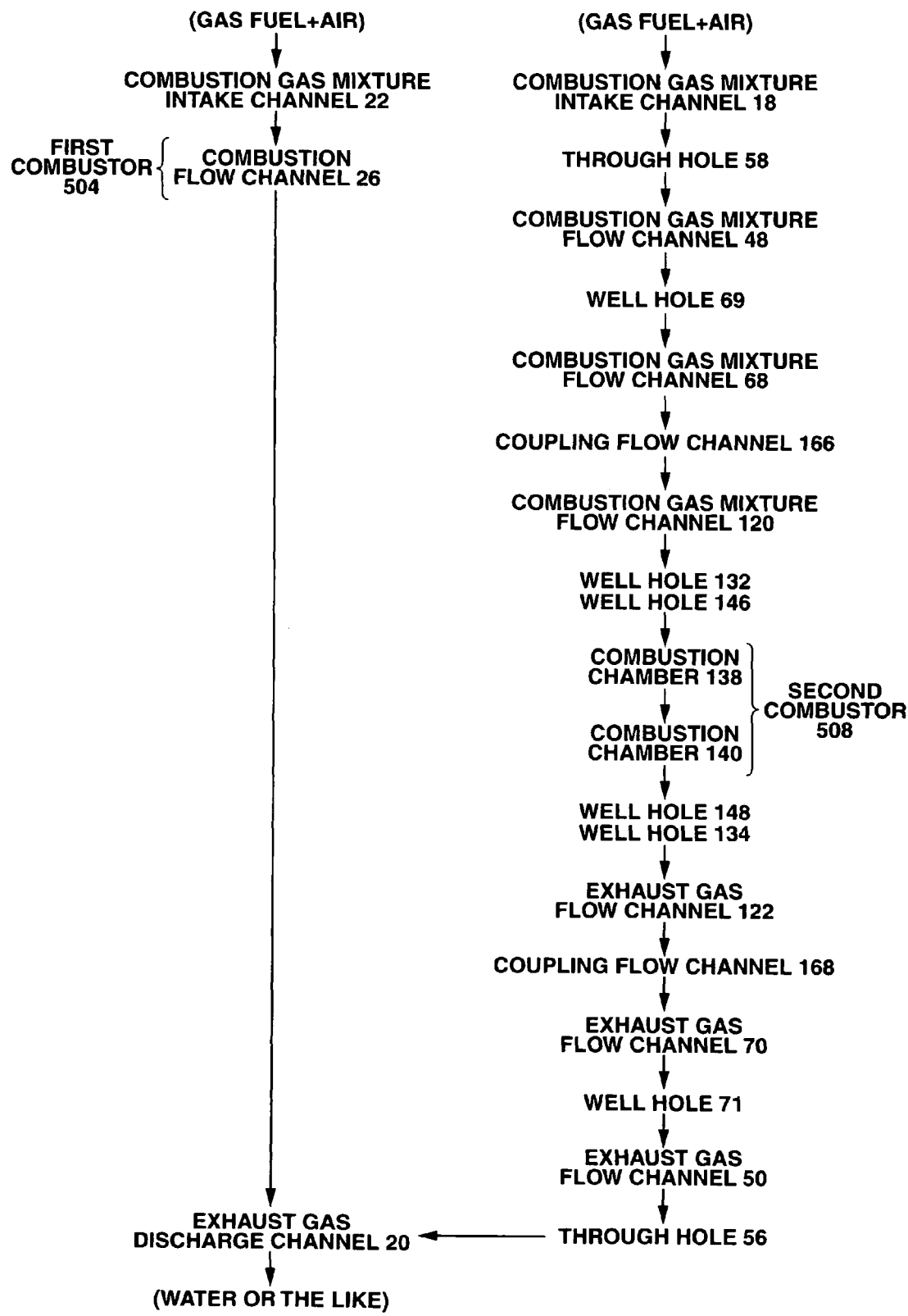
FIG. 16 is a view showing a channel from supply of combustion gas mixture made of a gas fuel and an air to discharge of water or the like that is a product, in the micro-reactor module according to the first embodiment.

FIG. 15 is a view showing a channel from supply of a liquid fuel and water to discharge of a hydrogen rich gas that is a product, in a micro-reactor module according to the first embodiment. FIG. 16 is a view showing a channel from supply of a combustion gas mixture made of a gas fuel and an air to discharge of water or the like that is a product, in the micro-reactor module according to the first embodiment.

Now, a description will be given with respect to a correlation of FIGS. 15, 16, and FIG. 4. The vaporization intake channel 14 corresponds to a flow channel of a vaporizer 502; the reforming flow channels 116, 118, and 128 correspond to a flow channel of the first reformer 506; the reforming flow channel 150 corresponds to a flow channel of the second reformer 510; a path from a start end of the carbon monoxide removal flow channel 84 to a terminal end of a carbon monoxide removal flow channel 46 corresponds to a flow channel of the carbon monoxide removing unit 512; the combustion flow channel 26 corresponds to a flow channel of the first combustor 504; and the combustion chambers 138 and 140 correspond to a flow channel of the second combustor 508.

As shown in FIGS. 2 and 5, an insulation film such as silicon nitride or silicon oxide which is not shown is fully formed, for example, on a bottom face of the low temperature reaction unit 6, namely, on a bottom face of the base plate 28; on a bottom face of the high temperature reaction unit 4, namely, on a bottom face of the base plate 102, and on a bottom face of the coupling portion 8, and a heating wire 170 is patterned in a wobble state on a bottom face of an insulation film at the side of the low temperature reaction unit 6.

A heating wire 172 is patterned in a zigzag state on a bottom face of an insulation film from the low temperature reaction unit 6 to the high temperature reaction unit 4 through the coupling portion 8. An insulation film such as silicon nitride or silicon oxide which is not shown is formed on a side face of the external flow pipe 10 and on a surface of the combustor plate 12, and a heating wire 174 is patterned from a bottom face of the low temperature reaction unit 6 to the side face of the external flow pipe 10 through the surface of the combustor plate 12. The heating wires 170, 172, and 174 are laminated in the order of an anti-diffusion layer, and an exothermic layer from the insulation film side. The exothermic layer is made of a material (for example, Au) having the lowest resistance among the three layers. When a voltage is applied to the heating wires 170, 172, and 174, a current intensively flows, and heat is generated. In the anti-diffusion layer, even if the heating wires 170, 172, and 174 are heated, a material for the exothermic layer is hardly thermally diffused into the anti-diffusion layer. In addition, a material for the anti-diffusion layer hardly thermally diffuses in the exothermic layer. Therefore, it is preferable to use a substance (for example, W) having a comparatively high melting point and low reaction property. In addition, in the case where the anti-diffusion layer is low in adhesiveness and is easily released with respect to the insulation film, an adhesive layer may be further provided between the insulation film and the anti-diffusion layer, and the adhesive layer is made of a material (for example, Ta, Mo, Ti, Cr) having excellent adhesiveness with respect to the diffusion proof property later and with respect to the insulation film. The heating wire 170 heats the low temperature reaction unit 6 at the time of startup; the heating wire 172 heats the high temperature reaction unit 4 and the coupling portion 8 at the time of startup; and the heating wire 174 heats the vaporizer 502 and the first combustor 504 of the supply/discharge unit 2. Then, when the second combustor 508 is combusted by means of an off gas containing hydrogen from a fuel cell, the heating wire 172 heats the high temperature reaction unit 4 and the coupling portion 8 as an assistance of the second combustor 508. Similarly, in the case where the first combustor 504 is combusted by means of an off gas containing hydrogen from a fuel cell, the heating wire 170 heats the low temperature reaction unit 6 as an assistance of the first combustor 504.

The heating wires 170, 172, and 174 also function as temperature sensors that read a change of a temperature from a change of a resistance value because an electrical resistance changes depending on temperature. Specifically, the temperatures of the heating wires 170, 172, and 174 are proportional to an electrical resistance. Terminals of any of the heating wires 170, 172, and 174 are positioned on a bottom face of the base plate 28, and ends thereof are arranged so as to surround the combustor plate 12. Lead wires 176 and 178 are connected, respectively, at both ends of the heating wire 170. Lead wires 180 and 182 are connected, respectively, at both ends of the heating wire 172, and lead wires 184 and 186 are connected, respectively, at both ends of the heating wire 174. In FIG. 3, for clarity, the heating wires 170, 172, and 174, and the lead wires 176, 178, 180, 182, 184, and 186 are not shown.

Now, a description will be given with respect to a heat insulation structure for restricting a thermal loss of the micro-reactor module 1A in the present embodiment.

Figure 17:
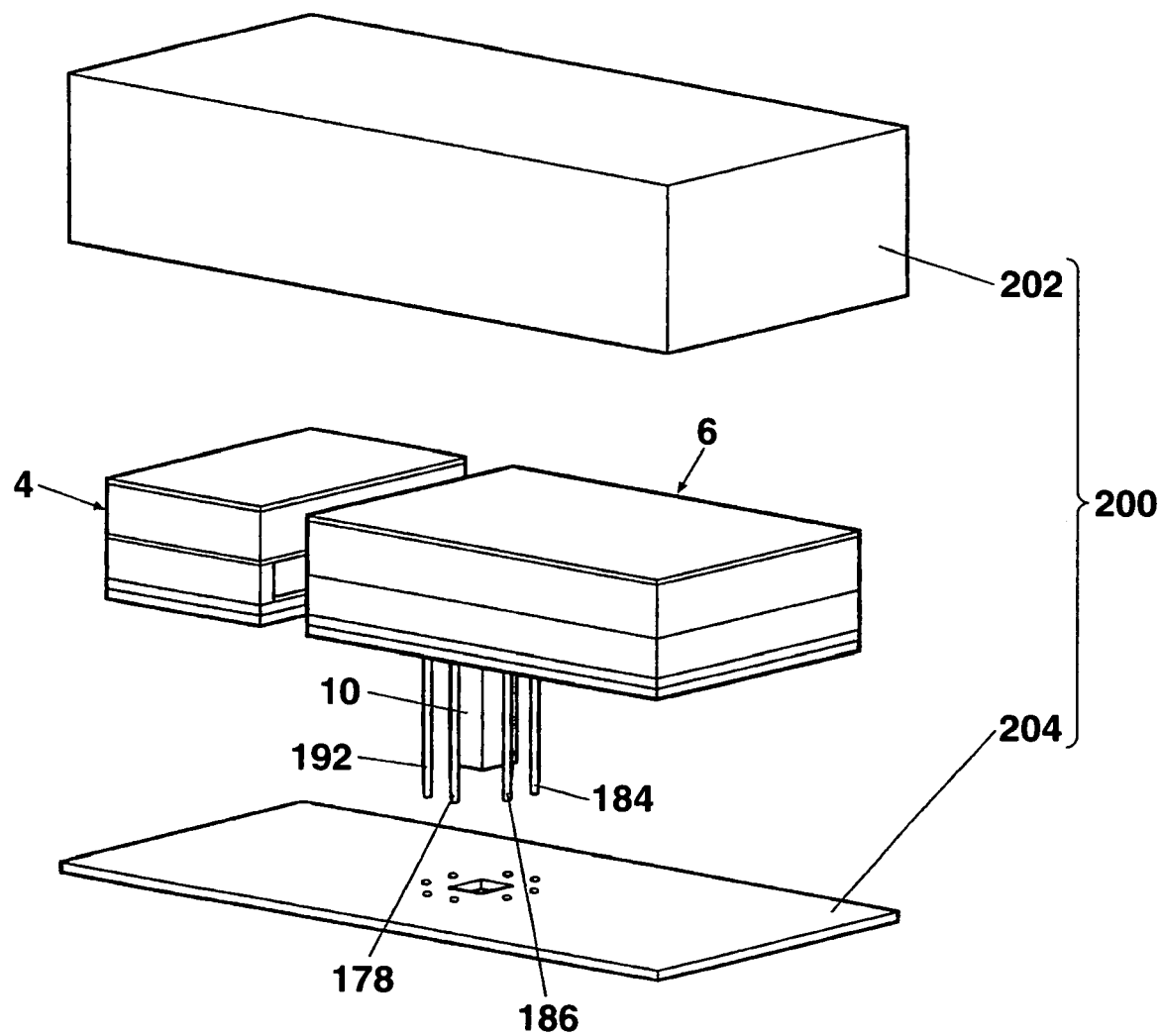
FIG. 17 is an exploded perspective view of an insulating package that covers the micro-reactor module according to the first embodiment.
Figure 18:
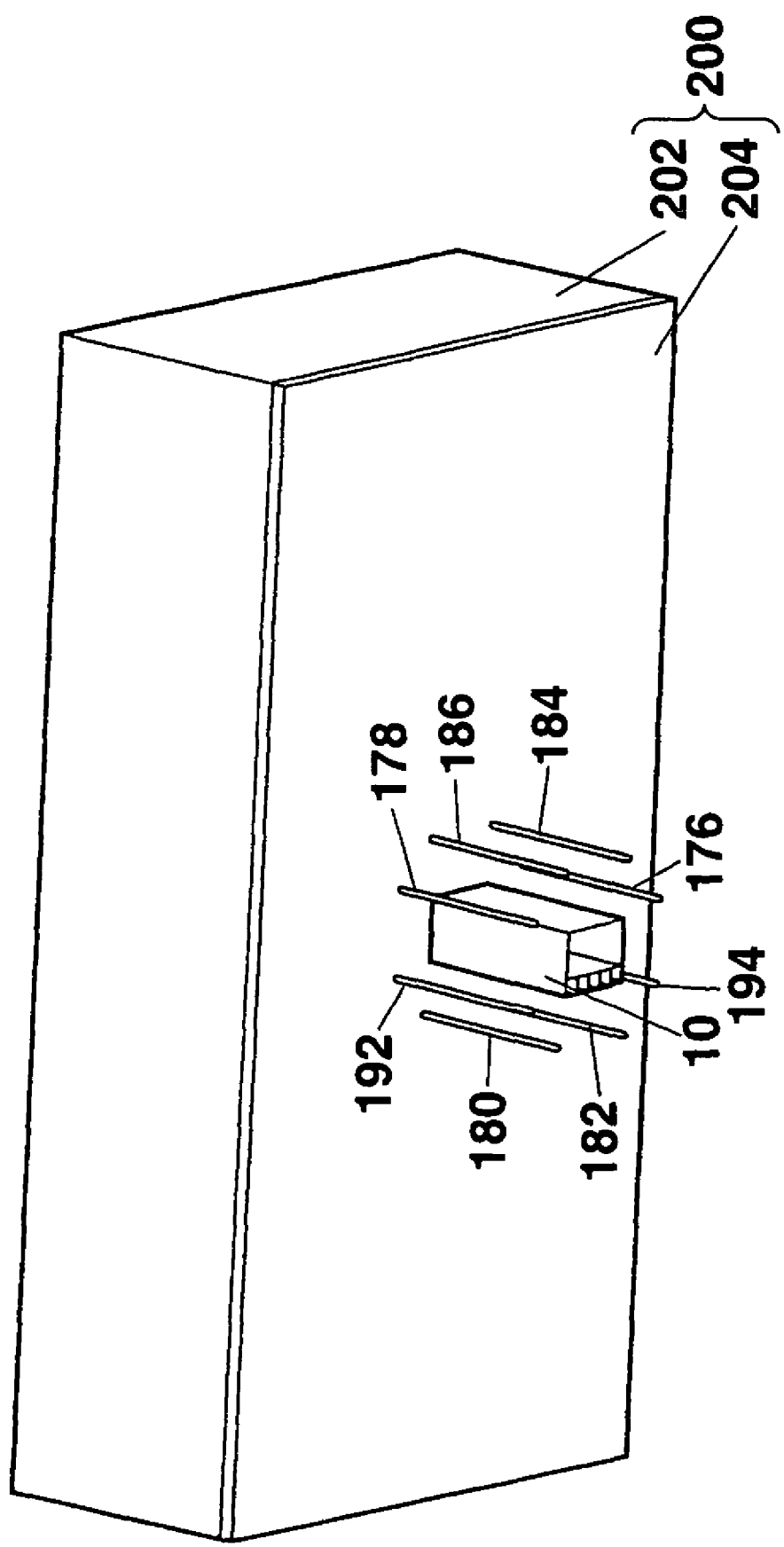
FIG. 18 is a perspective view showing obliquely downwardly a heat-insulating package in the first embodiment.

FIG. 17 is an exploded perspective view of an insulating package covering the micro-reactor module 1A in the first embodiment. FIG. 18 is a perspective view obliquely downwardly showing an insulating package in the first embodiment.

As shown in FIGS. 17 and 18, a heat-insulating package (insulating container) 200 is configured so as to cover a whole micro-reactor module 1A. Thus, the high temperature reaction unit 4, the low temperature reaction unit 6, and the coupling portion 8 are housed in the insulating package 200. The insulating package 200 is composed of a rectangle-shaped box body 202 whose bottom face opens; and a close plate 204 for closing a bottom face opening of the box body 202, and the close plate 204 is joined with the box body 202, and, for example, is sealed with a glass material or an insulation sealing material. The box body 202 and the close plate 204 are made of a planar metal material such as a stainless steel, for example. Metal reflection films made of, for example, aluminum, gold, or silver, may be respectively formed on faces that form the inside of the box body 202 and the close plate 204. When such a metal reflection film is formed, a thermal loss caused by irradiation from the supply/discharge unit 2, the high temperature reaction unit 4, the low temperature reaction unit 6, and the coupling portion 8 can be restricted.

In a state in which a plurality of holes penetrate the close plate 204, and then, the external flow pipe 10 and the lead wires 176, 178, 180, 182, 184, 186, 192, and 194 are inserted through their respective through holes, part of them is exposed to the outside from the insulating package 200. The through holes of the external flow pipe 10, the lead wires 176, 178, 180, 182, 184, and 186, and the close plate 204 are joined and sealed with a glass material or an insulation sealing material, for example, so that external air does not invade the insulating package 200 from a portion exposed to the outside.

An internal space of the insulating package 200 is hermetically sealed, and vacuum-evacuated so that the internal pressure is equal to or smaller than an atmospheric pressure, preferably, equal to or smaller than 1 Torr, and is structured to be vacuum heat-insulated. In this manner, the heat at each section of the micro-reactor module 1A is restricted from being transmitted to the outside, whereby thermal loss can be reduced.

The external flow pipe 10 is established in a state protruding to the inside and outside of the insulating package 200. Therefore, at the inside of the insulating package 200, the external flow pipe pant is established as a column in a state erected against the close plate 204; the high temperature reaction unit 4, the low temperature reaction unit 6, and the coupling portion 8 are supported by the external flow pipe 10; and the high temperature reaction unit 4, the low temperature reaction unit 6, and the coupling portion 8 are spaced from an internal face of the insulating package 200. In addition, it is desirable that the external flow pipe 10 be connected to the bottom face of the low temperature reaction unit 6 in gravity of a whole high temperature reaction unit 4, low temperature reaction unit 6, and coupling portion 8 in planar viewing.

As shown in FIGS. 3 and 5, a getter material 188 may be provided in the insulating package 200. The getter material 188 is activated by being heated, and has an adsorptive action. This getter material adsorbs the gas that remains in an internal space of the insulating package 200; the gas that leaks from the micro-reactor module 1A to the internal space of the insulating package 200; and the gas having invaded the insulating package 200 from the outside. In this manner, the gas invades the internal space of the insulating package 200, and suppresses the impairment of the degree of vacuum and the lowering of the heat insulation effect. A heater such as an electric heat material is provided at this getter material 188, and a wiring 190 is connected to this heater. Both ends of the wiring 190 are positioned on a bottom face of the base plate 28 at the periphery of the combustor plate 12, and lead wires 192 and 194 are connected, respectively, at both ends of the wiring 190. As a material for the getter material 188, for example, there is exemplified an alloy consisting essentially of zirconium, barium, or thianium, for example. In FIG. 3, for clarity, the lead wires 192 and 194 are not shown. In FIGS. 3 and 5, although the getter material 188 is provided on a surface of the low temperature reaction unit 6, the position of providing the getter material 188 is not limited in particular as long as it is inside the insulating package 200.

Now, a description will be given with respect to an operation of the micro-reactor module 1A in the present embodiment.

First, when a voltage is applied between the lead wires 192 and 194, the getter material 188 is heated by means of the heater, and the getter material 188 is activated. In this manner, the residual gas in the insulating package 200 is adsorbed by the getter material 188, the degree of vacuum in the insulating package 200 is improved, and the heat insulation efficiency is improved.

In addition, when a voltage is applied between the lead wires 176 and 178, the electrical heat wire 170 generates heat, and thus the low temperature reaction unit 6 is heated. When a voltage is applied between the lead wires 180 and 182, the heating wire 172 generates heat, and thus the high temperature reaction unit 4 is heated. When a voltage is applied between the lead wires 184 and 186, the heating wire 174 generates heat and thus, the supply/discharge unit 2, mainly, the top part of the external flow pipe 10 is heated. The supply/discharge unit 2, the high temperature reaction unit 4, the low temperature reaction unit 6, and the coupling portion 8 are made of a metal material, and thus, thermal conduction easily occurs among these elements. The current/voltage of the heating wires 170, 172, and 174 is measured by means of a control device, whereby the temperatures of the supply/discharge unit 2, the high temperature reaction unit 4, and the low temperature reaction unit 6 are measured; the measured temperatures are fed-back to the control device; and the voltages of the heating wires 170, 172, and 174 are controlled by means of the control device. In this manner, temperature control of the supply/discharge unit 2, the high temperature reaction unit 4, and the low temperature reaction unit 6 is made.

In a state in which the supply/discharge unit 2, the high temperature reaction unit 4, and the low temperature reaction unit 6 are heated by means of the heating wires 170, 172, and 174, when a liquid mixture of a liquid fuel and water is continuously or intermittently supplied to the vaporization intake channel 14 by means of an external pump or the like, the liquid mixture is absorbed by a liquid absorptive material. Then, the liquid mixture penetrates toward the top of the vaporization intake channel 14 due to a capillary phenomenon. Because the liquid absorptive material is filled up to the height of the combustor plate 12, the liquid mixture in the liquid absorptive material vaporizes, and the gas mixture of a fuel and water vaporizes from the liquid absorptive material. Because the liquid mixture vaporizes in the liquid absorptive material, rapid boiling can be restricted, and stable vaporization can be achieved.

Then, the gas mixture vaporized from the liquid absorptive material flows into the first reformer 506 (reforming flow channels 116, 118, and 128) through the through hole 52, the gas mixture flow channel 38, the coupling flow channel 162, and the supply flow channel 114. Then, the gas mixture flows into the second reformer 510 (reforming flow channel 150). When the gas mixture flows through the reforming flow channels 116, 118, 128, and 150, the gas mixture is heated, and then, a hydrogen gas or the like is generated by catalytic reaction. (In the case where a fuel is methanol, reference should be made to the above chemical reaction formulas (1) and (2)).

The gas mixture (containing hydrogen gas, carbon dioxide gas, and carbon monoxide gas) generated by the first reformer 506 and the second reformer 510 flows into the mixture flow channel 40 through well holes 156, 144, 130, and 124, the exhaust flow channel 115, and the coupling flow channel 164. On the other hand, air is supplied to the air intake channel 16 by means of a pump or the like, the supplied air flows into the mixture flow channel 40, and then, the gas mixture such as hydrogen gas and air are mixed with each other.

Then, the gas mixture containing an air, a hydrogen gas, a carbon monoxide gas, and a carbon dioxide gas or the like flows into the carbon monoxide remover 512 from the mixture flow channel 40 through the well holes 66, 82, and 88 (from the carbon monoxide removal flow channel 84 to the carbon monoxide removal flow channel 46). When the gas mixture flows through the carbon monoxide removal flow channel 46 from the carbon monoxide removal flow channel 84, the carbon monoxide gas contained in the gas mixture is selectively oxidized, and the carbon monoxide gas is removed. Here, the carbon monoxide gas does not react uniformly from the carbon monoxide removal flow channel 84 to the carbon monoxide removal flow channel 46, and a reaction speed of the carbon monoxide gas becomes high in the downstream of the flow channels from the carbon monoxide removal flow channel 84 to the carbon monoxide removal flow channel 46 (mainly from the carbon monoxide removal flow channel 80 to the carbon monoxide removal flow channel 46). The oxidization reaction of the carbon monoxide gas is a heat generation reaction, and thus, heat is mainly generated at a portion from the carbon monoxide removal flow channel 80 to the carbon monoxide removal flow channel 46. The external flow pipe 10 is positioned beneath this portion, and thus, the heat caused by the oxidization reaction of the carbon monoxide gas is effectively used for vaporization heat of water and fuel in the vaporizer 502 together with the heat of the first combustor 504.

Then, the gas mixture in a state in which carbon monoxide has been removed is supplied to a fuel pole or the like of a fuel cell through the through hole 54 and the hydrogen discharge channel 24. In the fuel cell, electricity is generated by means of an electrochemical reaction of hydrogen gas supplied from the hydrogen discharge channel 24, and the off gas containing an unreacted hydrogen gas is discharged from the fuel cell.

The above-described operation is an operation at an initial stage, and, during the subsequent power generation operation, the liquid mixture is continuously supplied to the vaporization intake channel 14. Then, air is mixed with the off gas discharged from the fuel cell, and then, the gas mixture (hereinafter, referred to as a combustion gas mixture) is supplied to the combustion gas mixture intake channel 22 and the combustion gas mixture intake channel 18. The combustion gas mixture supplied to the combustion gas mixture intake channel 22 flows into the combustion flow channel 26 of the first combustor 504, the combustion gas mixture is combusted, and a combustion heat is generated. The combustion flow channel 26 peripherally surrounds the external flow pipe 10 downwardly of the low temperature reaction unit 6. Thus, the external flow pipe 10 is heated by means of the combustion heat, and the low temperature reaction unit 6 is heated. Thus, the power supplied to the heating wires 170 and 174 can be reduced, and then, energy utilization efficiency is improved.

On the other hand, the combustion gas mixture supplied to the combustion gas mixture intake channel 18 flows into the combustion chambers 138 and 140 of the second combustor 508, and the combustion gas mixture is combusted. In this manner, the combustion heat is generated. The first reformer 506 is disposed beneath the combustion chambers 138 and 140, and the second reformer 510 is disposed on the combustion chambers 138 and 140. Thus, the first reformer 506 and the second reformer 510 are heated by means of a combustion heat. The second combustor 508 is vertically sandwiched between the first reformer 506 and the second reformer 510. Thus, this combustor can be thermally transmitted efficiently in a planar direction and a portion exposed to a space sealed with the insulating package 200 is small, and thus, thermal loss is reduced. In addition, in this manner, the power supplied to the heating wire 172 can be reduced, and energy utilization efficiency is improved.

Part of the liquid fuel reserved in a fuel container is vaporized, whereby the combustion gas mixture of the vaporized fuel and air may be supplied to the combustion gas mixture intake channels 18 and 22.

In a state in which the liquid mixture has been supplied to the vaporization intake channel 14 and in a state in which the combustion gas mixture has been supplied to the combustion gas mixture intake channels 18 and 22, the control device controls applying voltages of the heating wires 170, 172, and 174 and controls the pump or the like while a temperature is measured by the resistance value of the heating wires 170, 172, and 174. When the pump is controlled by means of the control device, the flow rate of the combustion gas mixture supplied to the combustion gas mixture intake channels 18 and 22 is controlled, whereby a combustion heat rate of the combustors 504 and 508 is controlled. The control device thus controls the heating wires 170, 172, and 174, and the pump, whereby temperature control of the supply/discharge unit 2, the high temperature reaction unit 4, and the low temperature reaction unit 6 is made, respectively. Here, temperature control is made so that the high temperature reaction unit 4 becomes 250° C. to 400° C., preferably 300° C. to 380° C.; the low temperature reaction unit 6 becomes a temperature lower than that of the high temperature reaction unit 4, specifically, from 120° C. to 200° C., more preferably from 140° C. to 180° C.

Now, a description will be given with respect to an example of specific dimensions and constituent elements of each unit of the reacting device in the present invention.

The high temperature reaction unit 4, for example, is formed in approximate size of 16 mm in width, 10 mm in length, and 6 mm in height. Here, the thickness of the second combustor 508 in a height direction of the high temperature reaction unit 4 is set in about 0.3 mm, for example. The coupling portion 8 is formed in size of 33 mm in length and 1 mm in height and width, for example. The low temperature reaction unit 6 is formed in approximate size of 16 mm in width, 23 mm in length, and 6 mm in height. The external flow pipe 10 in the supply/discharge unit 2 is formed in 7 to 8 mm in length and 2 to 3 mm in vertical and horizontal lengths, for example. The insulating package 200 is formed in 9 to 10 mm in height, 20 mm in width, and 40 mm in length, for example. In addition, a metal material forming the high temperature reaction unit 4, the low temperature reaction unit 6, the coupling portion 8, the external flow pipe 10, and the combustor plate 12 or the like is made of a stainless steel SUS304 having thickness of about 0.1 mm to 0.2 mm. The insulating package 200, for example, is made of stainless steel SUS304 having thickness of about 0.5 mm. With such a configuration, when power of the heating wire 170 is 15 W, and the power of the heating wire 172 is 25 W, the high temperature reaction unit 4 can be heated to 375° C. and the low temperature reaction unit 6 to 150° C. in about 9 to 10 seconds, and startup can be achieved within a comparatively short time.

As described above, according to the present embodiment, an internal space of the insulating package 200 is provided as a heat insulation space. The high temperature reaction unit 4 is spaced from the low temperature reaction unit 6, and a gap from the high temperature reaction unit 4 to the low temperature reaction unit 6 is provided as a length of the coupling portion 8. Therefore, a heat transmission channel from the high temperature reaction unit 4 to the low temperature reaction unit 6 is limited to the coupling portion 8, and heat transmission to the low temperature reaction unit 6 that does not require a high temperature is limited. In particular, the height and width of the coupling portion 8 are smaller than those of the high temperature reaction unit 4 and the low temperature reaction unit 6 so that heat transmission through the coupling portion 8 is reduced to the minimum. Thus, a thermal loss of the high temperature reaction unit 4 can be restricted and the low temperature reaction unit 6 can be restricted from being equal to or greater than a set temperature. That is, even in the case where the high temperature reaction unit 4 and the low temperature reaction unit 6 are housed in one insulating package 200, a temperature difference between the high temperature reaction unit 4 and the low temperature reaction unit 6 can be generated.

In addition, the coupling flow channels 162, 164, 166, and 168 are assembled in one coupling portion 8, so that a stress generated with the coupling portion 8 or the like can be reduced. Namely, there is a temperature difference between the high temperature reaction unit 4 and the low temperature reaction unit 6, so that the high temperature reaction unit 4 expands more significantly than the low temperature reaction unit 6. However, the high temperature reaction unit 4 is provided as a free end other than a coupling portion with the coupling portion 8 so that a stress generated with the coupling portion 8 or the like can be restricted. In particular, the coupling portion 8 is smaller than the high temperature reaction unit 4 and the low temperature reaction unit 6 in height and width. Further, the coupling portion 8 is connected to the high temperature reaction unit 4 and the low temperature reaction unit 6 at the center parts in the widthwise direction of the high temperature reaction unit 4 and the low temperature reaction unit 6 so that stress on the coupling portion 8, the high temperature reaction unit 4, and the low temperature reaction unit 6 can be restricted.

One external flow pipe 10 is connected even between the low temperature reaction unit 6 and the insulating package 200, so that a stress generated with the external flow pipe 10 or the like can be reduced.

Assuming that the flow channels 162, 164, 166, and 168 are provided as individual connection pipes, and then, they are bridged between the high temperature reaction unit 4 and the low temperature reaction unit 6 in a state in which these connection pipes are spaced from each other, a stress is generated with these connection pipes, low temperature reaction unit 6, and high temperature reaction unit 4 due to a displacement difference between the low temperature reaction unit 6 and the high temperature reaction unit 4. In addition, a temperature difference between a high temperature time and a low temperature time of the high temperature reaction unit 4 is greater than that between a high temperature time and a low temperature time of the low temperature reaction unit 6. Thus, when an external flow pipe is disposed at the side of the high temperature reaction unit 4, thermal expansion and contraction of pipes are greater than those of pipes when the external flow pipe is disposed at the side of the low temperature reaction unit 6. Thus, air tightness in the insulating package 200 is easily degraded. In the present embodiment, the generation of such a stress is restricted so that air tightness can be well maintained.

Although the external flow pipe 10 and the lead wires 176, 178, 180, 182, 184, 186, 192, and 194 extend to the outside of the insulating package 200, all of the pipe and wires are connected to the low temperature reaction unit 6. Thus, direct heat generation from the high temperature reaction unit 4 to the outside of the insulating package 200 can be restricted, and a thermal loss of the high temperature reaction unit 4 can be restricted. Therefore, even in the case where the high temperature reaction unit 4 and the low temperature reaction unit 6 are housed in one insulating package 200, a temperature difference can be generated between the high temperature reaction unit 4 and the low temperature reaction unit 6. In particular, the vaporization intake channel 14, the air intake channel 16, the combustion gas mixture intake channel 18, the exhaust gas discharge channel 20, the combustion gas mixture intake channel 22, and the hydrogen discharge channel 24 are provided in one external flow pipe 10. Thus, a surface area exposed to the outside is restricted so that heat generation to the outside of the insulating package 200 can be restricted and thermal loss can be restricted.

A bottom face of the coupling portion 8, a bottom face of the high temperature reaction unit 4, and a bottom face of the low temperature reaction unit 6 are positioned on the same plane. Thus, the heating wire 172 can be patterned comparatively easily, and disconnection of the heating wire 172 can be restricted.

In addition, a liquid absorptive material is filled in the vaporization intake channel 14 of the external flow pipe 10, and thus the vaporization intake channel 14 is provided as the vaporizer 502. Thus, while downsizing and simplification of the micro-reactor module 1A is achieved, a temperature condition required for vaporization of liquid mixture can be established (i.e., a state in which a top part of the vaporization intake channel 14 becomes 120° C. can be established, for example).

In addition, the combustor plate 12 is provided at the periphery of the external flow pipe 10 at an upper end of the external flow pipe 10. Further, a liquid absorptive material in the vaporization intake channel 14 is filled up to a height of the combustor plate 12. Thus, the combustion heat in the first combustor 504 can be effectively used for vaporization of a liquid mixture.

In addition, a structure is provided such that the second combustor 508 is sandwiched between the first reformer 506 and the second reformer 510. Thus, a combustion heat of the second combustor 508 is uniformly transmitted to the first reformer 506 and the second reformer 510. No temperature difference is generated between the first reformer 506 and the second reformer 510, so that temperature non-uniformity can be reduced.

Since the partition walls for partitioning a flow channel are comparatively thin at any portion of the supply/discharge unit 2, the high temperature reaction unit 4, the low temperature reaction unit 6, and the coupling portion 8, heat capacity of these portions can be made small. At an initial stage of operation, the supply/discharge unit 2, the high temperature reaction unit 4, the low temperature reaction unit 6, and the coupling portion 8 can be heated from a room temperature to a high temperature. Further, power supplied to the heating wires 170, 172, and 174 can be reduced.

The present invention is not limited to the above-described embodiment, and a variety of modifications and design changes may be made without departing from the spirit of the invention.

For example, although a combustor (second combustor 508) has been used as a heating unit in the above-described embodiment, a heating wire coated with an insulation film may be provided as a heating unit between the first reformer 506 and the second reformer 510. Then, power may be supplied to the heating wire so that a heat may be generated.

Alternatively, both of the combustor and the heating wire may be provided between the first reformer 508 and the second reformer 510.

Second Embodiment

Now, a description will be given with respect to a second embodiment of a reacting device according to the present invention.

Here, identical or like constituent elements of the above-described first embodiment are designated by identical or like reference numerals. A description will be briefly given or omitted.

Figure 19:
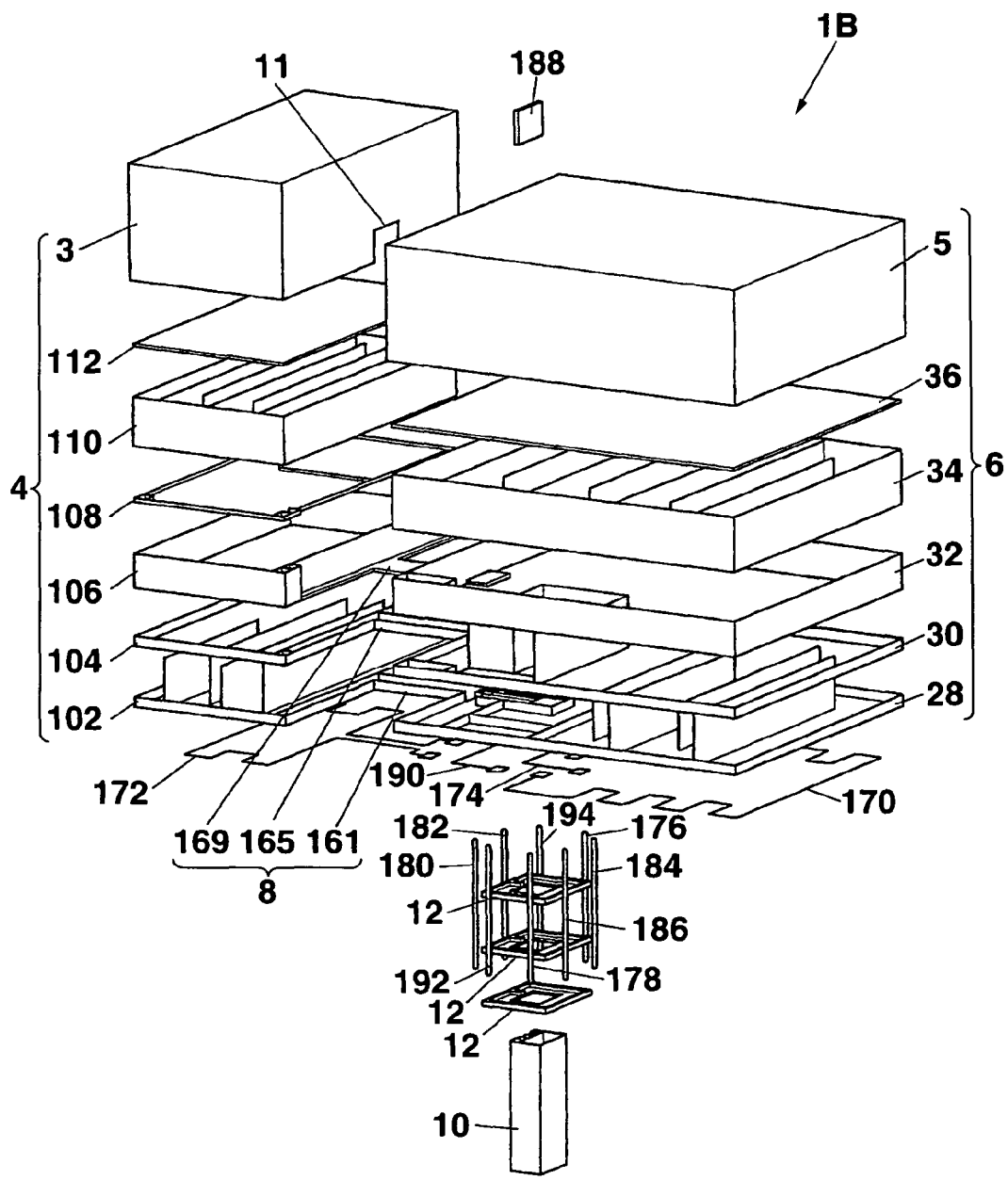
FIG. 19 is an exploded perspective view of a micro-reactor module in a second embodiment.
Figure 20:
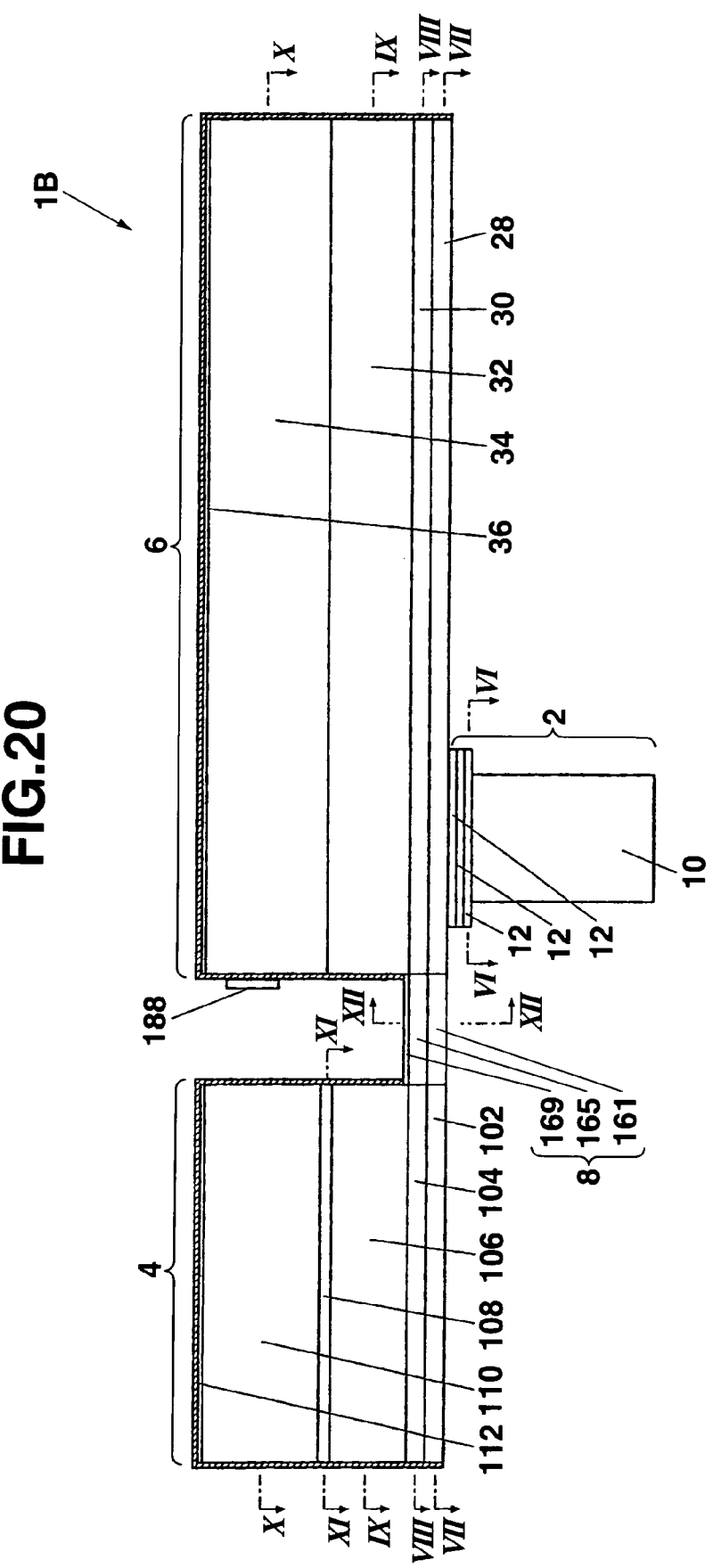
FIG. 20 is a side view of the micro-reactor module in the second embodiment.
Figure 21:
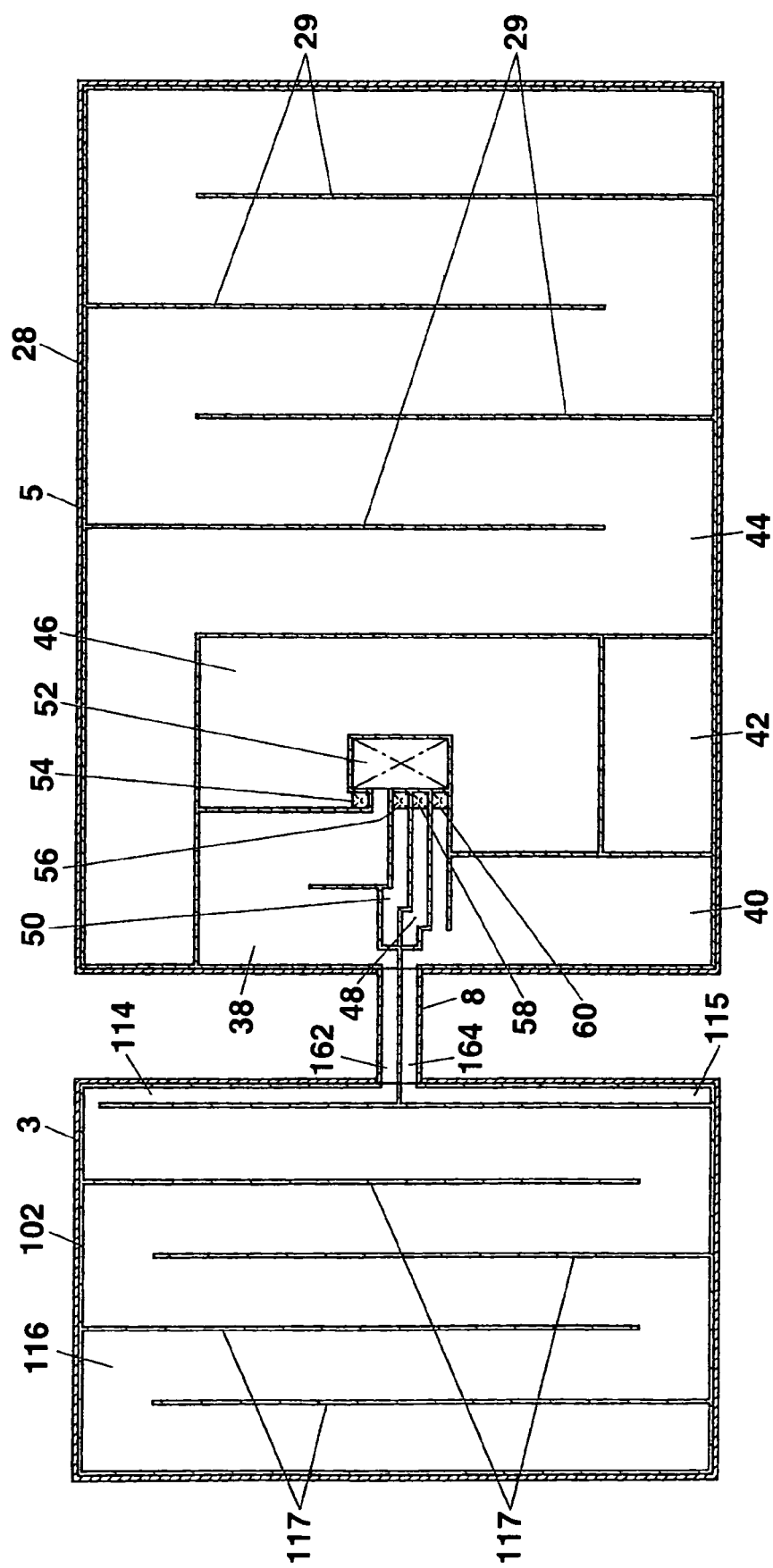
FIG. 21 is a sectional view taken along a planer direction of a base plate described later from the cut line VII-VII of FIG. 20.
Figure 22:
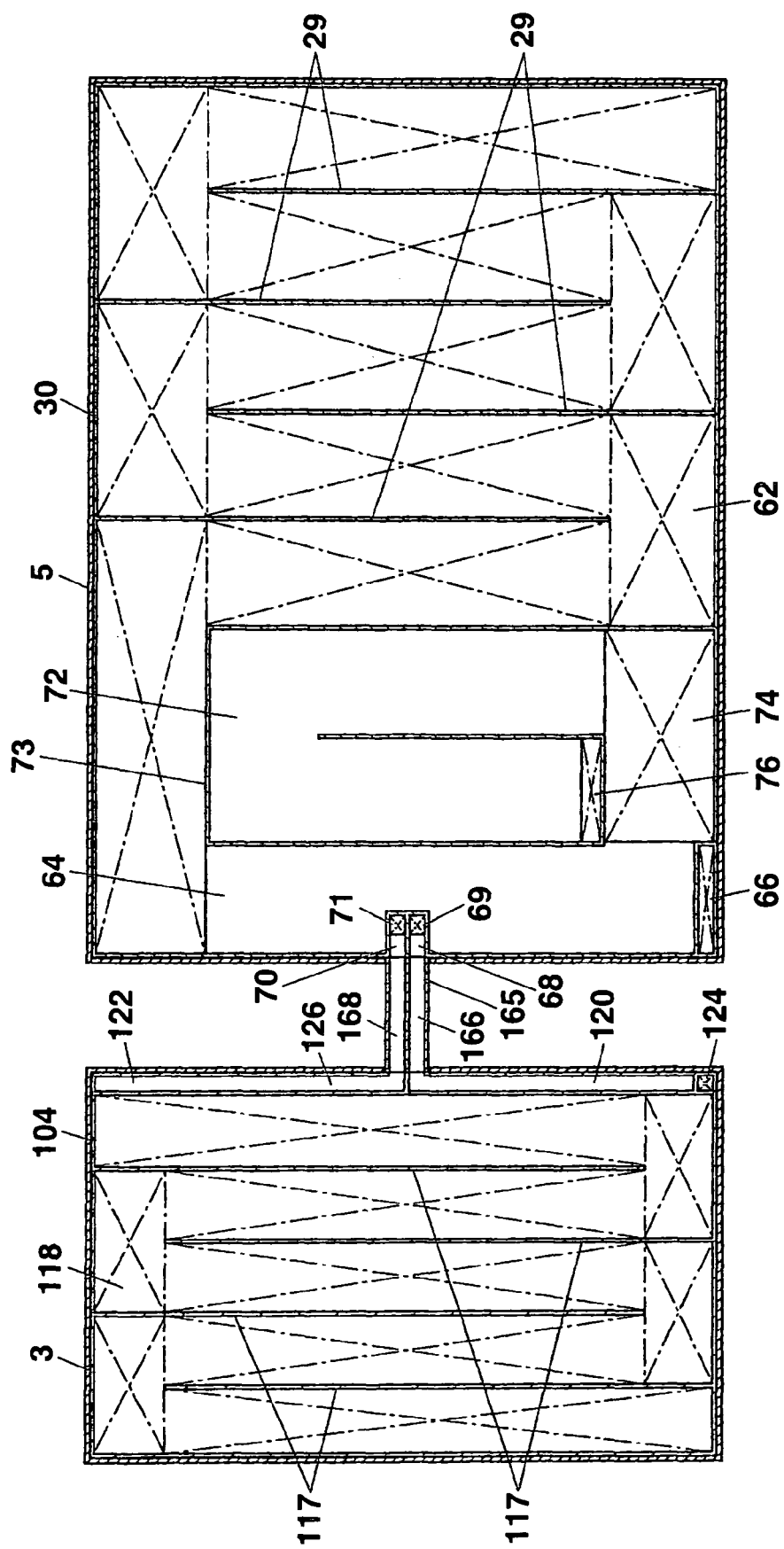
FIG. 22 is a sectional view taken along a planer direction of a lower frame described later from the cut line VIII-VIII of FIG. 20.
Figure 23:
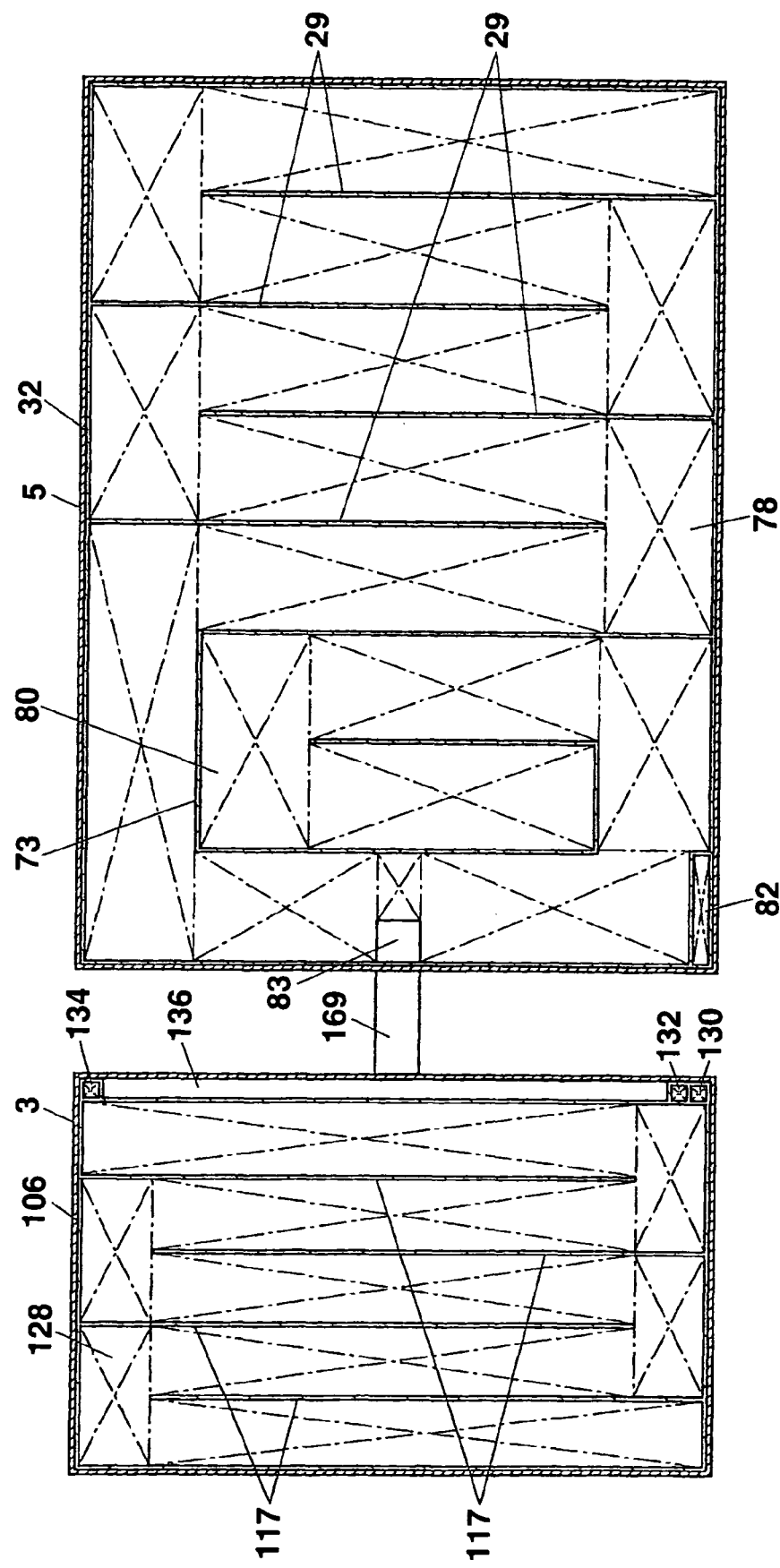
FIG. 23 is a sectional view taken along a planer direction of a middle frame described later from the cut line IX-IX of FIG. 20.
Figure 24:
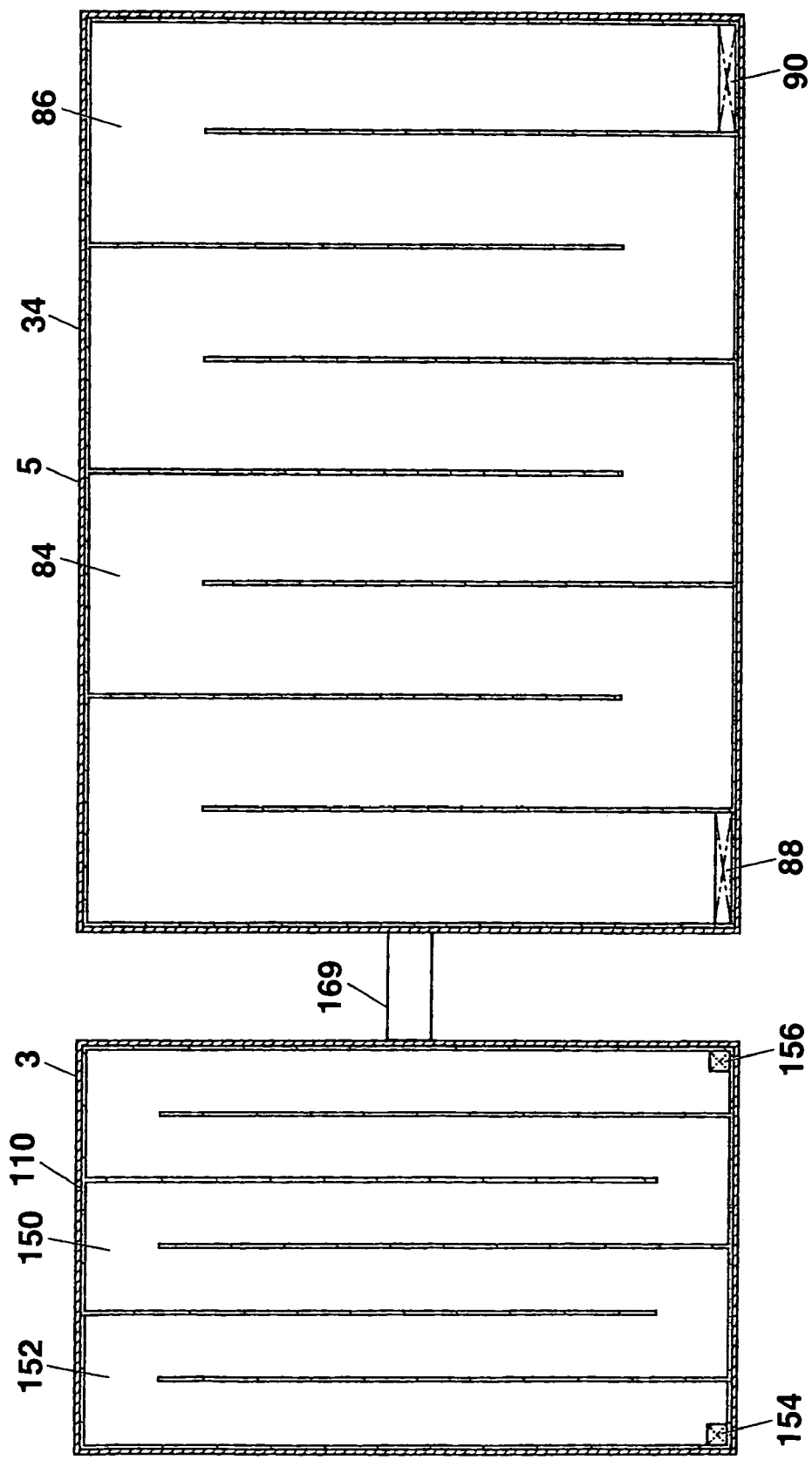
FIG. 24 is a sectional view taken along a planer direction of an upper frame described later from the cut line X-X of FIG. 20.
Figure 25:
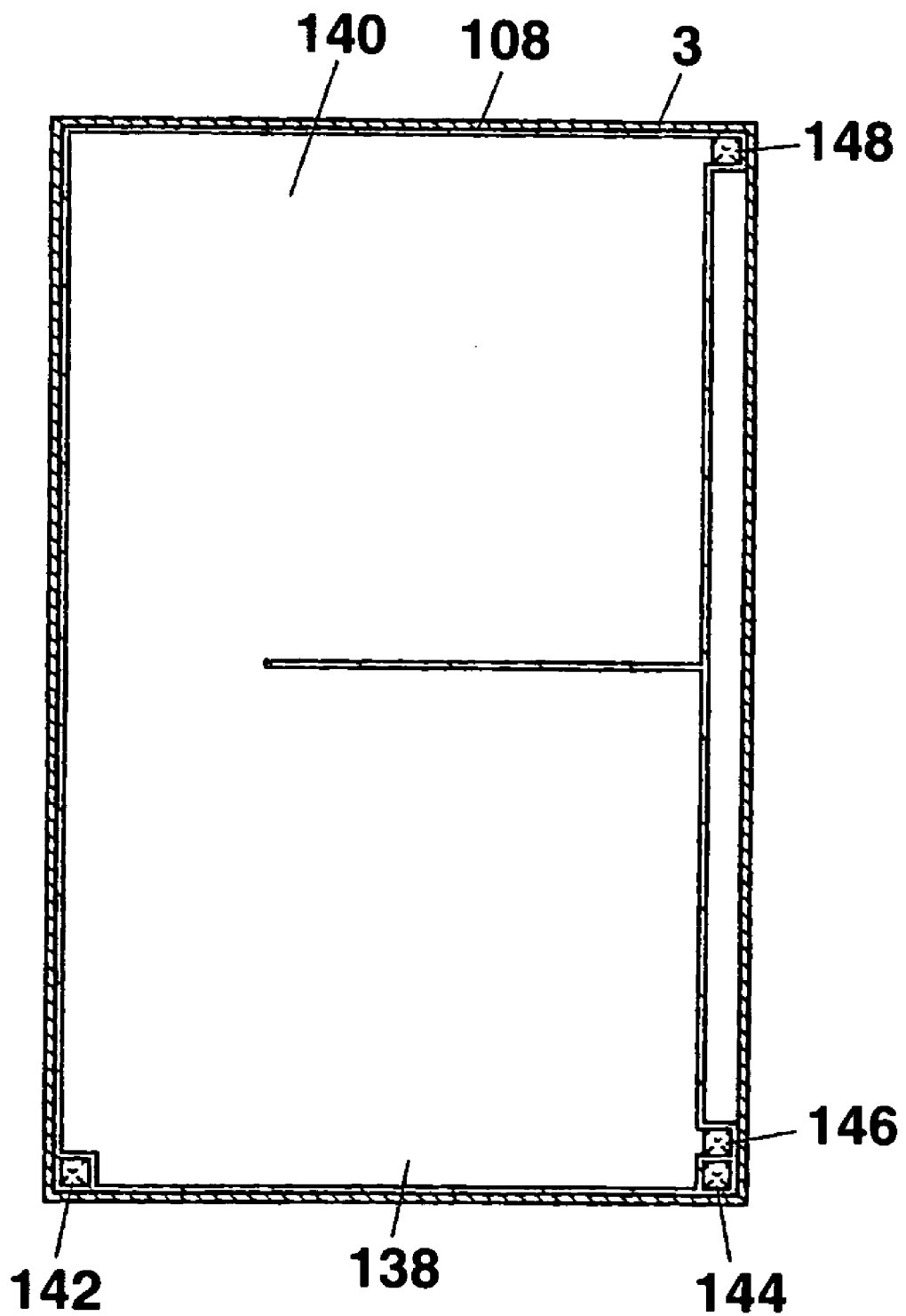
FIG. 25 is a sectional view of a face taken along the cut line XI-XI of FIG. 20.
Figure 26:
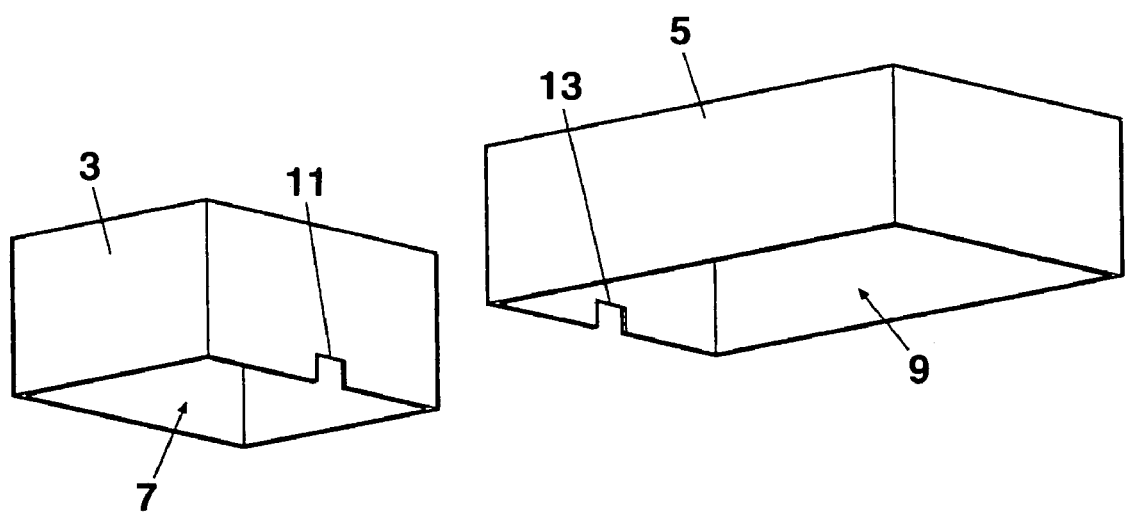
FIG. 26 is a perspective view obliquely downwardly showing a gas-leak-proof package in the second embodiment.

FIG. 19 is an exploded perspective view of a micro-reactor module in the second embodiment. FIG. 20 is a side view of the micro-reactor module in the second embodiment. FIG. 21 is a sectional view taken along a planer direction of a base plate described later from the cut line VII-VII of FIG. 20. FIG. 22 is a sectional view taken along a planer direction of a lower frame described later from the cut line VIII-VIII of FIG. 20. FIG. 23 is a sectional view taken along a planer direction of a middle frame described later from the cut line IX-IX of FIG. 20. FIG. 24 is a sectional view taken along a planer direction of an upper frame described later from the cut line X-X of FIG. 20. FIG. 25 is a sectional view of a face taken along the cut line XI-XI of FIG. 20. FIG. 26 is a perspective view obliquely downwardly showing a gas leak proof package in the second embodiment.

A micro-reactor module 1B according to the second embodiment has a structure such that, a high temperature reaction unit 4 and a low temperature reaction unit 6 are covered, with gas leak proof packages (casings) 3 and 5, as shown in FIGS. 19 to 25, wherein, a micro-reactor module has a structure similar to the micro-reactor module 1A according to the above-described first embodiment.

The micro-reactor module 1B according to the present embodiment, like the micro-reactor module 1A according to the first embodiment, includes: a supply/discharge unit 2 for supplying a reaction material and discharging a product; the high temperature reaction unit (first reaction unit) 4 set at a comparatively high temperature so that a reforming reaction occurs; the low temperature reaction unit (second reaction unit) 6 set at a temperature lower than a set temperature of the high temperature reaction unit 4 so that a selective oxidization reaction occurs; and a coupling portion 8 for providing inflow or outflow of a reaction material or a product between the high temperature reaction unit 4 and the low temperature reaction unit 6.

As shown in FIGS. 19 and 20, the supply/discharge unit 2 includes: an external flow pipe 10 made of a planar metal material such as a stainless steel, for example; and three combustor plates 12 laminated around the external flow pipe 10. In the external flow pipe 10, there are provided: a vaporization intake channel 14; an air intake channel 16; a combustion gas mixture intake channel 18; an exhaust gas discharge channel 20; a combustion gas mixture intake channel 22; and a hydrogen discharge channel 24. The vaporization intake channel 14 is filled with a liquid absorptive material such as a felt material, a ceramic porous material, a fiber material, or a carbon porous material. The combustor plate 12 is also made of a planar metal material such as a stainless steel, for example, and a through hole is formed at a center part. The external flow pipe 10 is engaged with the through hole, and the eternal flow pipe 10 and the combustor plate 12 are joined with each other.

The low temperature reaction unit 6 includes a base plate 28, a lower frame 30, a middle frame 32, an upper frame 34, and a cover plate 36 which are laminated and bonded with each other in this order from the bottom. This reaction unit has a reaction container formed in the shape of a rectangular box. The base plate 28, the lower frame 30, the middle frame 32, the upper frame 34, and the cover plate 36 are made of a planar metal material such as a stainless steel, for example.

At the center part in the width direction of the base plate 28, the external flow pipe 10 and the top combustion plate 12 are joined with the bottom face of the base plate 28. As shown in FIG. 21, a partition wall is provided so as to protrude on a top face of the base plate 28, whereby the top face is partitioned into a gas mixture flow channel 38, the mixture flow channel 40, a carbon monoxide removal flow channel 42, a zigzag-shaped carbon monoxide removal flow channel 44, a U-shaped carbon monoxide removal flow channel 46, a combustion gas mixture flow channel 48, and an exhaust gas flow channel 50.

As shown in FIG. 22, a plurality of partition walls are provided inside the lower frame 30, whereby the inside of the lower frame 30 is partitioned into a zigzag-shaped carbon monoxide removal flow channel 62, a whirl-shaped carbon monoxide flow channel 64, a well hole 66, a combustion gas mixture flow channel 68, and an exhaust gas flow channel 70.

As shown in FIG. 23, a plurality of partition walls are provided inside the middle frame 32, whereby the inside of the middle frame 32 is partitioned into a zigzag-shaped carbon monoxide removal flow channel 78, a whirl-shaped carbon monoxide removal flow channel 80, and a well hole 82.

As shown in FIG. 24, a partition wall is provided inside the upper frame 34, whereby a zigzag-shaped carbon monoxide removal flow channel 84 is formed inside the upper frame 34.

As shown in FIGS. 19 and 20, the high temperature reaction unit 4 includes a base plate 102, a lower frame 104, a middle frame 106, a combustor plate 108, an upper frame 110, and a cover plate 112 which are laminated and bonded with each other in this order from the bottom. This reaction unit has a reaction container formed in a rectangular box shape. The base plate 102, the lower frame 104, the middle frame 106, the combustor plate 108, the upper frame 110, and the cover plate 112 are made of a planar metal material such as a stainless steel, for example.

As shown in FIG. 21, a partition wall is provided so as to protrude on a top face of the base plate 102, whereby the top face is partitioned into a supply flow channel 114, a zigzag-shaped reforming flow channel 116, and an exhaust flow channel 115. The supply flow channel 114 communicates with the reforming flow channel 116, however, the exhaust flow channel 115 is independent of the supply flow channel 114 and the reforming flow channel 116.

As shown in FIG. 22, a plurality of partition walls are provided inside the lower frame 104, whereby the inside of the lower frame 104 is partitioned into a zigzag-shaped reforming flow channel 118, a combustion gas mixture flow channel 120, an exhaust gas flow channel 122, and a well hole 124.

As shown in FIG. 23, a plurality of partition walls are provided inside the middle frame 106, whereby the inside of the middle frame 106 is partitioned into a zigzag-shaped reforming flow channel 128, a well hole 130, a well hole 132, and a well hole 134.

As shown in FIG. 25, a partition wall is provided so as to protrude on a top face of the combustor plate 108, whereby the top face is partitioned into a combustion chamber 138, a combustion chamber 140, a well hole 142, and a well hole 144.

As shown in FIG. 24, a plurality of partition walls are provided inside the upper frame 110, whereby a zigzag-shaped reforming flow channel 150 is formed inside the upper frame 110.

As shown in FIG. 26, gas leak proof packages 3 and 5 include a box body made of a planar metal material such as a stainless steel, for example, and have openings 7 and 9 at the lower part. In addition, spaces of substantially the same shape and size as the high temperature reaction unit 4 and the low temperature reaction unit 6 are internally provided. The gas leak proof packages 3 and 5 cover the high temperature reaction unit 4 and the low temperature reaction unit 6 of the micro-reactor module 1B, respectively, through the openings 7 and 9. Cutouts 11 and 13 continuous to the openings 7 and 9 are provided at the side faces of the gas leak proof packages 3 and 5. The cutouts 11 and 13 each correspond to a position of the coupling portion 8. When the high temperature reaction unit 4 and the low temperature reaction unit 6 are covered with the gas leak proof packages 3 and 5, the coupling portion 8 protrudes from portions of the cutouts 11 and 13.

The internal periphery face along the openings 7 and 9 of the gas leak proof packages 3 and 5 is joined with the external periphery face of the base plates 102 and 28, respectively. In addition, the internal periphery faces along the cutouts 11 and 13 of the gas leak proof packages 3 and 5 respectively are joined with both ends of a first coupling portion 161, a second coupling portion 162, and a bottom plate 169.

In this manner, in the case where there occurs a contact failure with the base plate 102, the lower frame 104, the middle frame 106, the combustor plate 108, the upper frame 110, and the cover plate 112 or in the case where there occurs a contact failure with the base plate 28, the lower frame 30, the middle frame 32, the upper frame 34, and the cover plate 36, external leakage of a reaction gas inside the high temperature reaction unit 4 or the low temperature reaction unit 6 can be reliably prevented by means of the gas leak proof packages 3 and 5.

As shown in FIGS. 19 and 20, a getter material 188 may be provided on a surface of the gas leak proof package 5 that covers the low temperature reaction unit 6. A heater such as an electric heat material is provided at this getter material 188, and a wiring 190 is connected to this heater. Both ends of the wiring 190 are positioned on the bottom face of the base plate 28 at the periphery of the combustor plate 12, and lead wires 192 and 194 are connected to both ends of the wire 190, respectively. The getter material 188 is heated, thereby being activated and having adsorption action. A gas invades into the internal space of an insulating package 200 by adsorbing: the gas remaining in the internal space of the insulating package 200 described later; the gas having leaked in the internal space of the insulating package 200 from the micro-reactor module 1B; or the gas having invaded the insulating package 200 from the outside. In this manner, the impairment of the degree of vacuum and the lowering of the heat insulation effect are restricted. As a material for the getter material 188, for example, there can be exemplified an alloy consisting essentially of zirconium, barium, or thianium, for example. In FIG. 20, for clarity, the wiring 190 and the lead wires 192 and 194 are not shown.

Now, a description will be given with respect to a heat insulation structure for restricting a thermal loss of this micro-reactor module 1B.

Figure 27:
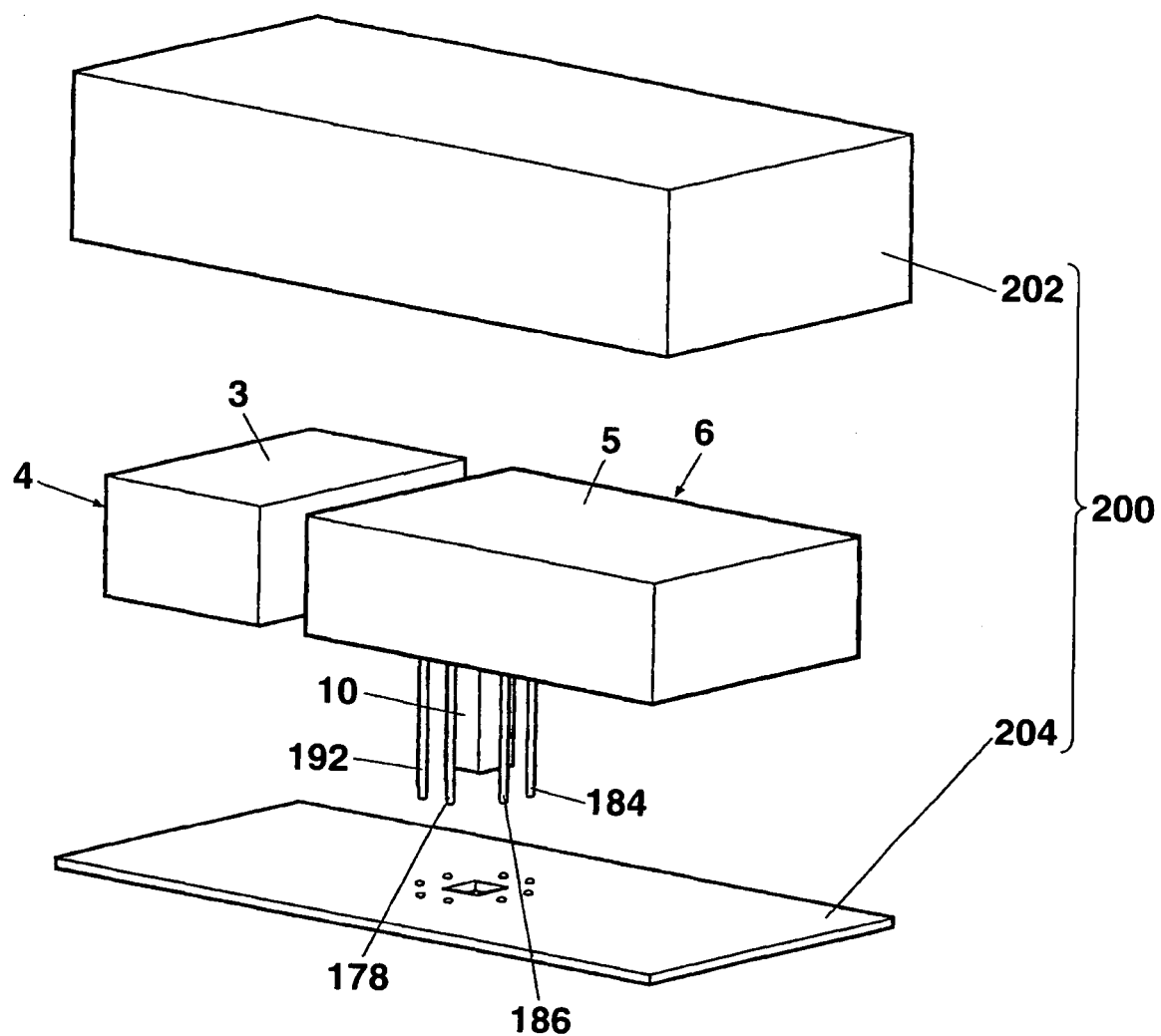
FIG. 27 is an exploded perspective view of an insulating package that covers the micro-reactor module in the second embodiment.

FIG. 27 is an exploded perspective view of an insulating package that covers a micro-reactor module in the second embodiment. As shown in FIG. 27, an insulating package (insulating container) 200 is identical to that in the case of the first embodiment, is configured so as to cover a whole micro-reactor module 1B, and the high temperature reaction unit 4, the low temperature reaction unit 6, and the coupling portion 8 are housed in the insulating package 200.

The insulating package 200 is composed of: a rectangular shaped box body 202 whose bottom face opens; and a close plate 204 for closing a bottom face opening of the box body 202. The close plate 204 is joined with the box body 202, and, for example, is sealed with a glass material or an insulation sealing material. The box body 202 and the close plate 204 are, for example, made of a planar metal material such as a stainless steel. In addition, a metal reflection film made of aluminum, gold, or silver may be formed on a face serving as the inside of the box body 202 and the close plate 204. When such a metal reflection film is formed, a thermal loss caused by irradiation from the supply/discharge unit 2, the high temperature reaction unit 4, the low temperature reaction unit 6, and the coupling portion 8 can be restricted.

In the case where the thermal loss of the micro-reactor module 1B is thus restricted as a vacuum heat insulation structure, if a reaction gas inside the high temperature reaction unit 4 or the low temperature reaction unit 6 leaks out and enters the internal space of the insulating package 200, there occurs a problem that the degree of vacuum of this internal space is lowered; heat insulation property is lowered; a thermal loss increases; and the heats of the high temperature reaction unit 4 and the low temperature reaction unit 6 leak out. However, the gas leak proof packages 3 and 5 are provided as described previously. In this manner, the reaction gas inside the high temperature reaction unit 4 or the low temperature reaction unit 6 is prevented from leaking out to the internal space of the insulating package 200 while the degree of vacuum is maintained. In addition, an increase in thermal loss and heat of the high temperature reaction unit 4 and the low temperature reaction unit 6 leaking outside can be prevented.

In the foregoing description, although the getter material 188 is provided on a surface of the gas leak proof package 5 covering the low temperature reaction unit 6, a position at which the getter material 188 is provided is not limited in particular as long as the position is outside the gas leak proof packages 3 and 5 and inside the insulating package 200.

In addition, the gas leak proof packages 3 and 5 are formed in a box body having spaces whose sizes are substantially equal to that of the high temperature reaction unit 4 and the low temperature reaction unit 6, respectively. A metal material forming the gas leak proof packages 3 and 5 or the like is made of a stainless steel SUS304 having thickness of about 0.1 to 0.2 mm.

An operation of the micro-reactor module 1B is omitted here because it is identical to that of the micro-reactor module 1A in the first embodiment.

The present invention is not limited to the above-described embodiments, and a variety of modifications and design changes may be made without departing from the spirit of the invention. For example, either one of the gas leak proof packages 3 and 5 may be used. In addition, another gas leak proof package covering a first combustor 504 may be provided at the outer periphery of the first combustor 504. In this manner, the leak-out of the combustion gas from the combustor plate 12 can be reliably prevented.

In addition, another gas leak proof package covering the coupling portion 8 is provided at the outer periphery of the coupling portion 8 so that the leak-out of the gas from the coupling portion 8 may be prevented. Alternatively, the coupling portion 8 is provided as an integral coupling portion so that the cutouts 11 and 13 of the gas leak proof packages 3 and 5 may be joined with both ends of the coupling portion. The coupling portion 8 is provided as an integral coupling portion, whereby the leak-out of the gas from the coupling portion 8 can be reliably prevented.

Third Embodiment

Now, a description will be given with respect to a third embodiment of a reacting device according to the present invention.

Identical or like constituent elements in the above-described embodiments are designated by identical or like reference numerals. A description will be briefly given or omitted here.

Figure 28:
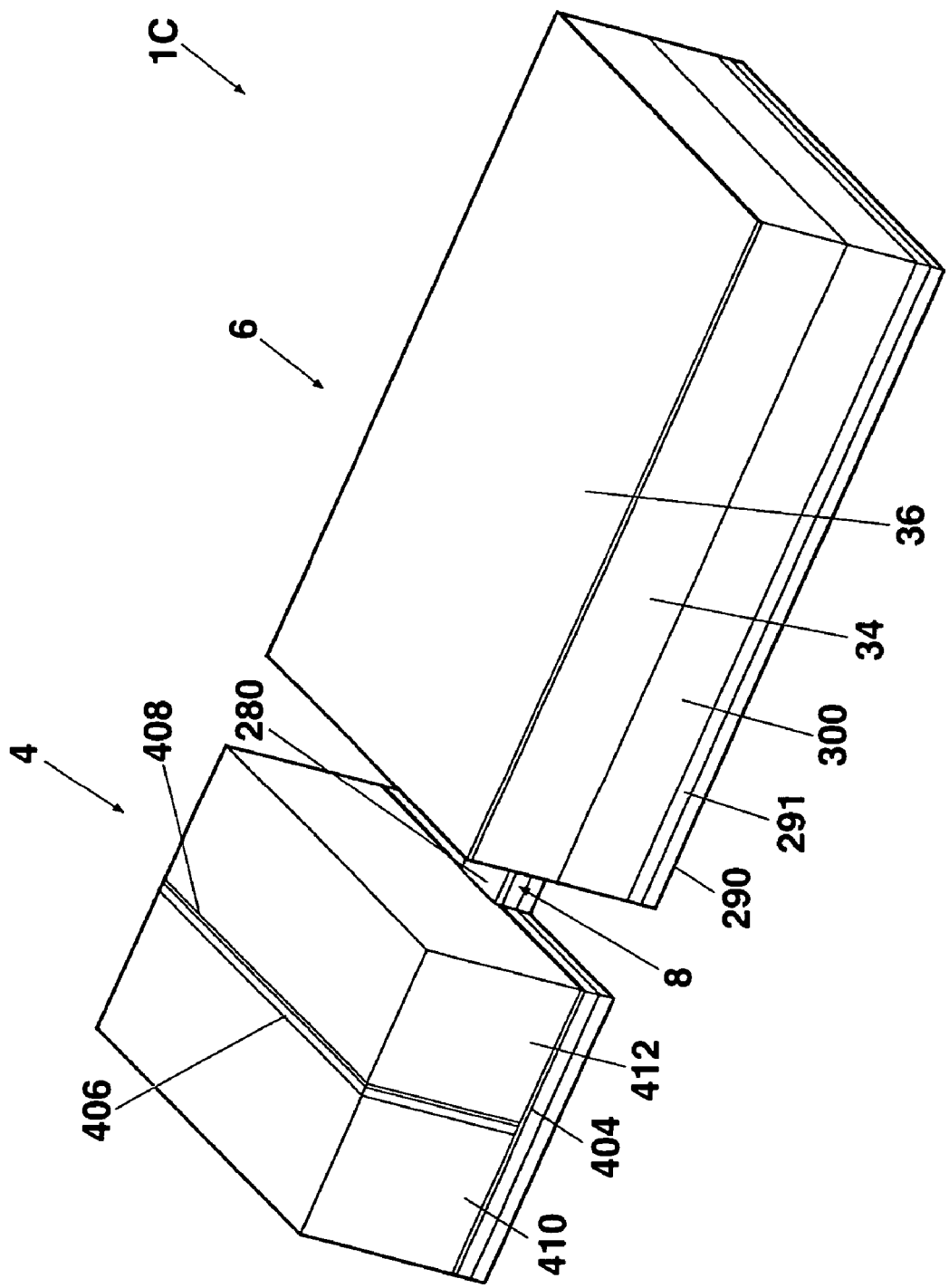
FIG. 28 is a perspective view showing obliquely upwardly a micro-reactor module in a third embodiment of the reacting device according to the present invention.
Figure 29:
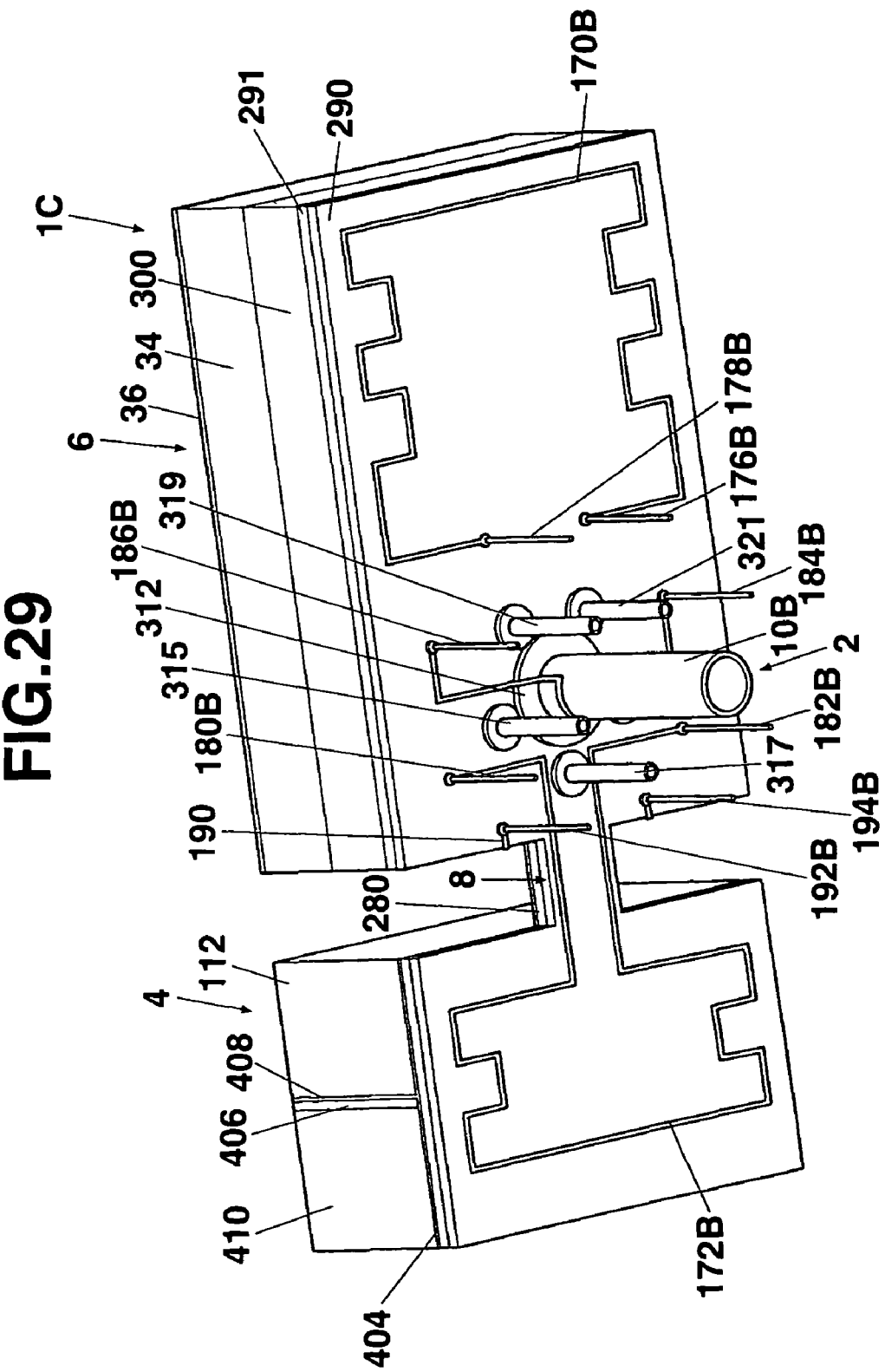
FIG. 29 is a perspective view showing obliquely downwardly the micro-reactor module in the third embodiment.
Figure 30:
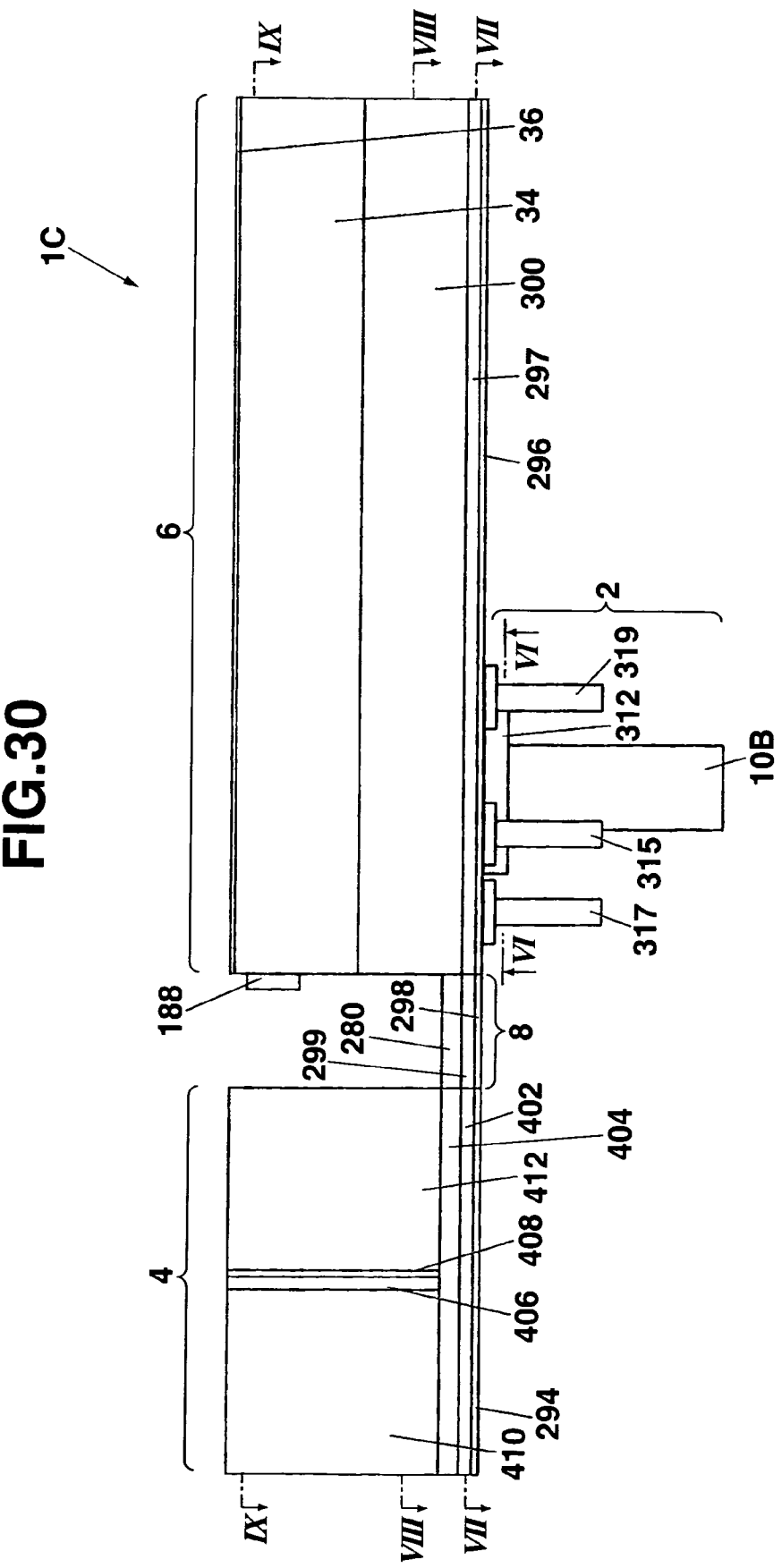
FIG. 30 is a side view of the micro-reactor module in the third embodiment.

FIG. 28 is a perspective view showing obliquely upwardly a micro-reactor module in a third embodiment of the reacting device according to the present invention. FIG. 29 is a perspective view showing obliquely downwardly the micro-reactor module in the third embodiment. FIG. 30 is a side view of the micro-reactor module in the third embodiment.

A micro-reactor module 1C in the third embodiment, as shown in FIGS. 28 to 30, as in the micro-reactor modules according to the above-described embodiments, comprises: a supply/discharge unit 2 that supplies a reaction material and discharges a product; a high temperature reaction unit (first reaction unit) 4 set at a comparatively high temperature so that a reforming reaction occurs; a low temperature reaction unit (second reaction unit) 6 set at a comparatively low temperature so that a selective oxidization reaction occurs; and a coupling portion 8 for carrying out inflow or outflow of a reaction material or a product between the high temperature reaction unit 4 and the low temperature reaction unit 6.

Figure 31:
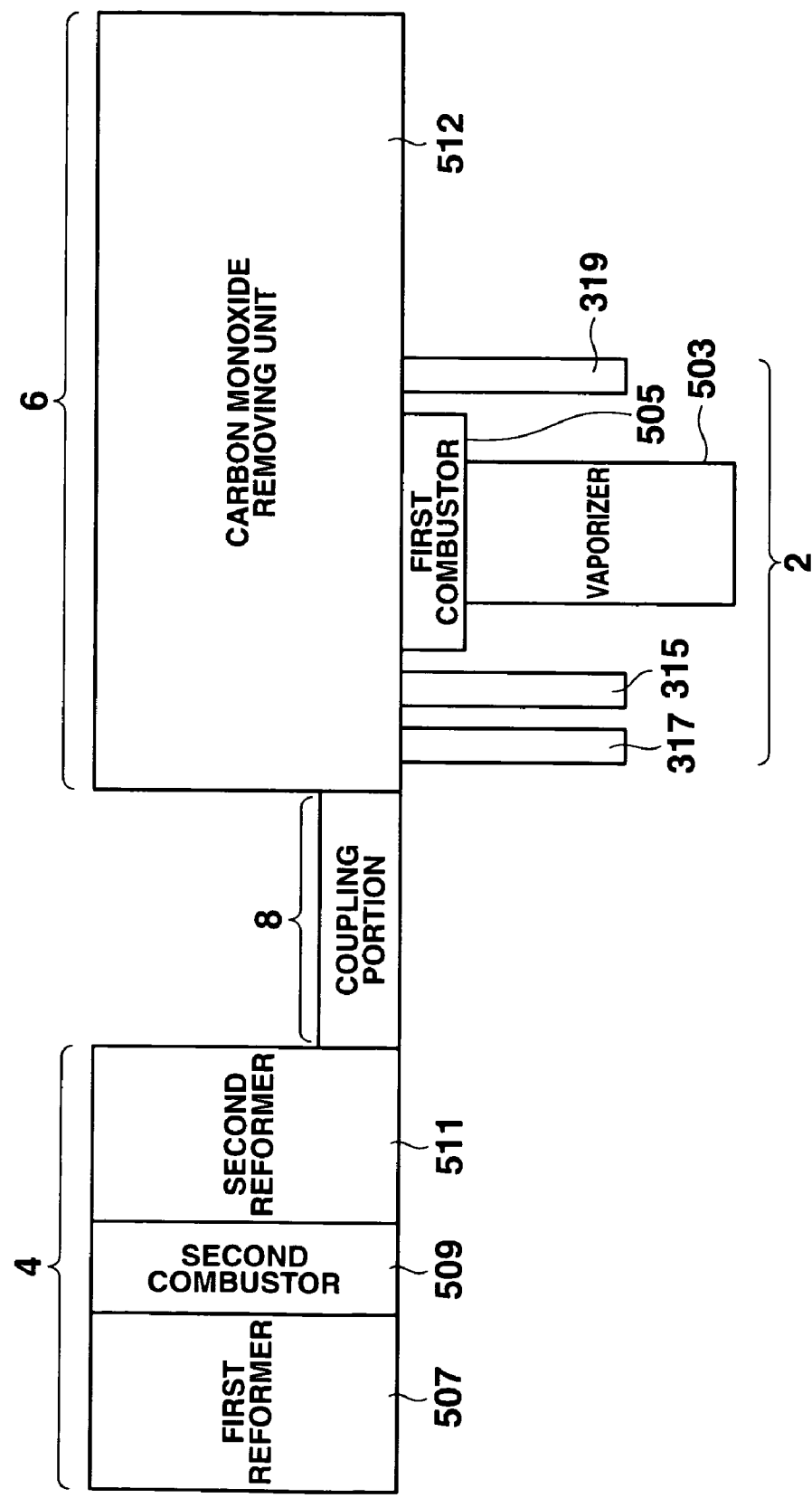
FIG. 31 is a schematic side view showing a case in which the micro-reactor module in the third embodiment is functionally divided.

FIG. 31 is a schematic side view in the case where the micro-reactor module in the third embodiment is functionally divided. As shown in FIG. 31, a vaporizer 503 and a first combustor 505 are primarily provided at the supply/discharge unit 2. To the first combustor 505, an air and a gas fuel (such as hydrogen gas or methanol gas, for example) are supplied respectively separately or as a gas mixture, and a heat is generated by catalyst combustion thereof. To the vaporizer 503, water and a liquid fuel (for example, methanol, ethanol, dimethyl ether, butane, or gasoline) are supplied from a fuel container respectively separately or in a mixed state, and the water and liquid fuel vaporize in the vaporizer 503 due to a combustion heat in the first combustor 505.

A first reformer (first reactor) 507, a second combustor (heating unit) 509, and a second reformer (second reactor) 511 are primarily provided at the high temperature reaction unit 4. The second combustor 509 is provided to be sandwiched between the first reformer 507 and the second reformer 511. These first reformer 507, second combustor 509, and second reformer 511 are placed parallel to each other in close contact in the transverse direction as shown, and the first reformer 507 and the second reformer 511 are structured to communicate with each other.

To the second combustor 509, an air and a gas fuel (such as hydrogen gas or methanol gas, for example) are supplied respectively separately or as a gas mixture, and a heat is generated by catalyst combustion thereof. In a fuel cell, in a state in which electricity is generated by electrochemical reaction of a hydrogen gas, and then, an unreacted hydrogen gas contained in an off gas discharged from the fuel cell is mixed with an air, the mixture may be supplied to the first combustor 505 and the second combustor 509. Of course, the liquid fuel reserved in the fuel container (for example, methanol, ethanol, dimethyl ether, butane, or gasoline) is vaporized by means of another vaporizer so that the gas mixture of the vaporized fuel and air may be supplied to the first combustor 505 and the second combustor 509.

A gas mixture (first reaction material) obtained when water and a liquid fuel have been vaporized is supplied from the vaporizer 503 to the first reformer 507 and the second reformer 511. The first reformer 507 and the second reformer 511 are heated by means of the second combustor 509. In the first reformer 507 and the second reformer 511, a hydrogen gas or the like (first reaction product) is generated by catalyst combustion from the water steam and the vaporized liquid fuel, and further, a minute amount of a carbon monoxide gas is generated. In the case where a fuel is methanol, a chemical reaction as shown in the formulas (1) and (2) above occurs. The reaction in which hydrogen is generated is a heat absorption reaction, and a combustion heat of the second combustor 509 is used.

A carbon monoxide removing unit 512 is primarily provided at the low temperature reaction unit 6. The carbon monoxide removing unit 512 is heated by means of the first combustor 505. Then, a gas mixture (second reaction material) containing a hydrogen gas and a minute amount of carbon monoxide gas generated by chemical reaction of the formula (2) above is supplied from the first reformer 507 and the second reformer 511, and further, an air is supplied. In the carbon monoxide removing unit 512, carbon monoxide is selectively oxidized from among the gas mixture, whereby carbon monoxide is removed. A gas mixture (second reaction product: hydrogen rich gas) in a state in which carbon monoxide has been removed is supplied to a fuel pole of a fuel cell.

Now, with reference to FIGS. 30 and 32 to 36, a description will be given with respect to a specific configuration of the supply/discharge unit 2, the high temperature reaction unit 4, the low temperature reaction unit 6, and the coupling portion 8.

Figure 32:
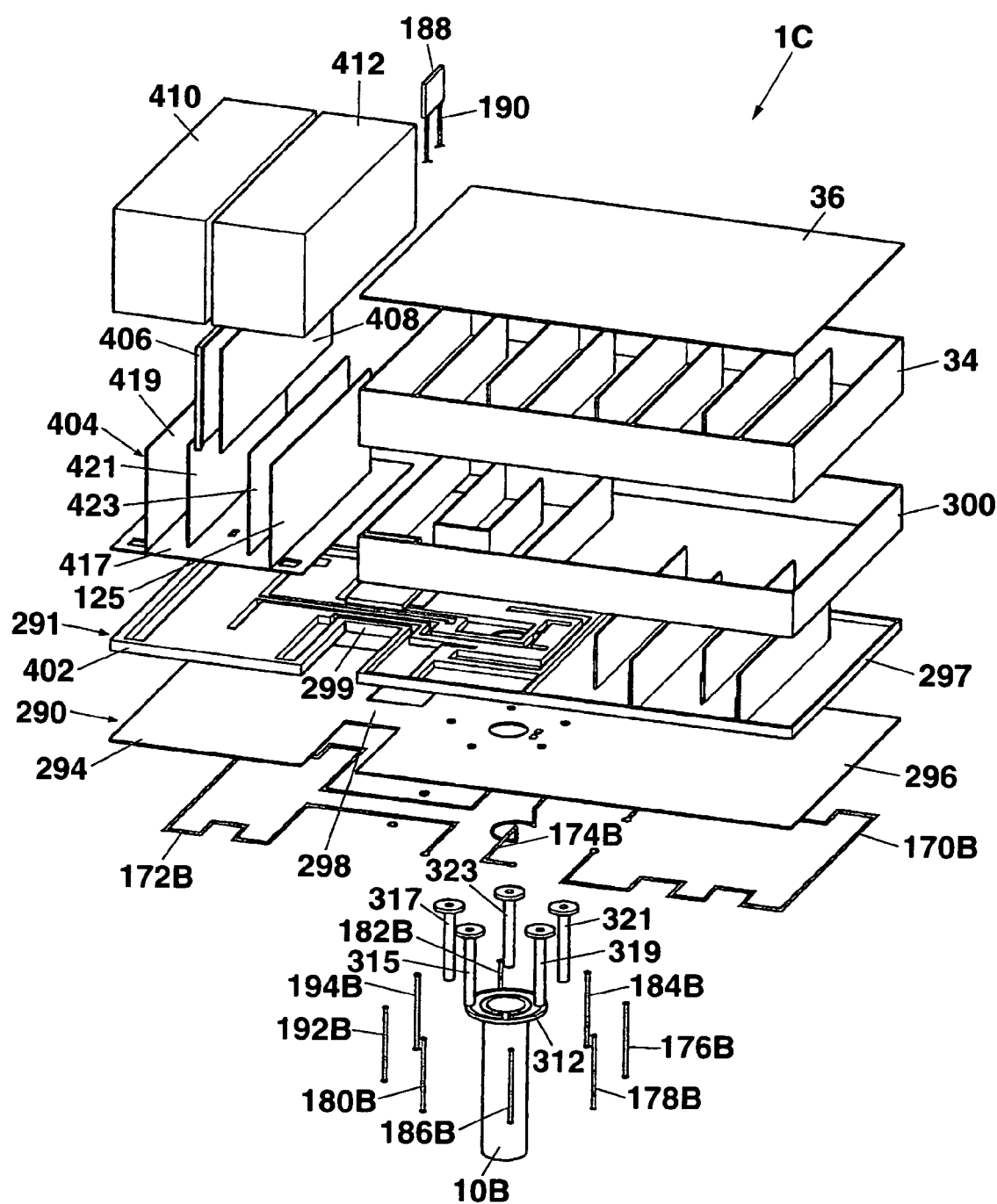
FIG. 32 is an exploded perspective view of the micro-reactor module in the third embodiment.
Figure 33:
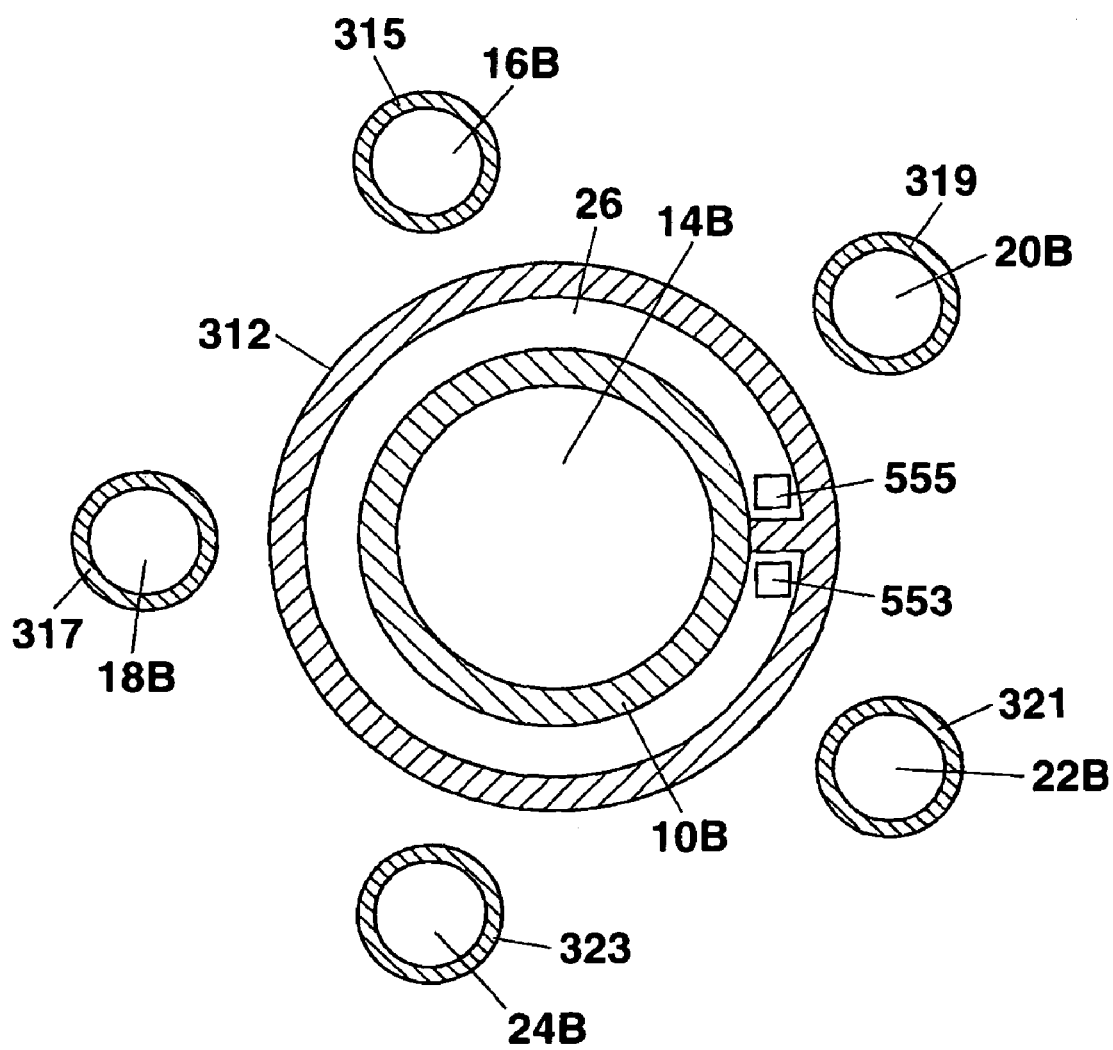
FIG. 33 is a sectional view of a face taken along the cut line VI-VI of FIG. 30.
Figure 34:
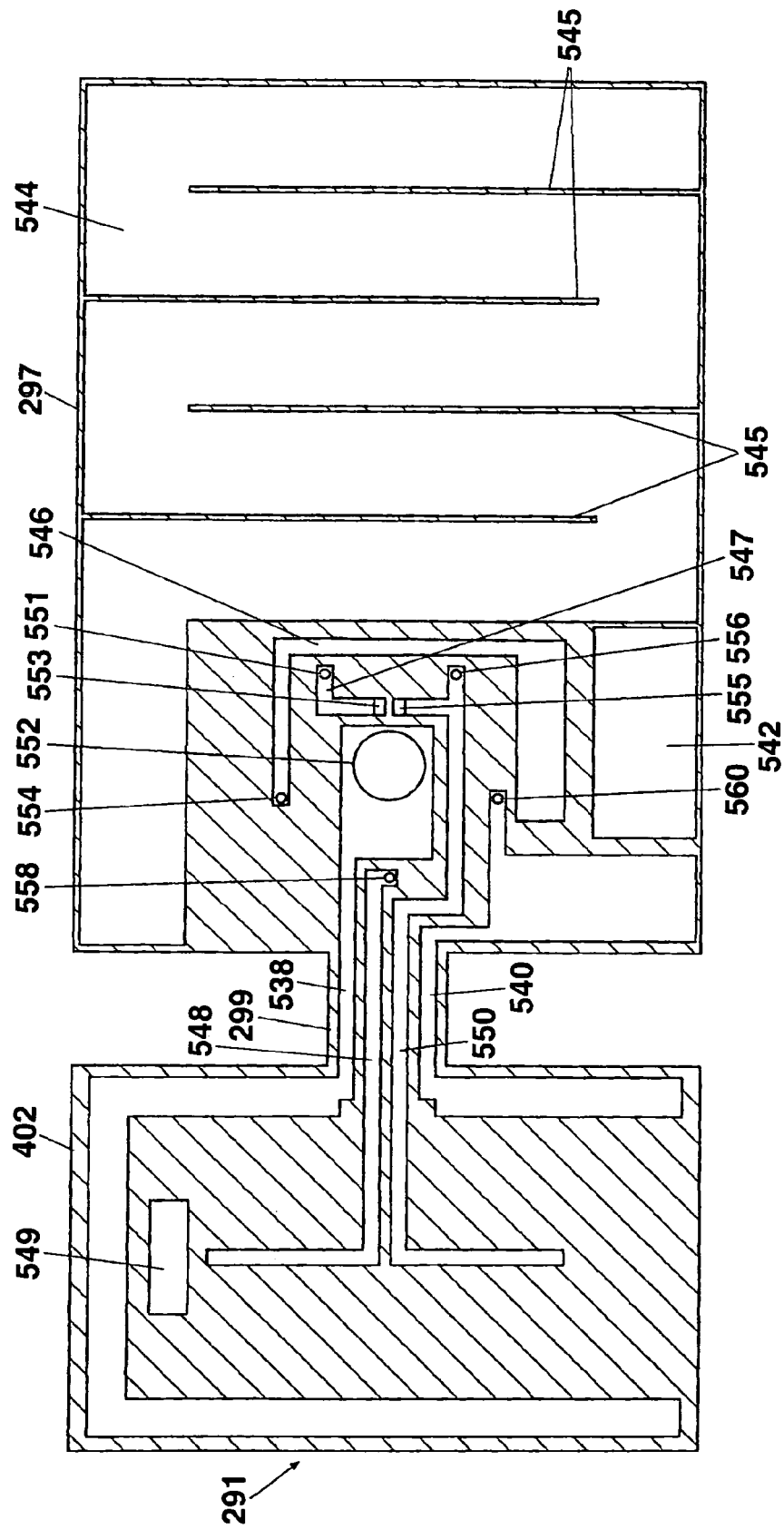
FIG. 34 is a sectional view of a face taken along the cut line VII-VII of FIG. 30.
Figure 35:
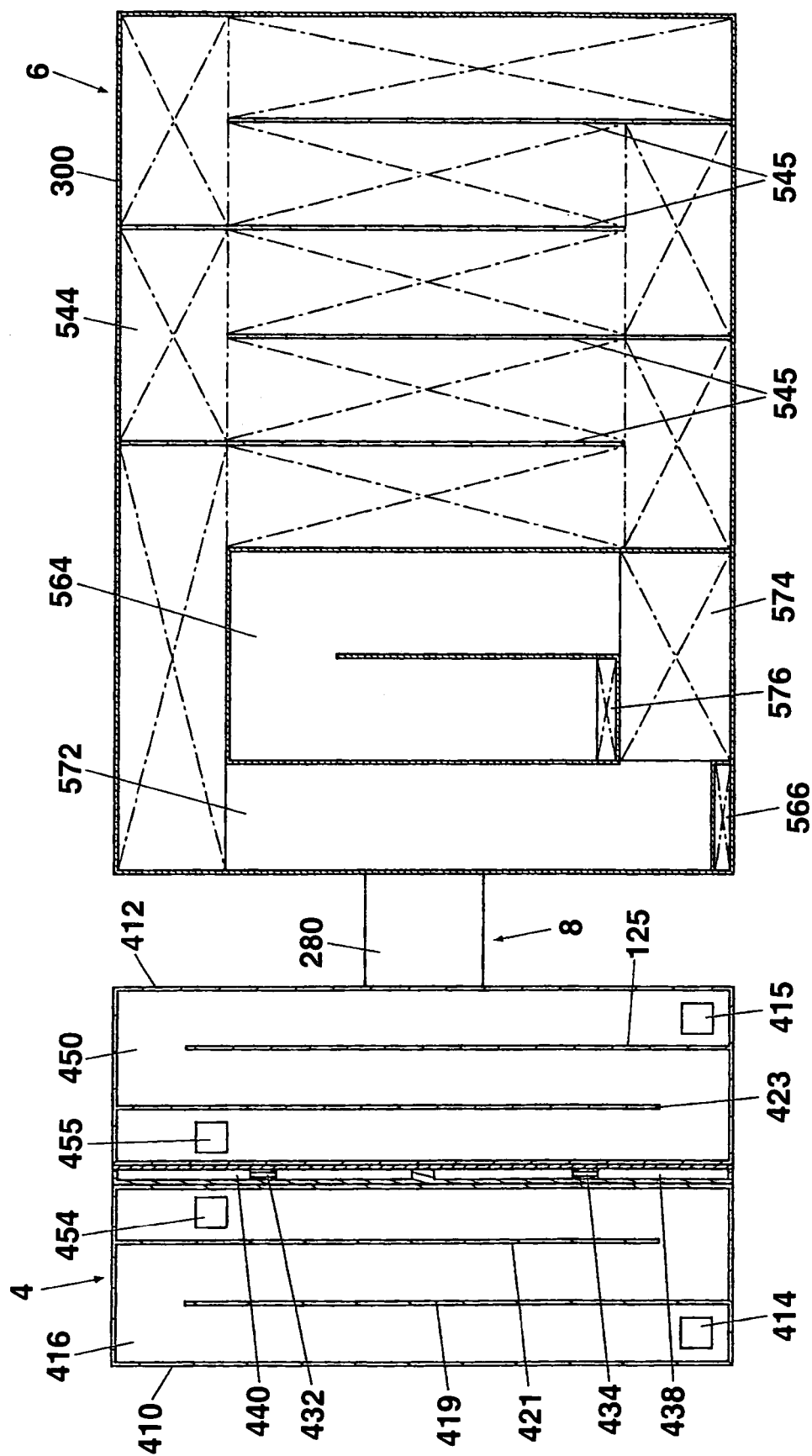
FIG. 35 is a sectional view of a face taken along the cut line VIII-VIII of FIG. 30.
Figure 36:
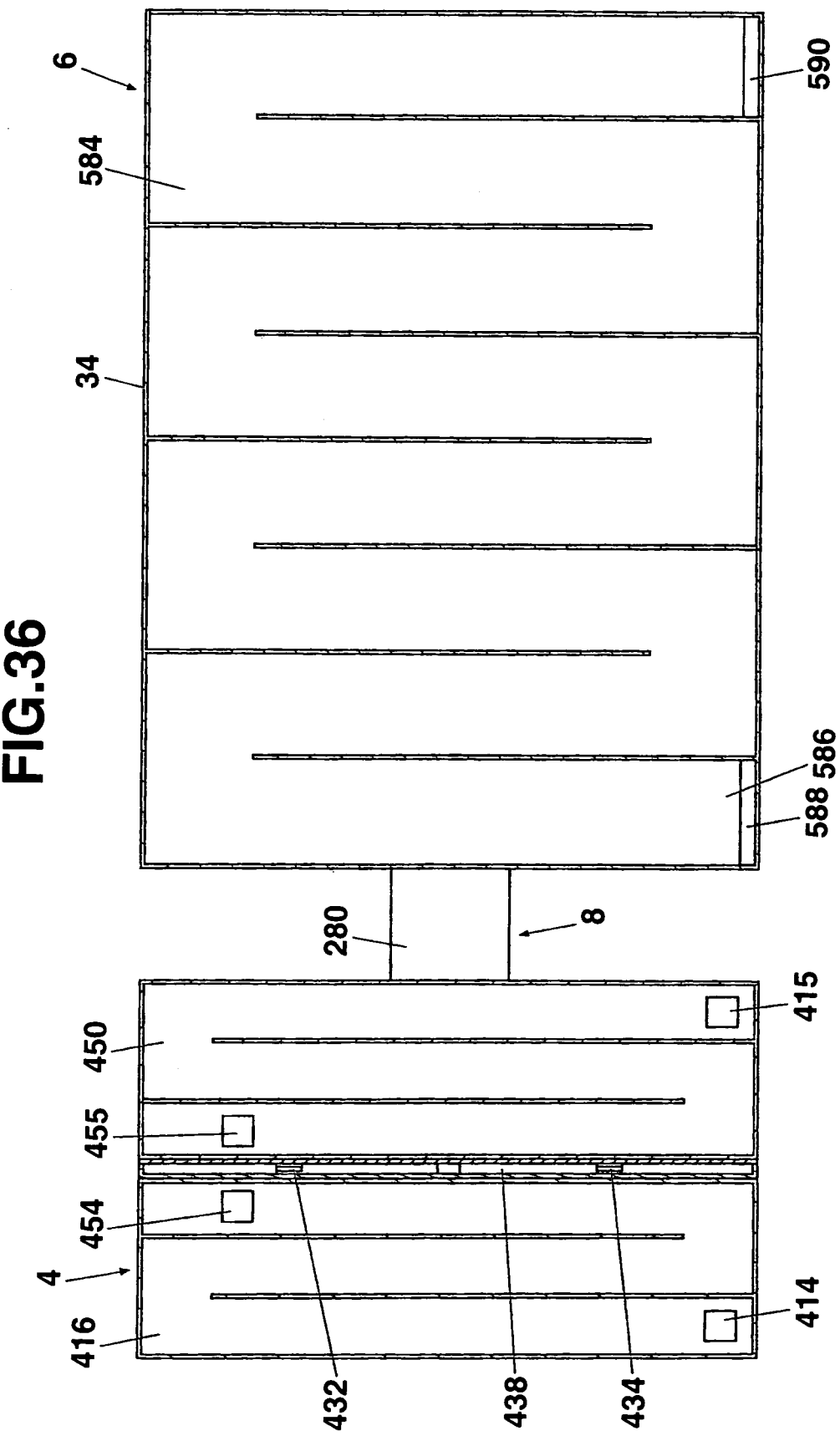
FIG. 36 is a sectional view of a face taken along the cut line IX-IX of FIG. 30.

FIG. 32 is an exploded perspective view of the micro-reactor module in the third embodiment. FIG. 33 is a sectional view of a face taken along the cut line VI-VI of FIG. 30. FIG. 34 is a sectional view of a face taken along the cut line VII-VII of FIG. 30. FIG. 35 is a sectional view of a face taken along the cut line VIII-VIII of FIG. 30. FIG. 36 is a sectional view of a face taken along the cut line IX-IX of FIG. 30.

As shown in FIGS. 30, 32, and 33, the supply/discharge unit 2 includes: a pipe group consisting of a liquid fuel intake pipe 10B made of a pipe-shaped metal material such as a stainless steel and five pipes 315, 317, 319, 321, and 323 arranged at the periphery of the liquid fuel intake pipe 10B; and a combustor plate 312 provided so as to surround the liquid fuel intake pipe 10B at an upper end of the liquid fuel intake pipe 10B. The liquid fuel intake pipe 10B and the pipe group are pipes for distributing the liquids contained in the micro-reactor module 1C to the outside of the micro-reactor module 1C, respectively. The liquid fuel intake pipe 10B is made of a pipe-shaped metal material such as a stainless steel, for example. A vaporization intake channel 14B is provided in the liquid fuel intake pipe 10B.

The vaporization intake channel 14B is filled with a liquid absorptive material such as a felt material, a ceramic porous material, a fiber material, a carbon porous material and the like. The liquid absorptive material absorbs a liquid. The liquid absorptive material is made of: a material obtained by solidifying an inorganic fiber or an organic fiber with a binder material, a material obtained by sintering inorganic powder, a material obtained by solidifying inorganic powder with a binder material, a mixture of graphite and glassy carbon, and the like.

The pipes 315, 317, 319, 321, and 323 are made of a pipe-shaped metal material such as a stainless steel, for example. In the pipes 315, 317, 319, 321, and 323, there are provided: an air intake channel 16B, a combustion gas mixture intake channel 18B; an exhaust gas discharge channel 20B; a combustion gas mixture intake channel 22B; and a hydrogen discharge channel 24B.

While the present embodiment has described that the vaporization intake channel 14B, the air intake channel 16B, the combustion gas mixture intake channel 18B, the exhaust gas discharge channel 20B, the combustion gas mixture intake channel 22B, and the hydrogen discharge channel 24B are provided in different pipes, respectively, these flow channels 14B, 16B, 18B, 20B, 22B, and 24B may be provided in one pipe in a state in which they are partitioned by partition walls.

A combustor plate 312 is also made of a planar metal material such as a stainless steel, for example. A through hole is formed at the center part of the combustor plate 312. The liquid fuel intake pipe 10B is engaged with that through hole. The liquid fuel intake pipe 10B and the combustor plate 312 are joined with each other. The liquid fuel intake pipe or external flow pipe 10B is joined with the combustor plate 312 by means of brazing or the like. As a brazing agent, it is preferable in particular to use a gold braze having a melting point higher than a maximum temperature from among the temperatures of the fluid flowing through the external flow pipe 10B or the combustion plate 312 and containing silver, copper, zinc, and cadmium in gold having a melting point of 700° C. or more; a braze consisting essentially of gold, silver, zinc, and nickel; or a braze consisting essentially of gold, palladium, and silver. In addition, a partition wall is provided so as to protrude on one face of the combustor plate 312.

With respect to the partition wall, one part is provided over the outer rim and whole periphery of the combustor plate 312; the other part is provided over a diameter direction; and the combustor plate 312 is joined with the bottom face of the low temperature reaction unit 6. In this manner, a combustion flow channel 26B is formed on a bonding face and the liquid fuel intake pipe 10 is surrounded by the combustion flow channel 26B. A combustion catalyst for combusting a combustion gas mixture is carried at least a part of the wall face of the combustion flow channel 26B. As a combustion catalyst, for example, platinum is exemplified. The liquid absorptive material in the liquid fuel intake pipe 10 is filled up to the position of the combustor plate 312.

As shown in FIGS. 30 and 32, the high temperature reaction unit 4, the low temperature reaction unit 6, and the coupling portion 8 use an insulation plate 290 and a base plate 291 laminated on each other as a common substrate. Thus, the insulation plate 290 constitutes a bottom face common to the high temperature reaction unit 4, the low temperature reaction unit 6, and the coupling portion 8. However, the bottom face of the coupling portion 8 faces against the bottom face of the high temperature reaction unit 4, and further, faces against the bottom face of the low temperature reaction unit 6.

The base plate 291 is made of: a base unit 297 serving as a substrate of the low temperature reaction unit 6; a base unit 402 serving as a substrate of the high temperature reaction unit 4; and a coupling base unit 299 serving as a substrate of the coupling portion 8. These units are integrally formed, and are established in an enclosed state in the coupling base unit 299. That is, the base plate has a neck shape at a portion of the coupling portion. This base plate 291 is made of a planar metal material such as a stainless steel, for example.

The insulation plate 290 is made of: a base unit 296 serving as a substrate of the low temperature reaction unit 6; a base unit 294 serving as a substrate of the high temperature reaction unit 4; and a coupling base unit 298 serving as a substrate of the coupling portion 8. These units are integrally formed, and are established in an enclosed state in the coupling base unit 298. This insulation plate 290 is made of an electric insulation body such as ceramics, for example.

Then, the low temperature reaction unit 6 laminates the base unit 296, the base unit 297, a lower frame 300, an upper frame 34, and a cover plate 36 in this order from the bottom, and has a reaction container formed in a rectangular box shape. The lower frame 300, the upper frame 34, and the cover plate 36 are made of a planar metal material such as a stainless steel, for example.

The high temperature reaction unit 4 includes: the base unit 294; the base unit 402 joined with the base unit 294; a reformer base body 404 laminated on the base unit 402; a first box body (reaction container) 410 covering part of the reformer base body 404; a second box body (reaction container) 412 covering another part of the reformer base body 404; and combustor plates 406 and 408 sandwiched between the first box body 410 and the second box body 412, and is formed in a rectangular box shape. The reformer base body 404, the first box body 410, the second box body 412, and the combustor plates 406 and 408 are made of a planar metal material such as a stainless steel, for example.

The coupling portion 8 includes: the coupling base unit 298; the coupling base unit 299 joined with the coupling base unit 298; and a coupling cap 280 joined with the coupling base unit 298. The coupling cap 280 is made of a planar metal material such as a stainless steel, for example.

Figure 37:
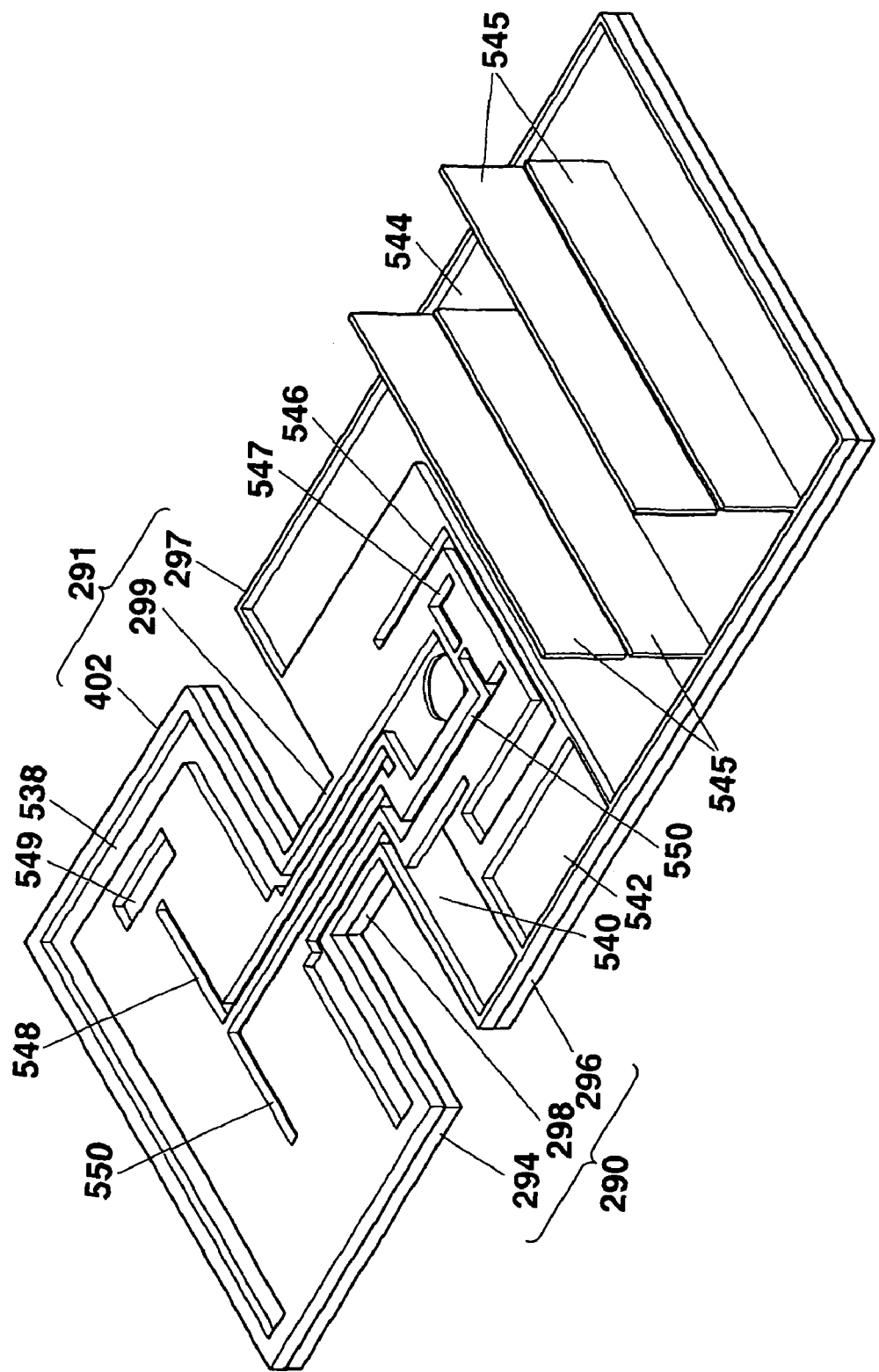
FIG. 37 is a perspective view showing a state in which an insulation plate has been joined with a base plate in the third embodiment.
Figure 38:
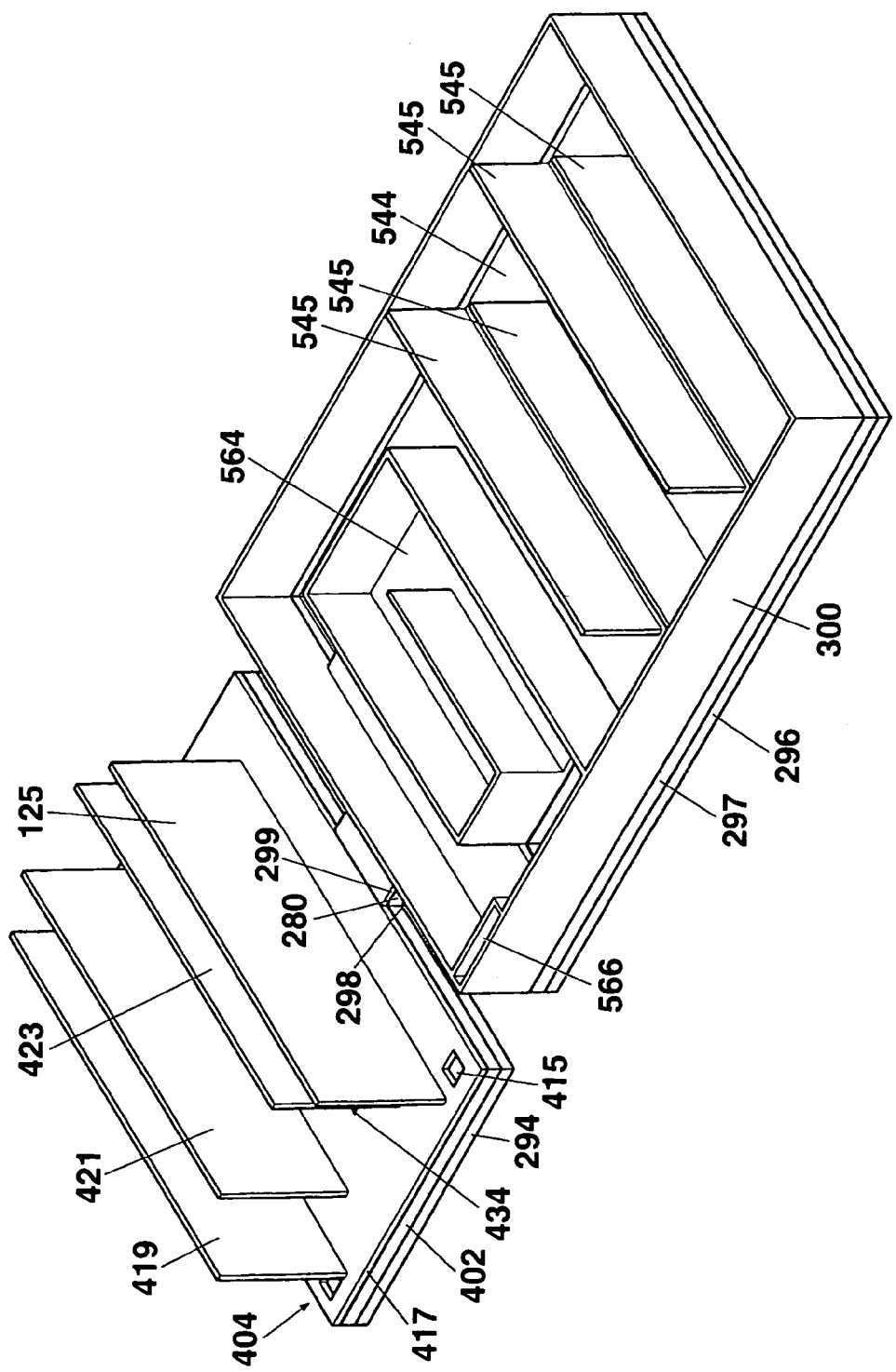
FIG. 38 is a perspective view showing a state in which a reformer base body, a lower frame, and a coupling cap have been joined with the base plate in the third embodiment.
Figure 39:
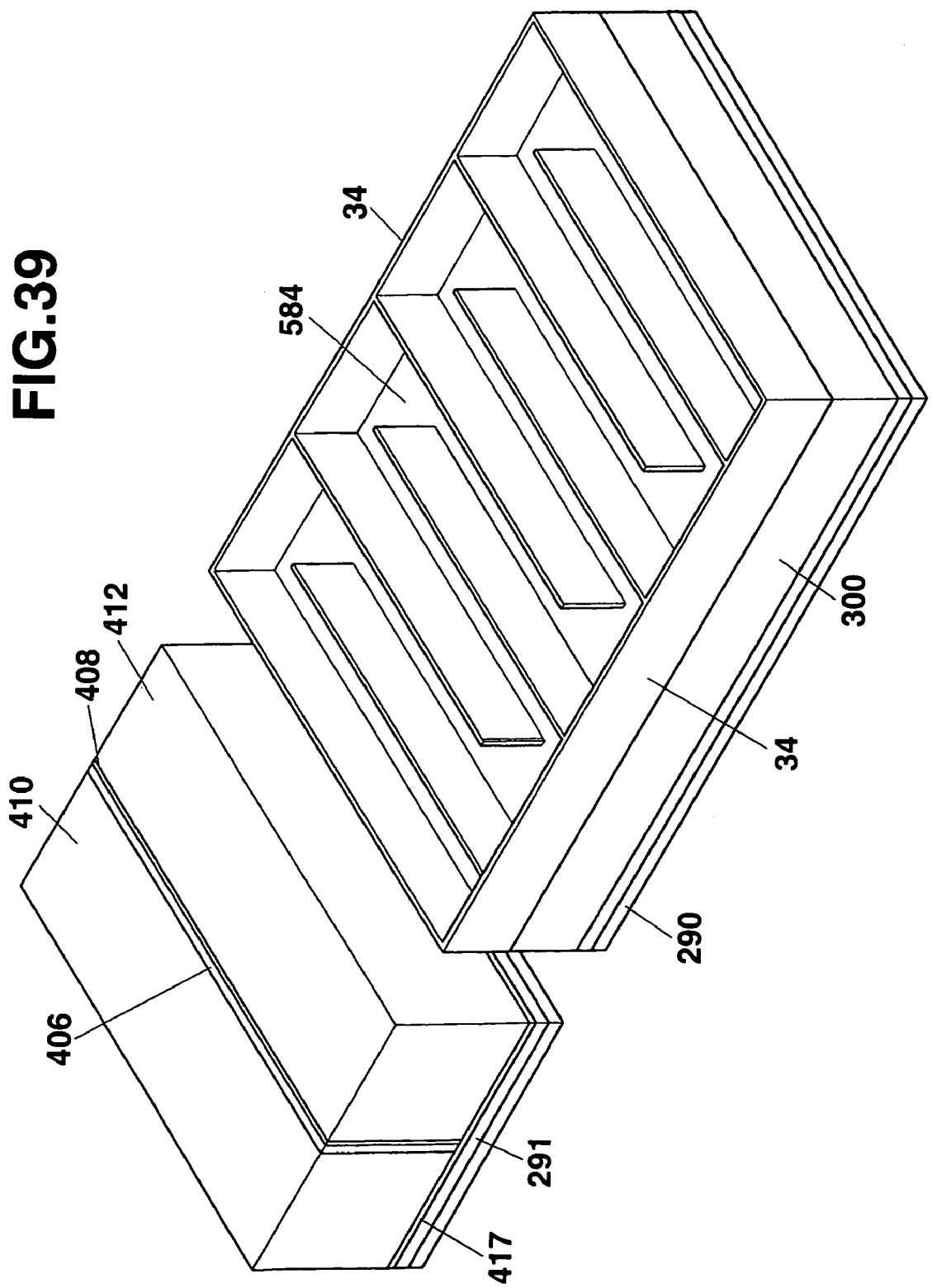
FIG. 39 is a perspective view of a state in which a box or the like is joined with a reformer base body, and further, an upper frame is joined with a lower frame in the third embodiment.

FIG. 37 is a perspective view showing a state in which an insulation plate has been joined with a base plate in the third embodiment. FIG. 38 is a perspective view showing a state in which a reformer base body, a lower frame, and a coupling cap have been joined with the base plate in the third embodiment. FIG. 39 is a perspective view of a state in which a box or the like is joined with a reformer base body, and further, an upper frame is joined with a lower frame in the third embodiment.

As shown in FIGS. 34 and 37, through holes 551, 552, 553, 554, 555, 556, 558, and 560 penetrate the base unit 297 of the base plate 291 and the base unit 296 of the insulation plate 290. As shown in FIGS. 29, 30, and 32, the base unit 296 of the insulation plate 290 constitutes a bottom face of the low temperature reaction unit 6. However, the pipes 315, 317, 319, 321, and 323, and the liquid fuel intake pipe 10B are joined with the bottom face of the low temperature reaction unit 6 by mans of brazing or the like. The vaporization intake channel 14B of the liquid fuel intake pipe 10B passes through the through hole 552. The air intake channel 16B of the pipe 315 passes through the through hole 560. The combustion gas mixture intake channel 18B of the pipe 317 passes through the through hole 558. The exhaust gas discharge channel 20B of the pipe 319 passes through the through hole 556. The combustion gas mixture intake channel 22B of the pipe 321 passes through the through hole 551. The hydrogen discharge channel 24B of the pipe 323 passes through the through hole 554.

As shown in FIGS. 29, 32, and 33, the combustor plate 312 is joined with the bottom face of the low temperature reaction unit 6. On the other hand, one end of the combustion flow channel 26B of the combustion plate 312 communicates with the through hole 553, and the other end of the combustion flow channel 26B communicates with the through hole 555.

As shown in FIGS. 34 and 37, on the base plate 291, there are formed: a reforming fuel supply flow channel 538; a mixture flow channel 40; a carbon monoxide removal flow channel 542; a carbon monoxide removal flow channel 544; a combustion fuel supply flow channel 547; a combustion fuel supply flow channel 548; a communication flow channel 549; and an exhaust gas flow channel 550.

The reforming fuel supply flow channel 538 is formed from the through hole 552 to a corner part of the base unit 402 through the coupling base unit 299. The mixture flow channel 40 is formed from the through hole 560 to the base unit 402 through the coupling base unit 299. The combustion fuel supply flow channel 548 is formed from the through hole 558 to the base unit 402 through the coupling base unit 299. The exhaust gas flow channel 550 is formed from the through hole 556 to the through hole 555 and is formed from the through hole 556 to the base unit 402 through the coupling base unit 299. Here, the coupling cap 280 is joined with the coupling base unit 299, whereas the reforming fuel supply flow channel 538, the mixture flow channel 40, the combustion fuel supply flow channel 548, and the exhaust gas flow channel 550 are covered with this coupling cap 280 at the coupling base unit 299.

The communication flow channel 549 is formed in a linear shape at the base unit 402. The carbon monoxide removal flow channel 542 is formed in a rectangular shape at the base unit 297. The carbon monoxide removal flow channel 546 is formed in a U shape so as to surround the through hole 552, and the through hole 554 opens on a bottom at one end of the carbon monoxide removal flow channel 546. The combustion fuel supply flow channel 547 is formed from the through hole 551 to the through hole 553 at the base unit 297.

In the carbon monoxide removal flow channel 544, a plurality of partition walls 545 are provided at the base unit 297, and the channel 544 is formed in a zigzag shape. Here, four partition walls 545 forming the carbon monoxide removal flow channel 544 are higher than any other portion.

As shown in FIG. 38 or the like, a lower frame 300 is joined on the base unit 297 of the base plate 291 by means of brazing or the like. The partition wall 545 extends up to the height of the upper end of the lower frame 300 inside the lower frame 300, and the zigzag-shaped carbon monoxide removal flow channel 544 communicates with the lower frame 300.

As shown in FIGS. 35 and 38, a plurality of partition walls are provided inside the lower frame 300, whereby the inside of the lowering frame 300 is partitioned into: a whirl-shaped carbon monoxide removal flow channel 564; a well hole 566; and a carbon monoxide removal flow channel 544. In the carbon monoxide removal flow channel 564, when a bottom plate 572 is provided, and then, the lower frame 300 is joined with the base unit 297 by means of brazing or the like, the top parts of the carbon monoxide removal flow channel 546 and the combustion fuel supply flow channel 547 are covered with the bottom plate 572. In addition, part of the top part each one of the reforming fuel supply flow channel 538, the mixture flow channel 40, the combustion fuel supply flow channel 548, and the exhaust gas flow channel 550 is covered.

In addition, one end of the carbon monoxide removal flow channel 564 communicates with the carbon monoxide removal flow channel 544. A well hole 574 communicating with the carbon monoxide removal flow channel 542 of the base unit 297 is formed at an intermediate part of the carbon monoxide removal flow channel 564. A well hole 576 communicating with one end of the carbon monoxide removal flow channel 546 of the base unit 297 is formed at the other end of the carbon monoxide removal flow channel 546. A well hole 566 is positioned on the mixture flow channel 40 of the base unit 297.

In planar viewing, the liquid fuel intake pipe 10B overlaps on part of the carbon monoxide removal flow channel 564, and the carbon monoxide removal flow channel 546 is configured so as to whirl the periphery of the liquid fuel intake pipe 10B.

As shown in FIGS. 36 and 39, a partition wall is provided inside the upper frame 34, whereby a zigzag-shaped carbon monoxide removal flow channel 584 is formed inside the upper frame 34. In addition, when a bottom plate 588 is provided at the whose inside of the upper frame 34, and then, the upper frame 34 is joined with the lower frame 300, the top parts of the carbon monoxide removal flow channel 564 and the carbon monoxide removal flow channel 544 are covered with the bottom plate 586. In addition, a well hole 588 is formed at one end of the carbon monoxide removal flow channel 584, and a well hole 590 is formed at the other end of the carbon monoxide removal flow channel 584. The well hole 588 overlaps on the well hole 566 of the lower frame 300, and the carbon monoxide removal flow channel 584 communicates the mixture flow channel 40 via the well hole 588 and the well hole 566. The well hole 590 is positioned on an end of the carbon monoxide removal flow channel 544, and the carbon monoxide removal flow channel 584 communicates with the carbon monoxide removal flow channel 544 via the well hole 590.

As shown in FIGS. 28, 30, and 32 or the like, the cover plate 36 is joined on the upper frame 34 by means of brazing or the like, whereby a top part of the carbon monoxide removal flow channel 584 is capped by means of the cover plate 36. Here, a carbon monoxide selective oxidization catalyst is carried at least part of the wall faces of the carbon monoxide removal flow channels 542, 544, 546, 564, and 584. Platinum is exemplified as a carbon monoxide selective oxidization catalyst.

As shown in FIGS. 32 and 38, a reformer base body 404 is constructed by four erected partition walls 419, 421, 423, and 125, for example, on one face of the bottom plate 417. The other face of the bottom plat 417 is joined with the base unit 402, whereby the reforming fuel supply flow channel 538, the mixture fuel channel 40, the combustion fuel supply flow channel 548, the communication flow channel 549, and the exhaust gas flow channel 550 are covered with the bottom plate 417 at the base unit 402.

A well hole 414 is formed in the vicinity of one corner of the bottom plate 417, and positioned on an end of the reforming fuel supply flow channel 538. A well hole 415 is formed in the vicinity of another corner of the bottom plate 417, and positioned on an end of the mixture flow channel 40. A well hole 454 is formed in the bottom plate 417 close to a partition wall 421 between the partition wall 421 and a partition wall 423. A well hole 455 is formed in the bottom plate 417 close to the partition wall 423. The well hole 454 is positioned on one end of the communication flow channel 549, and the well hole 455 is positioned on the other end of the communication flow channel 549. Well holes 432 and 434 are formed intermediately of the partition wall 421 and the partition wall 423. The well hole 432 is positioned on an end of the combustion fuel supply flow channel 548, and the well hole 434 is positioned on an end of the exhaust gas flow channel 550.

The first box body 410 exhibits a rectangular shape whose bottom face opens. In a state in which partition walls 419 and 421 are inserted into the first box body 410 through the opening, and thus, the partition walls 419 and 421 are housed in the first box body 410, and then the opening of the first box body 410 is closed by the bottom plate 417, and the first box body 410 is joined with the bottom plate 417. The partition walls 419 and 421 are joined with a top face of the first box body 410, and a zigzag-shaped reforming flow channel 416 is formed inside the first box body 410 by means of the partition walls 419 and 421. Here, a well hole 414 is provided at one end of the reforming flow channel 416, and a well hole 454 is provided at the other end of the reforming flow channel 416. A reforming catalyst for reforming a fuel and generating hydrogen is carried on at least part of a wall face of the reforming flow channel 416. A Cu/ZnO-based catalyst or a Pd/ZnO-based catalyst can be exemplified as a reforming catalyst used for reforming methanol, for example. Thus, the first box body 410 is joined with the bottom plate 417 while the partition walls 419 and 421 are covered, and a catalyst for a reformer is provided in an internal space of the first box body 410, whereby a first reformer 507 is configured.

The second box body 412 exhibits a rectangular shape whose bottom face opens. In a state in which partition walls 423 and 125 are inserted into the second box body 412 through the opening, and thus, the partition walls 423 and 125 are housed in the second box body 412, and then the opening of the second box body 412 is closed by the bottom plate 417, and the second box body 412 is joined with the bottom plate 417. The partition walls 423 and 125 are joined with a top face of the second box body 412, and a zigzag-shaped reforming flow channel 450 is formed inside the second box body 412 by means of the partition walls 423 and 125. Here, a well hole 455 is provided at one end of the reforming flow channel 450, and a well hole 415 is provided at the other end of the reforming flow channel 450. A reforming catalyst for reforming a fuel and generating hydrogen is carried on at least part of a wall face of the reforming flow channel 450. Thus, the second box body 412 is joined with the bottom plate 417 while the partition walls 423 and 125 are covered, and a reforming catalyst is provided in an internal space of the second body boxy 412, whereby a second reformer 511 is configured.

Figure 40:
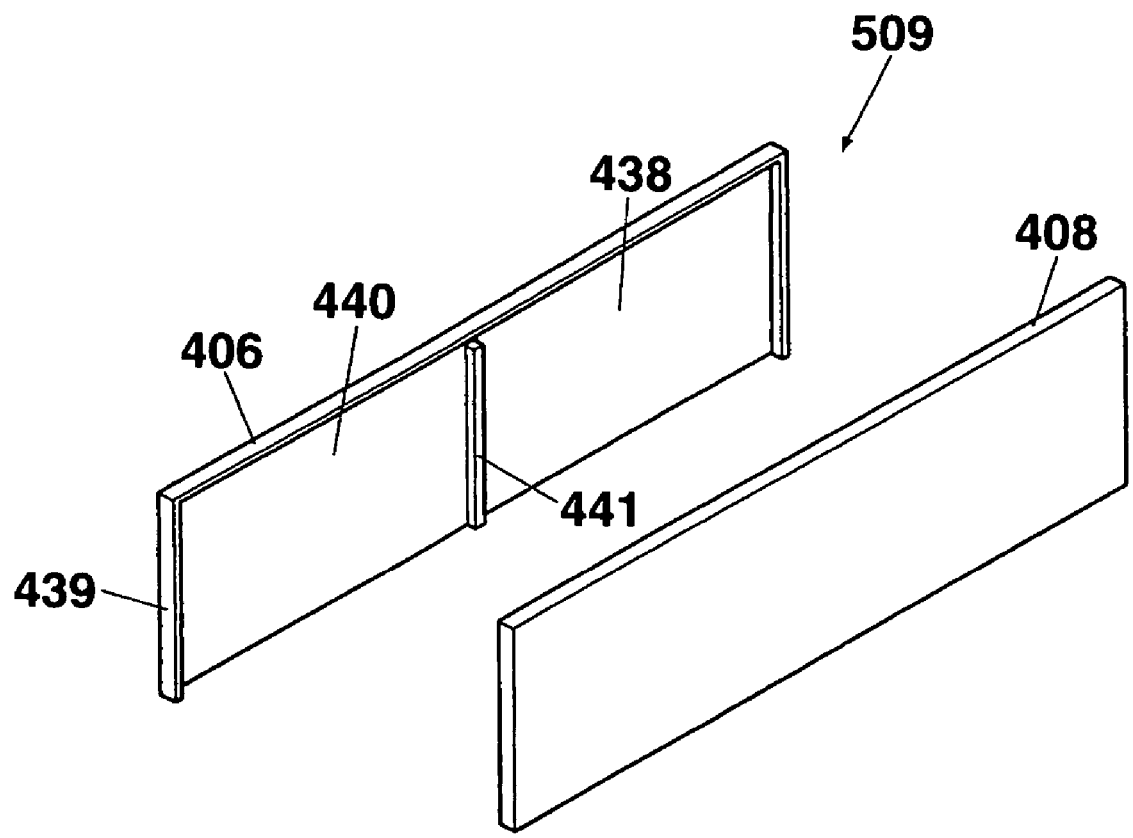
FIG. 40 is a perspective view of a combustor plate in the third embodiment.

FIG. 40 is a perspective view of a combustor plate in a third embodiment. As shown in FIG. 40, on one face of a combustor plate 406, a partition wall 439 is provided so as to protrude along a rim excluding a lower rim, and further, another partition wall 441 is provided so as to vertically extend and protrude. Then, a combustor plate 408 is joined with the combustor plate 406, whereby combustion chambers 438 and 440 each are formed so as to open a lower side thereof.

Further, as shown in FIGS. 32 and 39, the combustor plates 406 and 408 are joined with the bottom plate 417 of the reformer base body 404 between the first box body 410 and the second box body 412, whereby lower openings of the combustion chambers 438 and 440 are closed by means of the bottom plate 417. Here, opposite faces of the combustor plate 406 and the first box body 410 and opposite faces of the combustor plate 408 and the second box body 412 are disposed so as to come into close contact with each other. In addition, as shown in FIGS. 35 and 36, a well hole 432 is provided in the combustion chamber 438, and a well hole 434 is provided in the combustion chamber 440. A combustion catalyst for combusting a combustion gas mixture is carried at least part of a wall face of the combustion chamber 438 and the combustion chamber 440. Platinum is exemplified as a combustion catalyst, for example.

In this way, the combustion plates 406 and 408 are joined with a bottom plate so as to close the lower openings of the combustion chambers 438 an 440 formed between the combustion plates 406 and 408, and a combustion catalyst is provided in the combustion chambers 438 and 440, whereby a second combustor 509 is configured.

The combustor plate 406 comes into close contact with the first box body 410, and the combustor plate 408 comes into close contact with the second box body 412. Thus, the first reformer 507 and the second reformer 511 are brought into close contact with the bottom plate 417 of the reformer base body 404 along a parallel direction in a state in which the second combustor 509 is sandwiched.

As shown in FIG. 28 or the like, an external shape of the coupling portion 8 is formed in the shape of a prism. A width of the coupling portion 8 is narrower than that of the high temperature reaction unit 4 and that of the low temperature reaction unit 6, and a height of the coupling portion 8 is lower than that of each of the high temperature reaction unit 4 and the low temperature reaction unit 6. In addition, the coupling portion 8 is bridged between the high temperature reaction unit 4 and the low temperature reaction unit 6. However, the coupling unit 8 is coupled to the high temperature reaction unit 4 at the center part in the widthwise direction of the high temperature reaction unit 4, and is coupled to the low temperature reaction unit 6 at the center part in the widthwise direction of the low temperature reaction unit 6. As described above, the reforming fuel supply flow channel 538, the mixture flow channel 40, the combustion fuel supply flow channel 548, and the exhaust gas flow channel 550 are provided at the coupling portion 8.

Now, a description will be given with respect to channels of flow channels provided inside the supply/discharge unit 2, the high temperature reaction unit 4, the low temperature reaction unit 6, and the coupling portion 8.

Figure 41:
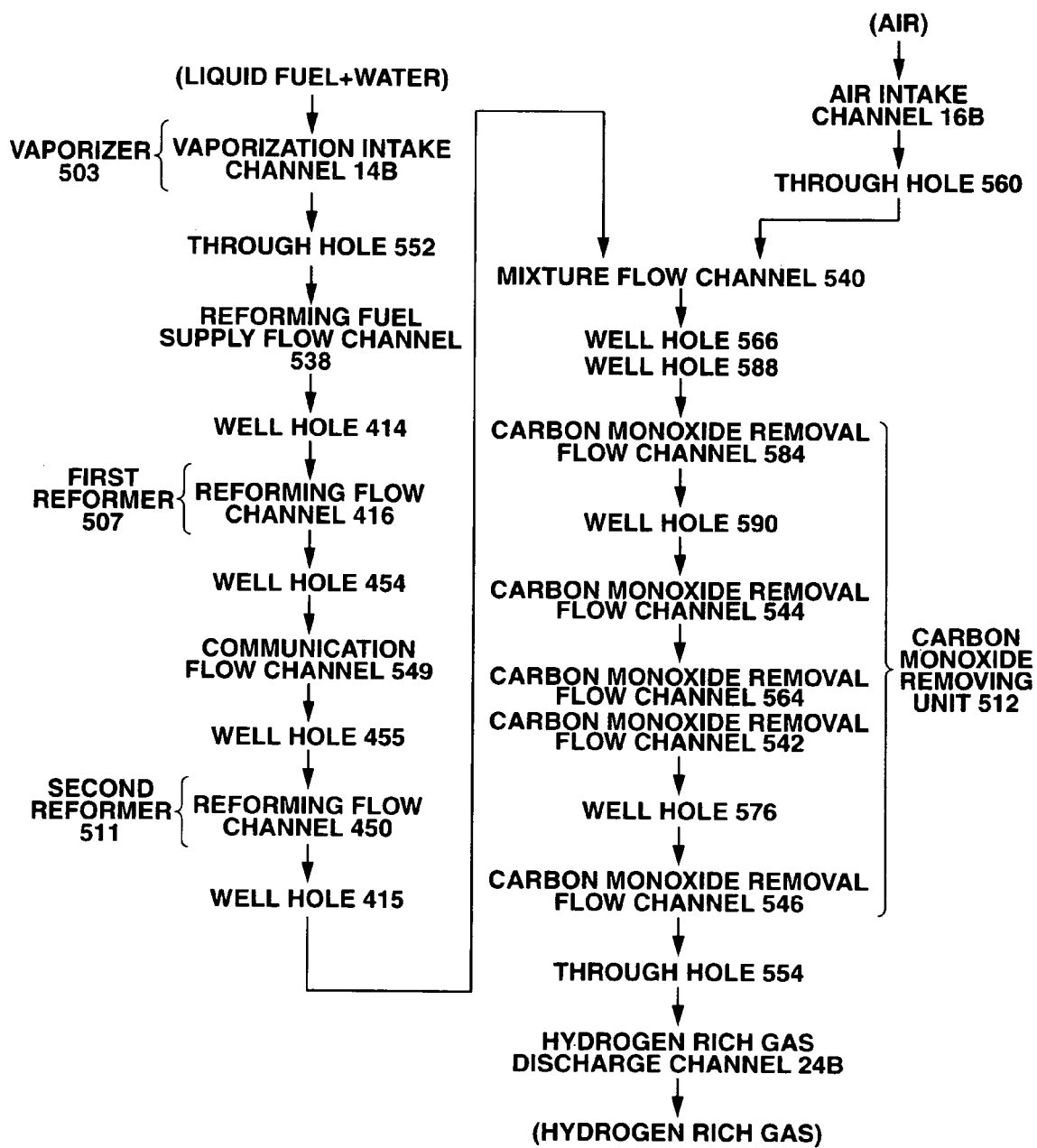
FIG. 41 is a view showing a channel from supply of a liquid fuel and water to discharge of a hydrogen rich gas that is a product, in the micro-reactor module according to the third embodiment.
Figure 42:
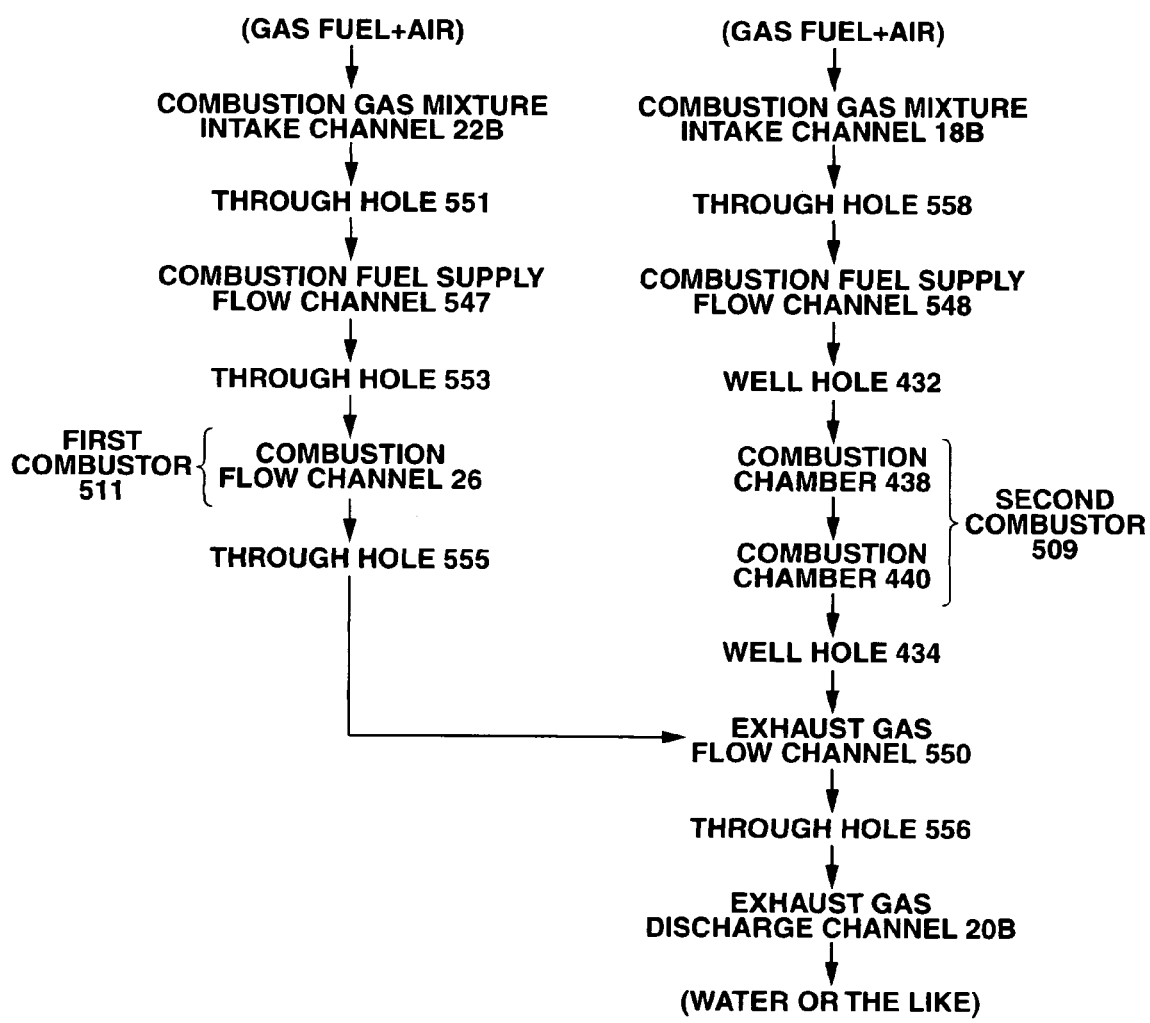
FIG. 42 is a view showing a channel from supply of combustion gas mixture made of a gas fuel and air to discharge of water or the like that is a product, in the micro-reactor module according to the third embodiment.

FIG. 41 is a view showing a channel from supply of a liquid fuel and water to discharge of a hydrogen rich gas that is a product, in a micro-reactor module according to the third embodiment. FIG. 42 is a view showing a channel from supply of combustion gas mixture made of a gas fuel and an air to discharge of water or the like that is a product, in the micro-reactor module according to the third embodiment.

Referring to a correlation in FIGS. 41, 42 and 31, the vaporization intake channel 14B corresponds to a flow channel of the vaporizer 503; the reforming flow channel 416 corresponds to a flow channel of the first reformer 507; the reforming flow channel 450 corresponds to a flow channel of the second reformer 511; a path from a start end of the carbon monoxide removal flow channel 584 to a terminal end of the carbon monoxide removal flow channel 546 corresponds to a flow channel of the carbon monoxide removing unit 512; the combustion flow channel 26B corresponds to a flow channel of the first combustor 505; and the combustion chambers 438 and 440 correspond to a flow channel of the second combustor 509.

As shown in FIGS. 29 and 32, a heating wire 170B is patterned in a zigzag state on a bottom face of the low temperature reaction unit 6, namely, on a bottom face of an insulation plate 290. On these bottom faces from the low temperature reaction unit 6 to the high temperature reaction unit 4 through the coupling portion 8, a heating wire 172B is patterned in a zigzag state. A heating wire 174B is patterned from the bottom face of the low temperature reaction unit 6 to a side face of the liquid fuel intake pipe 10B through a surface of the combustor plate 312. Here, an insulation film such as silicon nitride or silicon oxide is formed on a side face of the liquid fuel intake pipe 10B and a surface of the combustor plate 312, and the heating wire 174B is formed on the surface of the insulation film. The heating wires 170B, 172B, and 174B are patterned on the insulation film or the insulation plate 290, whereby a voltage to be applied is not applied to a metal material-based base plate 291, the liquid fuel intake pipe 10B, and the combustor plate 312 or the like, and heat generation efficiency of the heating wires 170B, 172B, and 174B can be improved.

The heating wires 170B, 172B, and 174B are laminated in order of an anti-diffusion layer and an exothermic layer from the insulation film or the insulation plate 290. The exothermic layer is made of a material having the lowest resistance (for example, Au) among the three layers. When a voltage is applied to the heating wires 170B, 172B, and 174B, a current flows intensively, so that a heat is generated. In the anti-diffusion layer, even if these heating wires generate heat, it is preferable that a material for the exothermic layer be hardly thermally diffused to the anti-diffusion layer, a material for the anti-diffusion layer be hardly thermally diffused to the exothermic layer, and a substance having a comparatively high melting point and a low reactivity (for example, W) be used. In addition, in the case where the anti-diffusion layer is low in adhesiveness and is easily released with respect to the insulation film, an adhesive layer may be further provided between the insulation film and the anti-diffusion layer. The adhesive layer is made of a material (for example, Ta, Mo, Ti, Cr) having excellent adhesiveness relevant to the anti-diffusion layer or with respect to the insulation layer or the insulation plate 290. The heating wire 170B heats the low temperature reaction unit 6 at the time of startup; the heating wire 172B heats the high temperature reaction unit 4 and the coupling portion 8 at the time of startup; and the heating wire 174B heats the vaporizer 503 and the first combustor 505 of the supply/discharge unit 2. Then, when the second combustor 509 is combusted by an off gas containing hydrogen from a fuel cell, the heating wire 172B heats the high temperature reaction unit 4 and the coupling portion 8 as an assistance of the second combustor 509. Similarly, in the case where the first combustor 505 is combusted by an off gas containing hydrogen from a fuel cell, the heating wire 170B heats the low temperature reaction unit 6 as an assistance of the first combustor 505.

In the heating wires 170B, 172B, and 174B, an electrical resistance changes depending on a temperature, and the wires function as temperature sensors for reading a temperature change from the change of the resistance value. Specifically, the temperature of the heating wire is proportional to an electrical resistance.

Ends of all of the heating wires 170B, 172B, and 174B are positioned at a bottom face of the low temperature reaction unit 6, and these ends are arranged so as to surround the combustor plate 312. Lead wires 176B and 178B are connected to both ends of the heating wire 170B, respectively; lead wires 180B and 182B are connected to both ends of the heating wire 172B, respectively, and lead wires 184B and 186B are connected to both ends of the heating wire 174B, respectively. In FIG. 30, for clarity, the heating wires 170B, 172B, and 174B and the lead wires 176B, 178B, 180B, 182B, 184B, and 186B are not shown.

As shown in FIGS. 30 and 32, a getter material 188 may be provided on a surface of the low temperature reaction unit 6. A heater such as an electric heat material is provided at this getter material 188, and a wiring 190 is connected to this heater. Both ends of the wiring 190 are positioned on the bottom face of the low temperature reaction unit 6 at the periphery of the combustor plate 312, and the lead wires 192B and 194B are connected to both ends of the wiring 190. The getter material 188 is activated by being heated, and has an adsorptive action. This getter material adsorbs: the gas remaining in the internal space of an insulating package 200 described later; the gas having leaked from the micro-reactor module 1C to the internal space of the insulating package 200; or the gas having invaded from the outside into the insulating package 200, thereby restricting invasion of the gas into the internal space of the insulating package 200, impairing the degree of vacuum, and the lowering of the heat insulation effect. As a material for the getter material 188, for example, there can be exemplified an alloy consisting essentially of zirconium, barium, titanium, or vanadium. In FIG. 30, for clarity, the lead wires 192B and 194B are not shown.

Now, a description will be given with respect to a heat insulation structure for restricting a thermal loss of the micro-reactor module 1C in the third embodiment.

Figure 43:
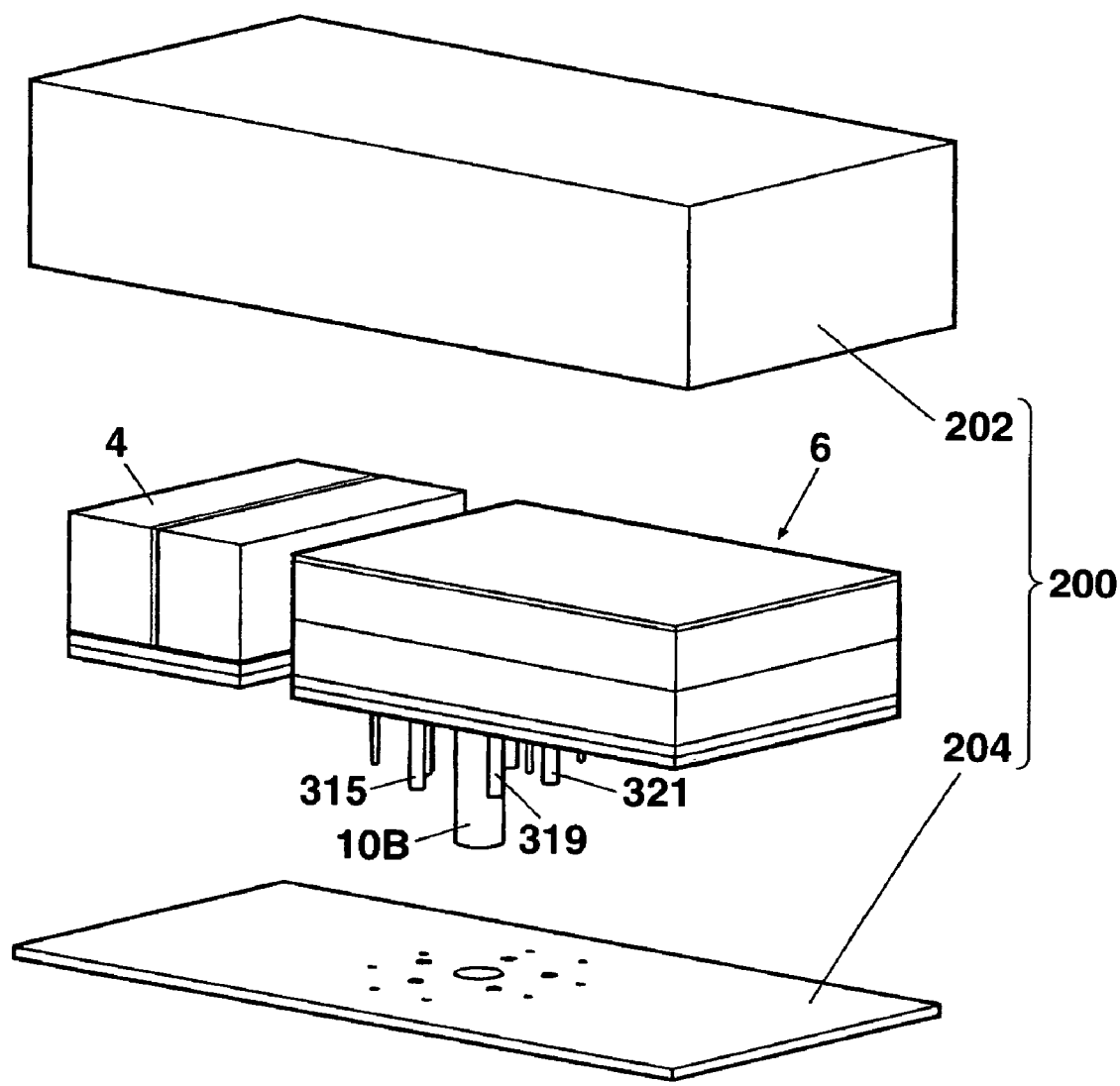
FIG. 43 is an exploded perspective view of an insulating package that covers the micro-reactor module in the third embodiment.
Figure 44:
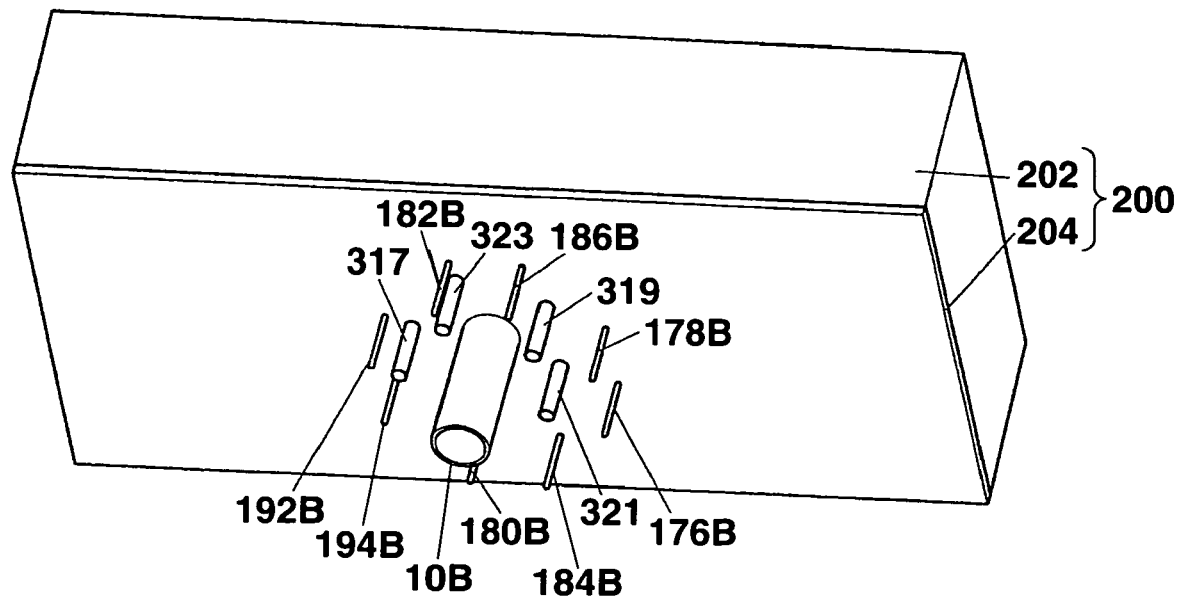
FIG. 44 is a perspective view showing obliquely downwardly the insulating package in the third embodiment.

FIG. 43 is an exploded perspective view of an insulating package that covers the micro-reactor module in the third embodiment. FIG. 44 is a perspective view showing obliquely downwardly the insulating package in the third embodiment.

As shown in FIGS. 43 and 44, the insulating package 200 is configured so as to cover a whole micro-reactor module 1C, and thus the high temperature reaction unit 4, the low temperature reaction unit 6, and the coupling portion 8 are housed in the insulating package 200. The insulating package 200 is composed of: a rectangular shaped case 202 whose bottom face opens; and a close plate 204 for closing the bottom face opening of the case 202, and the close plate 204 is joined with the case 202. The case 202 and the close plate 204 are made of a planar metal material such as a stainless steel, for example. In addition, a metal reflection film made of aluminum, gold, silver and the like, for example may be formed on a face serving as the inside of the case 202 and the close plate 204. If such a metal reflection film is formed, a thermal loss due to irradiation from the supply/discharge unit 2, the high temperature reaction unit 4, the low temperature reaction unit 6, and the coupling portion 8 can be restricted.

In a state in which a plurality of through holes penetrate the close plate 204, and then, pipes 315, 317, 319, 321, 323, a liquid fuel intake pipe 10B, and lead wires 176B, 178B, 180B, 182B, 184B, 186B, 192B, and 194B are inserted into their through holes, these through holes are sealed. An internal space of the insulating package 200 is closed, the internal space is evacuated, and thus a vacuum heat insulation structure is provided. In this manner, a thermal loss can be restricted.

In a state in which a plurality of through holes penetrate the close plate 204, and then, the pipes 315, 317, 319, 321, 323 and the liquid fuel intake pipe 10B are inserted into their through holes, part of them is exposed to the outside of the insulating package 200. The pipes 315, 317, 319, 321, and 323 and the liquid fuel intake pipe 10B and the through holes of the close plate 204 are joined and sealed with a glass material or an insulation sealing material, for example, so that an external air does not invade the insulating package 200 from this portion exposed to the outside. The internal space of the insulating package 200 is closed, an internal pressure is reduced so as to be equal to or smaller than an atmospheric pressure, preferably 1 Torr or less, and thus a vacuum heat insulation structure is provided. In this manner, a heat of each unit of the micro-reactor module 1C can be restricted from being propagating to the outside, and a thermal loss can be reduced. In addition, at the inside of the insulating package 200, the pipes 315, 317, 319, 321, 323, and the liquid fuel intake pipe 10B are erected as columns with respect to the close plate 204. The high temperature reaction unit 4, the low temperature reaction unit 6, and the coupling portion 8 are supported by the pipes 315, 317, 319, 321, and 323, and the liquid fuel intake pipe 10B. The high temperature reaction unit 4, the low temperature reaction unit 6, and the coupling portion 8 are spaced from the internal face of the insulating package 200. In planar viewing, it is desirable that the liquid fuel intake pipe 10B be connected to the bottom face of the low temperature reaction unit 6 in the gravity of the whole high temperature reaction unit 4, low temperature reaction unit 6, and coupling portion 8.

In the foregoing description, although the getter material 188 has been provided on the surface of the low temperature reaction unit 6, a position at which the getter material 188 is provided is not limited in particular as long as the position is inside the insulating package 200.

Now, a description will be given with respect to an operation of the micro-reactor module 1C in the present embodiment. The operation of the micro-reactor module 1C according to the present embodiment is basically identical to that of the micro-reactor module 1A in the first embodiment.

First, when a voltage is applied between the lead wires 192B and 194B, the getter material 188 is heated by means of the heater, and the getter materiel 188 is activated. In this manner, the residual gas contained in the insulating package 200 is adsorbed by means of the getter material 188, the degree of vacuum in the insulating package 200 is increased, and heat insulation efficiency is improved.

In addition, when a voltage is applied between the lead wires 176B and 178B, the heating wire 170B is heated, and thus the low temperature reaction unit 6 is heated. When a voltage is applied between the lead wires 180B and 182B, the heating wire 172B is heated, for heating the high temperature reaction unit 4. When a voltage is applied to the lead wires 184B and 186B, the heating wire 174B is heated, so that a top part of the liquid fuel intake pipe 10B is heated. The current/voltage for the heating wires 170B, 172B, and 174B is measured by means of a control device, whereby the temperatures of the liquid fuel intake pipe 10B, the high temperature reaction unit 4, and the low temperature reaction unit 6 are measured; the measured temperatures are fed-back to the control device; and the voltages of the heating wires 170B, 172B, and 174B are controlled by means of the control device. In this manner, temperature control of the liquid fuel intake pipe 10B, the high temperature reaction unit 4, and the low temperature reaction unit 6 is made.

In a state in which the liquid fuel intake pipe 10B, the high temperature reaction unit 4, and the low temperature reaction unit 6 are heated by means of the heating wires 170B, 172B, and 174B, when a liquid mixture of a liquid fuel and water is continuously or intermittently supplied into the vaporization intake channel 14B by means of an external pump or the like, the liquid mixture is absorbed by a liquid absorptive material, and the liquid mixture permeates towards the top of the vaporization intake channel 14B due to a capillary phenomenon. Then, the liquid mixture contained in the liquid absorptive material vaporizes, and a gas mixture of the fuel and water evaporates from the liquid absorptive material.

Then, the gas mixture having evaporated from the liquid absorptive material flows into the first reformer 507 (reforming flow channel 416) through the through hole 552, the reforming fuel supply flow channel 538, and the well hole 414. Then, the gas mixture flows into the second reformer 511 (reforming flow channel 450) through the well hole 454, the communication flow channel 549, and the well hole 455. When the gas mixture flows in the reforming flow channels 416 and 450, the gas mixture is heated, and catalyst-reacted, whereby a hydrogen gas or the like is generated.

The gas mixture (containing a hydrogen gas, a carbon dioxide gas, a carbon monoxide gas or the like) generated by the first reformer 507 and the second reformer 511 flows into the mixture flow channel 40 through the well hole 415. On the other hand, air is supplied to the air intake channel 16B by means of a pump or the like, the supplied air flows into the mixture flow channel 40, and the gas mixture such as a hydrogen gas and the air are mixed with each other.

Then, the gas mixture containing air, a hydrogen gas, a carbon monoxide gas, a carbon dioxide gas or the like flows from the mixture flow channel 40 to the carbon monoxide removing unit 512 through well holes 566 and 588 (from the carbon monoxide removal flow channel 584 to the carbon monoxide removal flow channel 546).

When the gas mixture flows from the carbon monoxide removal flow channel 584 to the carbon monoxide removal flow channel 546, the carbon monoxide gas contained in the gas mixture is selectively oxidized, and the carbon monoxide gas is removed. Here, the carbon monoxide gas does not react uniformly from the carbon monoxide removal flow channel 584 to the carbon monoxide removal flow channel 546, and a reaction speed of the carbon monoxide gas becomes high in the downstream of the channels from the carbon monoxide removal flow channel 584 to the carbon monoxide removal flow channel 546 (mainly from the carbon monoxide removal flow channel 564 to the carbon monoxide removal flow channel 546). An oxidization reaction of the carbon monoxide gas is a heat generation reaction, so that a heat is generated mainly at a portion from the carbon monoxide removal flow channel 564 to the carbon monoxide removal flow channel 546. The liquid fuel intake pipe 10B is positioned beneath this portion, so that a heat caused by the oxidization reaction of the carbon monoxide gas is efficiently used for a vaporized heat of water and a fuel at the vaporizer 503 together with a heat of the first combustor 505.

Then, the gas mixture in a state in which the carbon monoxide has been removed is supplied to a fuel pole or the like of a fuel cell through the through hole 554 and the hydrogen discharge channel 24B. Electricity is generated in the fuel cell due to an electrochemical reaction of the hydrogen gas supplied from the discharge channel 24B, and an off gas containing an unreacted hydrogen gas or the like is discharged from the fuel cell.

The above operation is an operation at an initial stage, and the liquid mixture is continuously supplied into the vaporization intake channel 14B during the subsequent power generation operation. Then, an air is mixed with the off gas discharged from the fuel cell, and the gas mixture (hereinafter, referred to as a combustion gas mixture) is supplied to a combustion gas mixture intake channel 22B and a combustion gas mixture intake channel 18B. The combustion gas mixture supplied to the combustion gas mixture intake channel 22B flows into a combustion flow channel 26B through a through hole 551, a combustion fuel supply flow channel 547, and a through hole 553, the combustion gas mixture is catalyst-combusted in the combustion flow channel 26B, and a combustion heat is generated. The combustion flow channel 26B peripherally surrounds the liquid fuel intake pipe 10B downside of the low temperature reaction unit 6. Thus, the liquid fuel intake pipe 10B is heated by means of a combustion heat, and the low temperature reaction unit 6 is heated.

On the other hand, the combustion gas mixture supplied to the combustion gas mixture intake pipe 18B flows into the combustion chambers 438 and 440 through the through hole 558, the combustion fuel supply flow channel 548, and the well hole 432, and then, the combustion gas mixture is catalyst-combusted in the combustion chambers 438 and 440. In this manner, while a combustion heat is generated, the first reformer 507 and the second reformer 511 are disposed at both sides of the combustion chambers 438 and 440, so that the first reformer 507 and the second reformer 511 are heated by means of the combustion heat.

Part of the liquid fuel reserved in a fuel container is vaporized, whereby the combustion gas mixture of thus vaporized fuel and an air may be supplied to the combustion gas mixture intake channels 18B and 22B.

In a state in which the liquid mixture is supplied to the vaporization intake channel 14B and in a state in which the combustion gas mixture is supplied to the combustion gas mixture intake channels 18B and 22B, a control device controls an applied voltage of the heating wires 170B, 172B, and 174B and controls a pump or the like while a temperature is measured by the resistance values of the heating wires 170B, 172B, and 174B. When the pump is controlled by means of the control device, a flow rate of the combustion gas mixture supplied to the combustion gas mixture intake channels 18B and 22B is controlled, whereby a combustion heat rate of each of the combustors 505 and 509 is controlled. In this way, the control device controls the heating wires 170B, 172B, and 174B and the pump, whereby temperature control of the liquid fuel intake pipe 10B, the high temperature reaction unit 4, and the low temperature reaction unit 6 is made. Here, temperature control is made so that the high temperature reaction unit 4 ranges from 250° C. to 400° C., preferably, from 300° C. to 380° C., the low temperature reaction unit 6 has a temperature lower than that of the high temperature reaction unit 4, specifically from 120° C. to 200° C., further preferably, from 140° C. to 180° C.

Now, a description will be given with respect to an example of specific dimensions and constituent elements of each unit of the reacting device in the present invention.

The high temperature reaction unit 4 is formed in approximate size of 16 mm in width, 10 mm in length, and 6 mm in height, for example. Here, the lengthwise direction of the high temperature reaction unit 4 of the second combustor 509 is formed to be about 0.3 mm in thickness, for example. The coupling portion 8 is formed in size of 3 mm in length and about 1 mm in height and width, for example. The low temperature reaction unit 6 is formed in approximate size of 16 mm in width, 23 mm in length, and 6 mm in height, for example. The external flow pipe 10B in the supply/discharge unit 2 is formed to be 7 to 8 mm in length and 2 to 3 mm in vertical and horizontal lengths. The insulating package 200 is formed in approximate size of 9 to 10 mm in height, 20 mm in width, and 40 mm in length, for example. In addition, a metal material forming the high temperature reaction unit 4, the low temperature reaction unit 6, the coupling portion 8, the external flow pipe 10B and the combustor plate 312 or the like is made of a stainless steel SUS304 having thickness of about 0.1 to 0.2 mm. The insulating package 200, for example, is made of stainless steel SUS304 having thickness of about 0.5 mm. With such a configuration, when powers of the heating wires 170B and 172B are 15 W and 25 W, respectively, the high temperature reaction unit 4 and the low temperature reaction unit 6 can be heated to 375° C. and 150° C., respectively, in about 9 to 10 seconds and startup can be achieved within a comparatively short time.

As has been described above, according to the present embodiment, the reformer 507, the combustor 509, and the reformer 511 are disposed in close contact with the bottom plate 417 of the reformer base body 404 along a parallel direction, and the box bodies 410 and 412 and the combustor plates 406 and 408 are joined with the bottom plate 417. Thus, there is no need for bonding the box bodies 410 and 412 or the box bodies 410 and 412 and the combustor plates 406 and 408 with each other, and the number of bonding faces can be reduced. Thus, the leakage of the inside reaction material or product can be restricted.

In addition, the reformer base body 404 is joined on the base unit 402 of the base plate 291, and the carbon monoxide removing unit 512 is provided on another base unit 297 of the base plate 291. Thus, a portion serving as a base of the first reformer 507, the second reformer 511, the second combustor 509, and the carbon monoxide removing unit 512 is shared as the base plate 291. Therefore, the number of parts in the micro-reactor module 1C is reduced in accordance with a proportion associated with such sharing, and there is no need for a junction process between the reformers 507 and 511 and the carbon monoxide removing unit 512. Thus, a process for manufacturing the micro-reactor module 1C can be simplified.

In addition, partition walls 419, 421, 423, and 125 erected on the bottom plate 417 of the reformer base body 404 are covered with the box bodies 410 and 412, whereby the reformers 507 and 511 are provided. Thus, in the case where a flow channel is formed inside the reformers 507 and 511, there is no need for providing partition walls on the box bodies 410 and 412. Therefore, the number of junction faces in the reformers 507 and 511 is reduced. In the case where the bottom plate 417 is joined with the box bodies 410 and 412, there is no need for a junction process for joining the partition walls. Thus, a process for manufacturing the reformers 507 and 511 can be simplified.

In addition, an internal space of the insulating package 200 is provided as a heat insulation space. The high temperature reaction unit 4 is spaced from the low temperature reaction unit 6. A gap from the high temperature reaction unit 4 to the low temperature reaction unit 6 is provided as a length of the coupling portion 8. Therefore, a channel of heat from the high temperature reaction unit 4 to the low temperature reaction unit 6 is limited to the coupling portion 8, and heat transmission to the low temperature reaction unit 6 that does not require a high temperature is limited. In particular, the height and width of the coupling portion 8 are smaller than those of the high temperature reaction unit 4 and the low temperature reaction unit 6, and thus, heat transmission through the coupling portion 8 is restricted to the minimum. Thus, a thermal loss of the high temperature reaction unit 4 can be restricted and the low temperature reaction unit 6 can be restricted from being heated at a temperature equal to or greater than a set temperature. That is, even in the case where the high temperature reaction unit 4 and the low temperature reaction unit 6 have been housed in one insulating package 200, a temperature difference can be generated between both reaction units 4, 6.

In addition, channels 538, 540, 548, and 550 communicating between the low temperature reaction unit 6 and the high temperature reaction unit 4 are provided to be integrated in one coupling portion 8, thus making it possible to reduce a stress generated at the coupling portion 8 or the like. Namely, a temperature difference exists between the high temperature reaction unit 4 and the low temperature reaction unit 6, and thus, the high temperature reaction unit 4 expands more significantly than the low temperature reaction unit 6. However, the high temperature reaction unit 4 can restrict the stress generated at the coupling portion 8 or the like because all portions other than the coupling portion with the coupling portion 8 are provided as free ends.

In particular, the coupling portion 8 is smaller than the high temperature reaction unit 4 or the low temperature reaction unit 6 in height and width. Further, the coupling portion 8 is connected to the high temperature reaction unit 4 and the low temperature reaction unit 6 at the center part in the widthwise direction of the high temperature reaction unit 4 and the low temperature reaction unit 6. Thus, the generation of the stress at the coupling portion 8, the high temperature reaction unit 4, and the low temperature reaction unit 6 can be restricted.

The pipes 315, 317, 319, 321, and 323, the liquid fuel intake pipe 10B, and the lead wires 176B, 178B, 180B, 182B, 184B, 186B, 192B, and 194B extend to the outside of the insulating package 200, whereas all of these elements or members are mechanically or directly connected to the low temperature reaction unit 6. Thus, direct heat transmission from the high temperature reaction unit 4 to the outside of the insulating package 200 can be restricted, and a thermal loss of the high temperature reaction unit 4 can be restricted. Therefore, even in the case where the high temperature reaction unit 4 and the low temperature reaction unit 6 have been housed in one insulating package 200, a temperature difference can be generated between both reaction units 4, 6.

A bottom face of the coupling portion 8, a bottom face of the high temperature reaction unit 4, and a bottom face of the low temperature reaction unit 6 are positioned on the same plane. Thus, the heating wire 172B may be patterned relatively easily, and the disconnection of the heating wire 172B may be prevented.

In addition, a liquid absorptive material is filled in the vaporization intake channel 14B of the liquid fuel intake pipe 10B, and the vaporization intake channel 14B is provided as the vaporizer 503. Thus, while downsizing and simplification of the micro-reactor module 1C is achieved, a temperature condition required for vaporization of liquid mixture can be established (i.e., a state in which a top part of the vaporization intake channel 14B becomes 120° C. can be established, for example).

In addition, the combustor plate 312 is provided at the periphery of the liquid fuel intake pipe 10B at an upper end of the liquid fuel intake pipe 10B. Further, a liquid absorptive material in the vaporization intake channel 14B is filled up to a height of the combustor plate 312. Thus, the combustion heat in the first combustor 505 can be effectively used for vaporization of a liquid mixture.

In addition, a structure is provided such that the second combustor 509 is sandwiched between the first reformer 507 and the second reformer 511. Thus, a combustion heat of the second combustor 509 is uniformly transmitted to both the first reformer 507 and the second reformer 511 so that no temperature difference occurs between both reformers 507, 511.

<Power Generation Unit>

A description will be given with respect to a schematic configuration of a power generation unit that comprises the micro-reactor module in each of the above-described embodiments.

Figure 45:
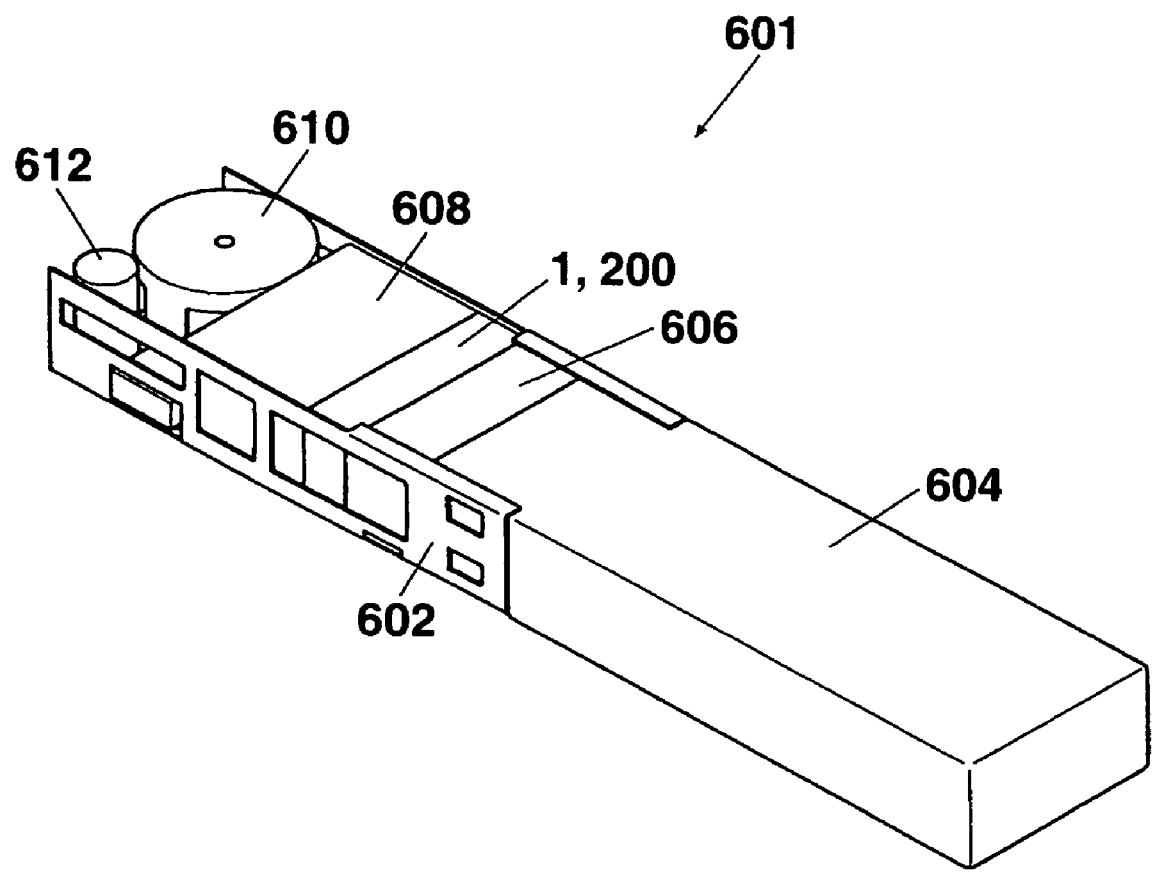
FIG. 45 is a perspective view showing an example of a power generation unit that comprises the micro-reactor module in each of the embodiments of the present invention.
Figure 46:
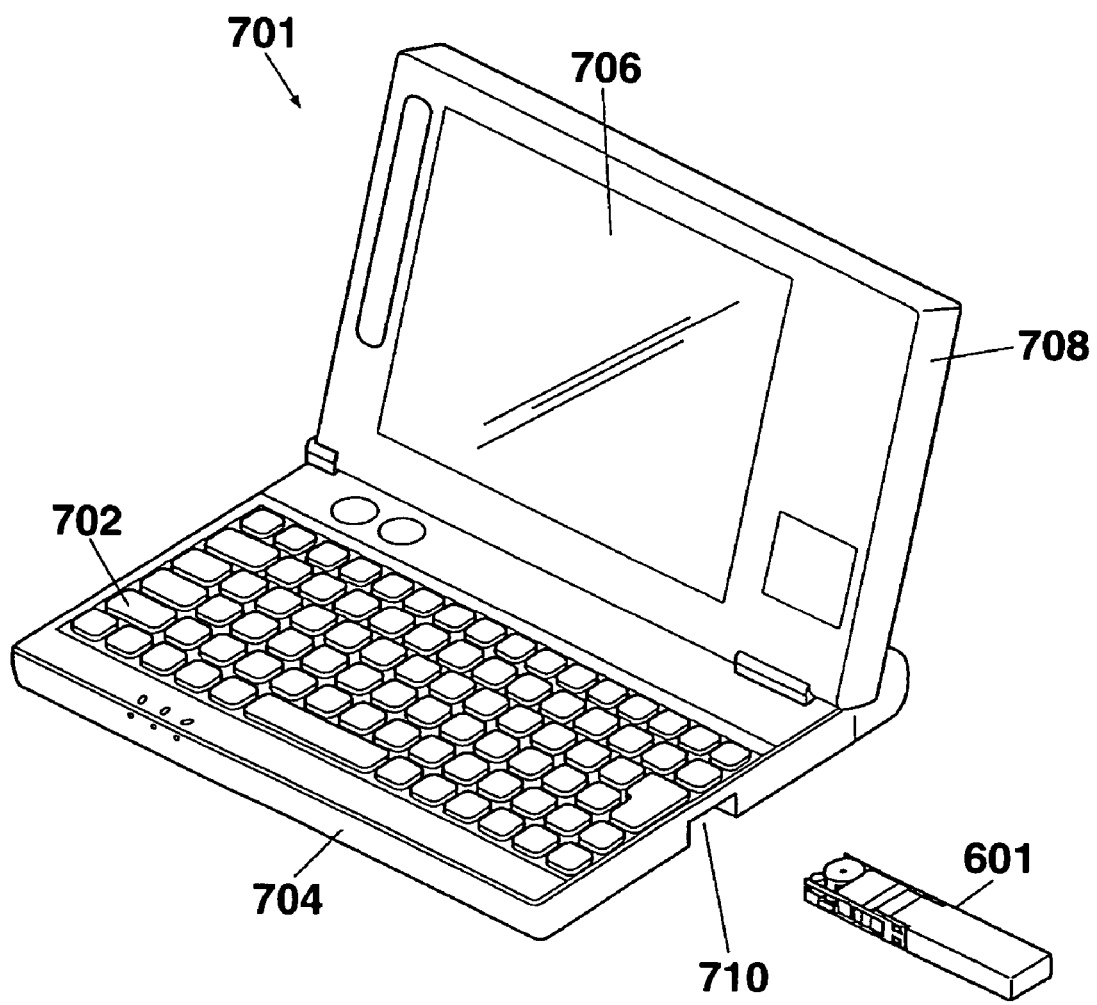
FIG. 46 is a perspective view showing an example of an electronic device using a power generation unit as a power source.

FIG. 45 is a perspective view showing an example of a power generation unit that includes the micro-reactor module in each of the embodiments of the present invention. FIG. 46 is a perspective view showing an example of an electronic device using such a power generation unit as a power source. As shown in FIG. 45, the micro-reactor module in each of the above-described embodiments can be used after being assembled with a power generation unit 601.

This power generation unit 601 includes: for example, a frame 602; a fuel container 604 that is removably attached to the frame 602; a flow rate control unit 606 having a liquid channel, a pump, a flow rate sensor, and a valve or the like; a micro-reactor module 1 housed in an insulating package 200 (corresponding to the micro-reactor modules 1A, 1B, and 1C); a power generating module 608 having a fuel cell, a humidifier for humidifying the fuel cell, and a collector or the like for collecting a byproduct generated by the fuel cell; an air pump 610 for supplying an air (oxygen) to the micro-reactor module 1C and the power generating module 608; and a power supply unit 612 having a secondary cell, a DC-AC converter, and an external interface for electrically making connection to an external device driven by an output of the power generation unit 601.

A gas mixture of water and a liquid fuel contained in the fuel container 604 is supplied to the micro-reactor module 1 by means of the flow rate control unit 606, whereby a hydrogen rich gas is generated as described above; the hydrogen rich gas is supplied to a fuel cell of the power generating module 608; and the generated electricity is accumulated in the secondary cell of the power supply unit 612.

As shown in FIG. 46, an electronic device 701 using such a power generation unit as a power source is, for example, a portable electronic device such as a notebook-type personal computer. The electronic device 701 incorporates a computing processor circuit composed of a CPU, a RAM, a ROM, and other electronic parts and includes: a lower housing 704 equipped with a keyboard 702; and an upper housing 708 equipped with a liquid crystal display 706. The lower housing 704 and the upper housing 708 are coupled with each other at a hinge portion. The structure is such that the upper housing 708 can be folded to overlap on the lower housing 704, and thus the liquid crystal display 706 is opposed to the keyboard 702. From a right side face to a bottom face of the lower housing 704, a mounting portion 710 for mounting the power generation unit 601 is formed. When the power generation unit 601 is mounted in the mounting portion 710, the electronic device 701 may be operated due to the electricity of the power generation unit 601.

What is claimed is:

1. A reacting device comprising:
a base plate;
a first reaction unit provided on the base plate, a reaction material being supplied thereto, the first reaction unit being set at a first temperature, a first reaction flow channel being formed such that the reaction material flows therein, the first reaction unit causing a reaction of the reaction material;
at least one heating unit which sets the first reaction unit at the first temperature;
a second reaction unit set at a second temperature that is lower than the first temperature, the reaction material being supplied thereto, a second reaction flow channel being formed such that the reaction material flows therein, the second reaction unit causing a reaction of the reaction material;

a coupling portion bridged between the first reaction unit and the second reaction unit, the coupling portion transferring the reaction material and a product generated by the reaction in the first reaction unit and the second reaction unit; and an insulating container which covers an entirety of the base plate, the first reaction unit, the second reaction unit, and the coupling portion, an internal space of the insulating container having a pressure lower than an atmospheric pressure;

wherein the first reaction unit has a plurality of adjacent reactors that communicate with each other, and the heating unit is provided between adjacent reactors;

wherein the coupling portion comprises joined planar metal materials, and is joined with the first reaction unit and the second reaction unit;

wherein the heating unit sets the second reaction unit at the second temperature via the coupling portion;

wherein the first reaction unit, the second reaction unit, and the coupling portion are separated from an inner surface of the insulating container; and wherein the first reaction unit and the second reaction unit are spaced apart from each other, and the coupling portion connects the first reaction unit and the second reaction unit.

2. The reacting device according to claim 1, wherein the first reaction unit includes a first box-shaped reaction container and a first partition wall provided in the reaction container, the first partition wall forming the first reaction flow channel.

3. The reacting device according to claim 2, wherein the first reaction container and the first partition wall comprise joined planar metal materials.

4. The reacting device according to claim 1, further comprising a first box body which covers an external wall of the first reaction unit.

5. The reacting device according to claim 4, wherein the first box body comprises joined planar metal materials.

6. The reacting device according to claim 1, wherein said plurality of reactors and said at least one heating unit are provided to be laminated on the base plate.

7. The reacting device according to claim 6, wherein said plurality of reactors include a first reactor and a second reactor that are laminated and that communicate with each other, and the heating unit is provided between the first reactor and the second reactor.

8. The reacting device according to claim 7, wherein the heating unit has a portion coming into contact with the first reactor and the second reactor.

9. The reacting device according to claim 1, wherein said plurality of reactors and said at least one heating unit are provided to be arranged parallel onto the base plate.

10. The reacting device according to claim 9, wherein said plurality of reactors include a first reactor and a second reactor that are arranged parallel and that communicate with each other, and the heating unit is provided between the first reactor and the second reactor.

11. The reacting device according to claim 10, wherein the heating unit has a portion coming into contact with the first reactor and the second reactor.

12. The reacting device according to claim 1, wherein the heating unit has a combustor which combusts a gas fuel.

13. The reacting device according to claim 12, wherein the combustor has a combustion catalyst that promotes a combustion reaction of the gas fuel.

14. The reacting device according to claim 13, wherein the combustor has a combustion flow channel that distributes the gas fuel, and
the combustion catalyst is coated at least on a part of a wall face of the combustion flow channel.

15. The reacting device according to claim 1, wherein the second reaction unit includes a second box-shaped reaction container and a second partition wall provided in the reaction container, the second partition wall forming the second reaction flow channel.

16. The reacting device according to claim 15, wherein the second reaction container and the second partition wall comprise joined planar metal materials.

17. The reacting device according to claim 1, further comprising a second box body which covers an external wall of the second reaction unit.

18. The reacting device according to claim 17, wherein the second box body comprises joined planar metal materials.

19. The reacting device according to claim 1, wherein the coupling portion and the second reaction unit are defined at their bottom sides by the base plate, and
the base plate has a neck shape at a portion of the coupling portion between the first reaction unit and the second reaction unit.

20. The reacting device according to claim 1, further comprising a supply/discharge unit provided at the second reaction unit and having a plurality of flow channels which carry out at least supply of the reaction material to the first reaction unit and discharge of the reaction product from the second reaction unit.

21. The reacting device according to claim 1, further comprising a heating wire provided at least one of the first reaction unit and the second reaction unit, the heating wire heating at least one of the first reaction unit and the second reaction unit.

22. The reacting device according to claim 1, wherein:
a first reaction material is supplied as the reaction material to the first reaction unit, in which a first reaction product is generated;
the first reaction product is supplied as the reaction material to the second reaction unit, in which a second reaction product is generated;
the first reaction material is a gas mixture of vaporized water and a fuel containing a hydrogen atom in constitution;
the first reaction unit is a reformer which causes a reforming reaction of the first reaction material;
carbon monoxide is contained in the first reaction product; and
the second reaction unit is a carbon monoxide removing unit which removes the carbon monoxide contained in the first reaction product by means of selective oxidization.

23. The reacting device according to claim 22, further comprising a vaporizer to which water and a liquid fuel containing a hydrogen atom in constitution are supplied, and which generates the gas mixture by heating and vaporizing the water and liquid fuel.

24. The reacting device according to claim 23, further comprising a supply channel which supplies the gas mixture to the first reaction unit via the second reaction unit, and wherein the vaporizer is provided in contact with the second reaction unit.

25. The reacting device according to claim 1, wherein the insulating container comprises joined planar metal materials.

* * * * *